United States Patent
Yatsumonji et al.

(10) Patent No.: US 11,137,292 B2
(45) Date of Patent: Oct. 5, 2021

(54) PHYSICAL QUANTITY DETECTING DEVICE

(71) Applicant: Hitachi Automotive Systems, Ltd., Ibaraki (JP)

(72) Inventors: Nozomi Yatsumonji, Hitachinaka (JP); Hiroaki Hoshika, Hitachinaka (JP); Takayuki Yogo, Hitachinaka (JP); Takahiro Miki, Hitachinaka (JP); Hiroyuki Abe, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 257 days.

(21) Appl. No.: 16/321,826

(22) PCT Filed: Jun. 30, 2017

(86) PCT No.: PCT/JP2017/024080
§ 371 (c)(1),
(2) Date: Jan. 29, 2019

(87) PCT Pub. No.: WO2018/037716
PCT Pub. Date: Mar. 1, 2018

(65) Prior Publication Data
US 2019/0170589 A1 Jun. 6, 2019

(30) Foreign Application Priority Data
Aug. 22, 2016 (JP) .............................. JP2016-161628

(51) Int. Cl.
*G01K 1/08* (2021.01)
*G01K 13/02* (2021.01)
(Continued)

(52) U.S. Cl.
CPC ................ *G01K 1/08* (2013.01); *G01D 5/00* (2013.01); *G01D 11/24* (2013.01); *G01D 21/02* (2013.01); *G01K 13/02* (2013.01); *G01K 13/024* (2021.01)

(58) Field of Classification Search
None
See application file for complete search history.

(56) References Cited

U.S. PATENT DOCUMENTS

2004/0060361 A1* 4/2004 Kozawa .................... G01F 1/69
73/753
2017/0205261 A1 7/2017 Yogo et al.

FOREIGN PATENT DOCUMENTS

JP 9(1997)-005135 1/1997
WO WO 2015/117971 A1 8/2015
WO WO 2016/017301 A1 2/2016

OTHER PUBLICATIONS

International Search Report dated Oct. 17, 2017 in PCT/JP2017/024080.

* cited by examiner

*Primary Examiner* — Erica S Lin
(74) *Attorney, Agent, or Firm* — Foley & Lardner LLP

(57) ABSTRACT

A physical quantity detecting device includes a circuit board having a first support portion with a physical quantity detecting element, a second support portion with a temperature detecting element, and a housing molded by injection molding, the housing supporting the circuit board. The physical quantity detecting element is configured to detect a physical quantity of fluid and the temperature detecting element is configured to detect a temperature of the fluid. The second support portion protrudes from an edge of the circuit and has a third support portion supporting the second support portion in connection with the housing. The third (Continued)

support portion is located on a same side as the leading end portion, with respect to a base end portion, and located on a same side as the base end portion, with respect to an implementation portion on which the temperature detecting element is implemented.

10 Claims, 50 Drawing Sheets

(51) Int. Cl.
      *G01D 21/02*     (2006.01)
      *G01D 5/00*      (2006.01)
      *G01D 11/24*     (2006.01)
      *G01K 13/024*    (2021.01)

SECTION TAKEN ALONG LINE B-B

SECTION TAKEN ALONG LINE B-B

SECTION TAKEN ALONG LINE C-C

FIG. 8-1
(a) 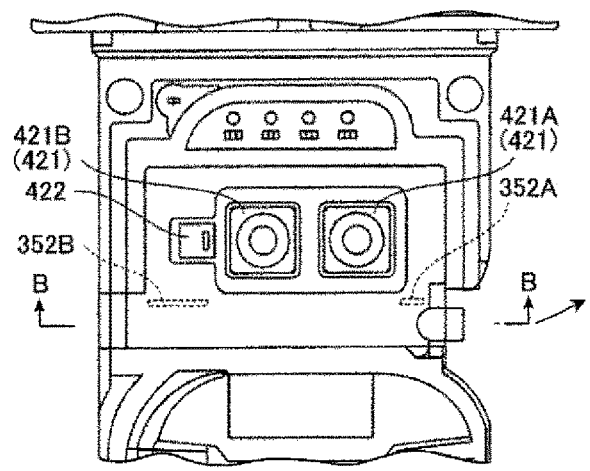
(b) 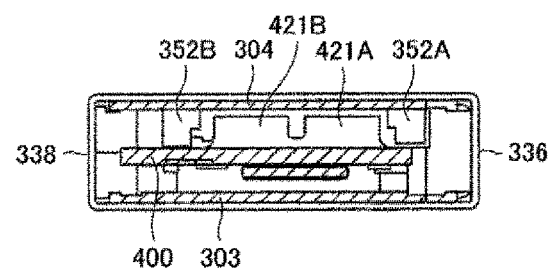
FIG. 8-2
(a) 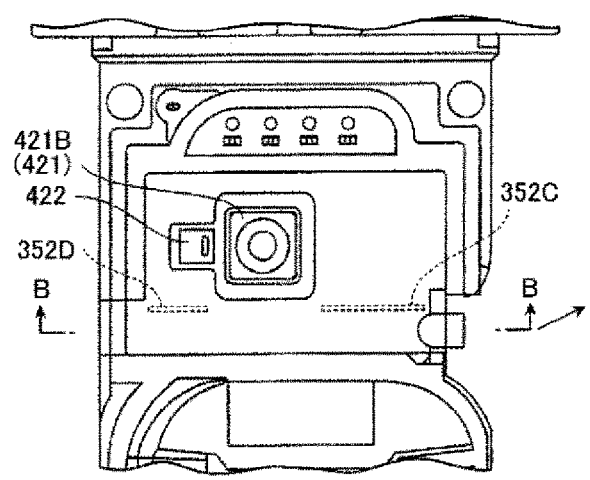
(b) 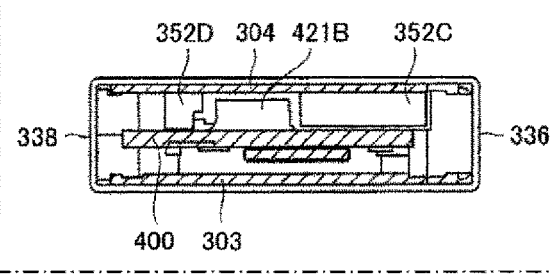

PHYSICAL QUANTITY DETECTING DEVICE

TECHNICAL FIELD

The present invention relates to a physical quantity detecting device that detects the physical quantity of fluid.

BACKGROUND ART

WO 2015/117971 A1 (PTL 1) describes a sensor device that measures the temperature of a flowing medium. The sensor device includes: a housing in which a printed circuit board is disposed; and a temperature sensor element mechanically retained in a previously determined sensor element region of the printed circuit board, the temperature sensor element being apart from the housing. Then, the temperature sensor element is disposed so as to be exposed to the flow of the medium (refer to abstract). That is the sensor device has a protruding portion provided in a cantilever shape at the circuit board, the temperature sensor element being provided at the leading end of the protruding portion.

CITATION LIST

Patent Literature

PTL 1: WO 2015/117971 A1

SUMMARY OF INVENTION

Technical Problem

Because the sensor device in PTL 1 has the protruding portion of the circuit board at which the temperature sensor element is provided, in the cantilever shape, there is a possibility that the protruding portion resonates and vibrates intensely at a low frequency in vibration of the housing. In this case, because a repeating load (stress) is generated at the base of the cantilever shape, there is a risk that the repeating load destroys the circuit board and a conductor on the circuit board. In order to prevent the circuit and the conductor from being destroyed, it is necessary that the cantilever-shaped portion is inhibited from resonating. That is, it is necessary to improve the resonance frequency (eigenfrequency) of the cantilever-shaped portion.

An object of the present invention is to provide a physical quantity detecting device capable of inhibiting a cantilever-shaped portion of a circuit board from resonating.

Solution to Problem

In order to achieve the object, a physical quantity detecting device according to the present invention, includes: a circuit board having: a first support portion on which a physical quantity detecting element is implemented, the physical quantity detecting element being configured to detect a physical quantity of fluid; and a second support portion on which a temperature detecting element is implemented, the temperature detecting element being configured to detect a temperature of the fluid, the second support portion protruding from an edge of the circuit board, the second support portion having the temperature detecting element disposed at a leading end portion included in a free end; and a housing supporting the circuit board, in which the second support portion has a third support portion supporting the second support portion in connection with the housing, the third support portion being located on a side on which the leading end portion is located, with respect to a base end portion that is an end portion on an opposite side to the leading end portion, the third support portion being located on a side on which the base end portion is located, with respect to an implementation portion on which the temperature detecting element is implemented.

Advantageous Effects of Invention

According to the present invention, a simple structure can inhibit the cantilever-shaped portion of the circuit board from resonating, so that the circuit board and a conductor can be prevented from being destroyed. Note that, problems, configurations, and effects other than the above will be clear in the descriptions of the following embodiments.

BRIEF DESCRIPTION OF DRAWINGS

FIG. 2-1 is a front view of the physical quantity detecting device.

FIG. 2-2 is a rear view of the physical quantity detecting device.

FIG. 2-3 is a left side view of the physical quantity detecting device.

FIG. 2-4 is a right side view of the physical quantity detecting device.

FIG. 2-5 is a plan view of the physical quantity detecting device.

FIG. 2-6 is a bottom view of the physical quantity detecting device.

FIG. 3-1 is a front view illustrating the physical quantity detecting device having a front cover removed.

FIG. 3-2 is a rear view illustrating the physical quantity detecting device having a back cover removed.

FIG. 3-3 is a left side view illustrating the physical quantity detecting device having the front cover and the back cover removed.

FIG. 3-4 is a right side view illustrating the physical quantity detecting device having the front cover and the back cover removed.

FIG. 3-5 is a sectional view taken along line A-A of FIG. 3-1, being viewed along arrows A-A of FIG. 3-1.

FIG. 4-1 is a rear view for describing another embodiment of a housing.

FIG. 4-2 is a right side view of the housing illustrated in FIG. 4-1.

FIG. 5 is a view for describing the configuration of the front face cover.

FIG. 6 is a view for describing the configuration of the rear face cover.

FIG. 7-1 is a front view of a circuit board.

FIG. 7-2 is a right side view of the circuit board.

FIG. 7-3 is a rear view of the circuit board.

FIG. 7-4 is a left side view of the circuit board.

FIG. 7-5 is a sectional view taken along line B-B of FIG. 7-1.

FIG. 7-6 is a view illustrating another embodiment corresponding to the section taken along line B-B of FIG. 7-1.

FIG. 7-7 is a sectional view taken along line C-C of FIG. 7-1.

FIG. 8-1 is a view for describing the structure of a sensor room, (a) being an enlarged view of the sensor room, (b) being a sectional view taken along line E1-E1 of (a).

FIG. 8-2 is a view for describing the structure of another embodiment of the sensor room, (a) being an enlarged view of the sensor room, (b) being a sectional view taken along line E2-E2 of (a).

FIG. 8-3 is a view for describing the structure of another embodiment of the sensor room, (a) being an enlarged view of the sensor room, (b) being a sectional view taken along line E3-E3 of (a).

FIG. 9-1 is a front view illustrating another embodiment of the circuit board.

FIG. 9-2 is a front view illustrating another embodiment of the circuit board.

FIG. 9-3 is a front view illustrating another embodiment of the circuit board.

FIG. 9-4 is a front view illustrating another embodiment of the circuit board.

FIG. 9-5 is a front view illustrating another embodiment of the circuit board.

FIG. 9-6 is a front view illustrating another embodiment of the circuit board.

FIG. 9-7 is a front view illustrating another embodiment of the circuit board.

FIG. 9-8 is a front view illustrating another embodiment of the circuit board.

FIG. 10-1 is a view for describing the structure of a terminal connecting unit.

FIG. 10-2 is a view for describing the structure of the terminal connecting unit.

FIG. 10-3 is a sectional view taken along line F-F of FIG. 10-1.

FIG. 10-4 is a sectional view taken along line G-G of FIG. 10-2.

FIG. 11-1 is a diagram for describing an exemplary circuit configuration of the physical quantity detecting device.

FIG. 11-2 is a diagram for describing another embodiment of the circuit configuration of the physical quantity detecting device.

FIG. 12-1 is a view illustrating a comparative example of the physical quantity detecting device, and is a rear view illustrating the physical quantity detecting device having the back cover removed.

FIG. 12-2 is a rear view illustrating a temperature detecting unit provided at a cantilever-shaped portion of the physical quantity detecting device illustrated in FIG. 12-1.

FIG. 12-3 is a view illustrating one embodiment (first embodiment) of the physical quantity detecting device according to the present invention, and is a rear view illustrating the physical quantity detecting device having the back cover removed.

FIG. 12-4 is a rear view illustrating the temperature detecting unit provided at the cantilever-shaped portion of the physical quantity detecting device illustrated in FIG. 12-3.

FIG. 12-5 is a view illustrating one embodiment (second embodiment) of the physical quantity detecting device according to the present invention, and is a rear view illustrating the temperature detecting unit provided at the cantilever-shaped portion.

FIG. 12-6 is a view illustrating one embodiment (third embodiment) of the physical quantity detecting device according to the present invention, and is a rear view illustrating the temperature detecting unit provided at the cantilever-shaped portion.

FIG. 12-7 is a sectional view illustrating section B-B of FIG. 12-6.

FIG. 12-8 is a view illustrating one embodiment (fourth embodiment) of the physical quantity detecting device according to the present invention, and is a rear view illustrating the temperature detecting unit provided at the cantilever-shaped portion.

FIG. 12-9 is a sectional view illustrating section B-B of FIG. 12-8.

FIG. 12-10 is a view illustrating one embodiment (fifth embodiment) of the physical quantity detecting device according to the present invention, and is a rear view illustrating the temperature detecting unit provided at the cantilever-shaped portion.

FIG. 12-11 is a sectional view illustrating section B-B of FIG. 12-10.

DESCRIPTION OF EMBODIMENTS

Modes for carrying out the invention (hereinafter, referred to as embodiments) to be described below, have solved various problems demanded for a practical product, and particularly have solved various problems desired for use of a detecting device that detects the physical quantity of inhale air in a vehicle and have achieved various effects. One of the various problems solved in the following embodiments is the content described in the field of Technical Problem described above, and one of the various effects achieved in the following embodiments is the effect described in the field of Advantageous Effects of Invention. The various problems solved in the following embodiments and furthermore the various effects achieved in the following embodiments will be given in the descriptions of the following embodiments. Therefore, the problems solved in the embodiments and the effects, to be described in the following embodiments, include contents other than the content in the field of Technical Problem and the content in the field of Advantageous Effects of Invention.

In the following embodiments, the same reference signs indicate the same configurations regardless of the different figure numbers, and thus the same functional effects are achieved. For already described configurations, in some cases, only the reference signs are denoted in the figures and the descriptions thereof are omitted.

Figure 1:
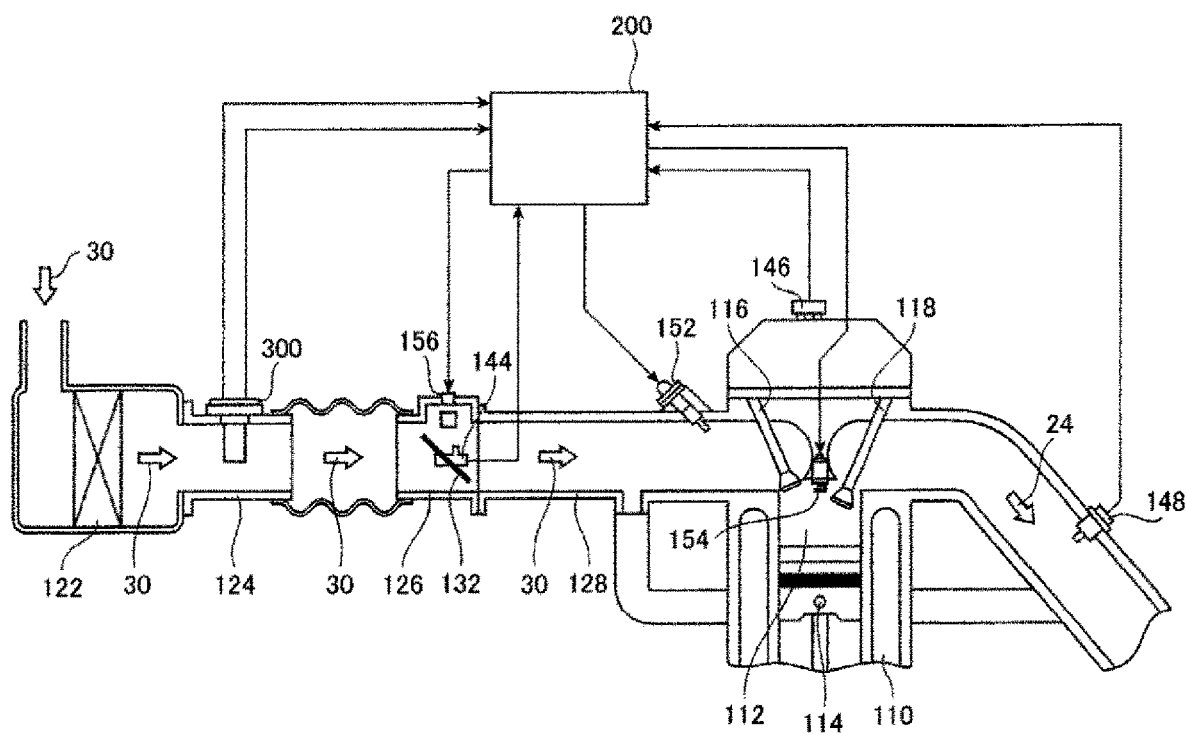
FIG. 1 is a system view illustrating one embodiment in which a physical quantity detecting device according to the present invention is used in an internal-combustion-engine control system.

1. One Embodiment in which Physical Quantity Detecting Device According to Present Invention is Used in Internal-Combustion-Engine Control System FIG. 1 is a system view illustrating one embodiment in which a physical quantity detecting device according to the present invention is used in an electronic-fuel-injection internal-combustion-engine control system. On the basis of the operation of an internal combustion engine 110 including an engine cylinder 112 and an engine piston 114, inhale air is inhaled as gas to be measured 30 from an air cleaner 122 and then is guided to a combustion chamber of the engine cylinder 112 through an intake body that is an example of a main passage 124, a throttle body 126, and an intake manifold 128. The physical quantity of the gas to be measured 30 that is the inhale air to be guided to the combustion chamber, is detected by the physical quantity detecting device 300 according to the present invention. A fuel injection valve 152 supplies fuel on the basis of the detected physical quantity, and the fuel is guided together with the inhale air 30 in air-fuel mixture to the combustion chamber. Note that, in the present embodiment, the fuel injection valve 152 is provided at an intake port of the internal combustion engine. The fuel injected into the intake port forms the air-fuel mixture together with the gas to be measured 30 that is the inhale air. Then, the air-fuel mixture is guided to the combustion chamber through an intake valve 116, and combusts to generate mechanical energy.

The fuel and the air guided in the combustion chamber that are in the mixture state of the fuel and the air, explosively combust due to spark ignition of an ignition plug 154, to generate the mechanical energy. The gas after the combustion is guided from an exhaust valve 118 to an exhaust pipe, and then is discharged as exhaust gas 24 from the exhaust pipe outside a vehicle. The amount of flow of the gas to be measured 30 that is the inhale air to be guided to the combustion chamber, is controlled by a throttle valve 132 in which the degree of opening varies on the basis of an operation of an accelerator pedal. Because the supply of the fuel is controlled on the basis of the amount of flow of the inhale air to be guided to the combustion chamber, an operator controls the degree of opening of the throttle valve 132 to control the amount of flow of the inhale air to be guided to the combustion chamber, so that the mechanical energy to be generated by the internal combustion engine, can be controlled.

1.1 Overview of Control of Internal-Combustion-Engine Control System

The physical quantity detecting device 300 detects physical quantity, such as the amount of flow, the temperature, the humidity, or the pressure of the gas to be measured 30 that is the inhale air flowing in the main passage 124, taken from the air cleaner 122. An electrical signal indicating the physical quantity of the inhale air is input from the physical quantity detecting device 300 to a control device 200. An output of a throttle angle sensor 144 that measures the degree of opening of the throttle valve 132, is input into the control device 200. In addition, in order to measure the positions and the states of the engine piston 114, the intake valve 116, and the exhaust valve 118 in the internal combustion engine, and furthermore the rotational speed of the internal combustion engine, an output of a rotation angle sensor 146 is input into the control device 200. In order to measure the state of the mixture ratio between the amount of the fuel and the amount of the air from the state of the exhaust gas 24, an output of an oxygen sensor 148 is input into the control device 200.

The control device 200 computes the injection amount of the fuel and ignition timing, on the basis of the physical quantity of the inhale air that is the output of the physical quantity detecting device 300 and the rotational speed of the internal combustion engine measured on the basis of the output of the rotation angle sensor 146. On the basis of results of the computation, the amount of the fuel to be supplied from the fuel injection valve 152 and the ignition timing of ignition of the ignition plug 154, are controlled. The supply of the fuel and the ignition timing are in practice further finely controlled, on the basis of temperature detected by the physical quantity detecting device 300, the state of a variation in throttle angle, the state of a variation in engine rotational speed, and the state of an air-fuel ratio measured by the oxygen sensor 148. With the internal combustion engine in idling operation, the control device 200 further controls, with an idle air control valve 156, the amount of the air that bypasses the throttle valve 132, to control the rotational speed of the internal combustion engine in the idling operation.

1.2 Importance of Improvement in Detecting Accuracy of Physical Quantity Detecting Device and On-Board Environment of Physical Quantity Detecting Device The supply of the fuel and the ignition timing that are main controlled variables in the internal combustion engine, are each computed with the output of the physical quantity detecting device 300 as a main parameter. Therefore, improvement in detecting accuracy, inhibition of aging, and improvement in reliability of the physical quantity detecting device 300 are important to improvement in controlling accuracy and ensuring of reliability of the vehicle.

Particularly, in recent years, low fuel consumption of vehicles considerably grows in demand and exhaust gas cleanups considerably grow in demand. It is extremely importance to improve the detecting accuracy for the physical quantity of the inhale air 30 to be detected by the physical quantity detecting device 300, in order to meet these demands. It is significant that the physical quantity detecting device 300 retains high reliability.

The vehicle equipped with the physical quantity detecting device 300, is used in an environment in which a variation in temperature or in humidity is large. For the physical quantity detecting device 300, it is desirable that account is taken of a measure against a variation in temperature or in humidity in the usage environment and a measure against, for example, dust or contaminants.

The physical quantity detecting device 300 is attached to an intake pipe to be affected by influence of heat generation from the internal combustion engine. Thus, the heat generation of the internal combustion engine travels to the physical quantity detecting device 300 through the intake pipe that is the main passage 124. Because the physical quantity detecting device 300 performs heat transfer with the gas to be measured, to detect the amount of flow of the gas to be measured, it is important to inhibit influence of heat from outside as much as possible.

As to be described below, the physical quantity detecting device 300 mounted on the vehicle not only solves the problem in the field of Technical Problem and achieves the effect described in the field of Advantageous Effects of Invention, as to be described below, but also solves various problems demanded for a product in sufficient consideration of the various problems described above, and achieves various effects. Specific problems and specific effects that the physical quantity detecting device 300 solves and achieves will be given in the descriptions of the following embodiments.

2. Configuration of Physical Quantity Detecting Device 300

2.1 External Structure of Physical Quantity Detecting Device 300

FIGS. 2-1 to 2-6 are views each illustrating the external appearance of the physical quantity detecting device 300. FIGS. 2-1, 2-2, 2-3, 2-4, 2-5, and 2-6 are a front view, a rear view, a left side view, a right side view, a plan view, and a bottom view of the physical quantity detecting device 300, respectively.

The physical quantity detecting device 300 includes a housing 302, a front cover 303, and a back cover 304. The housing 302 including synthetic-resin material applied with mold forming, has: a flange 311 for securing the physical quantity detecting device 300 to the intake body that is the main passage 124; an external connecting unit 321 protruding from the flange 311, the external connecting unit 321 having a connector for connecting with external equipment, electrically; and a measurement unit 331 extending such that the measurement unit 331 protrudes from the flange 311 to the center of the main passage 124.

Figures 1, 2:
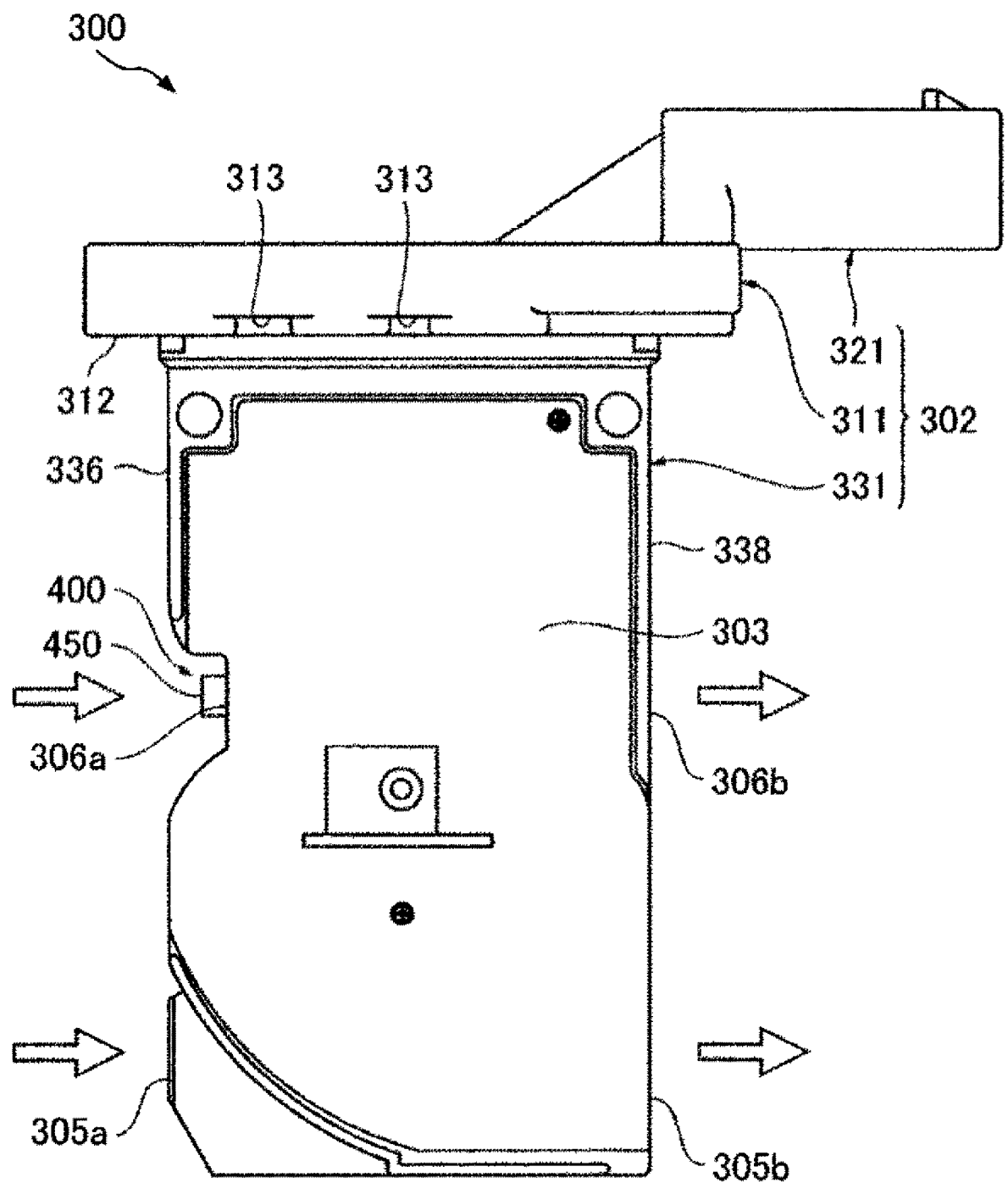
Figure 2:
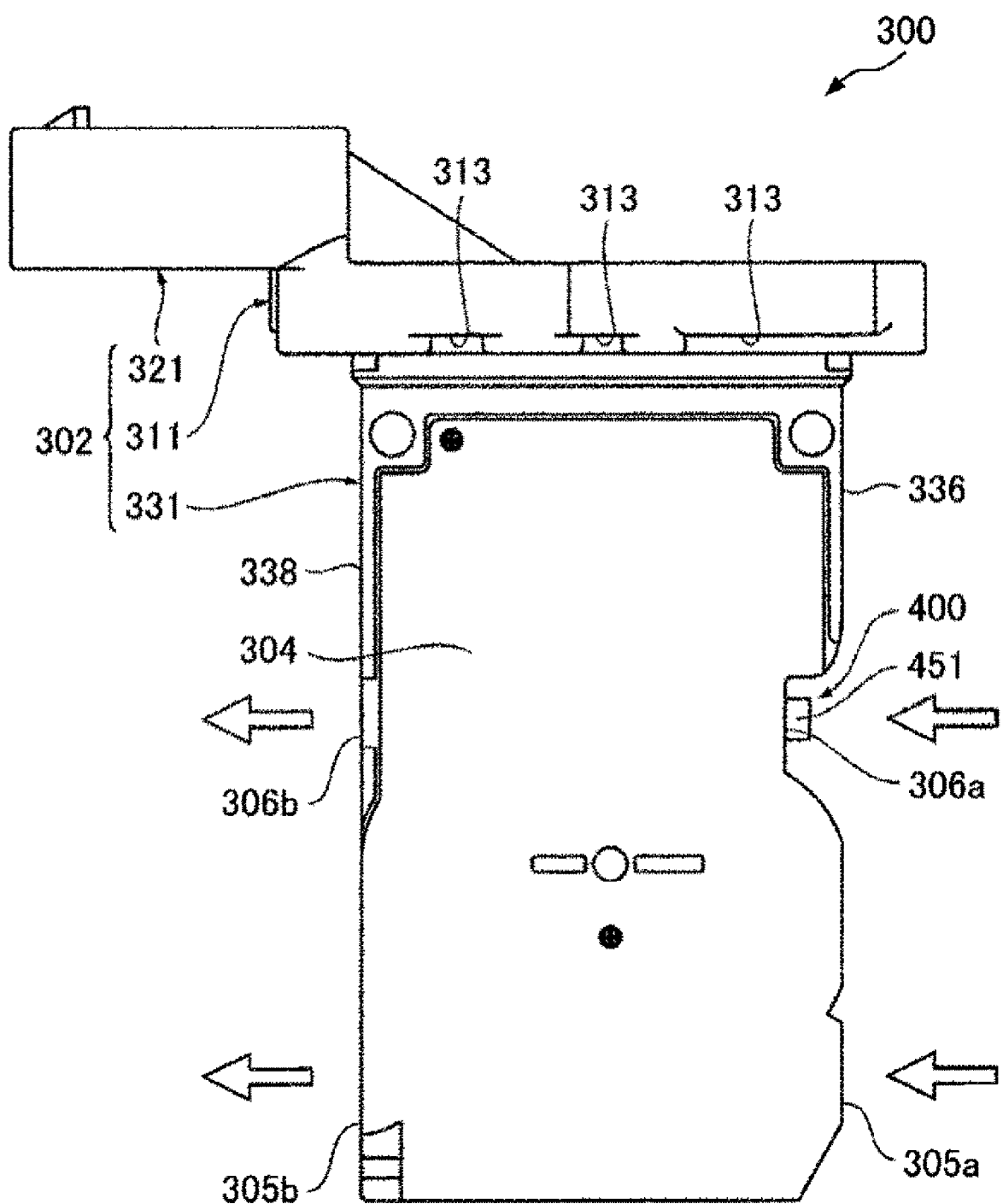
Figures 2, 3:
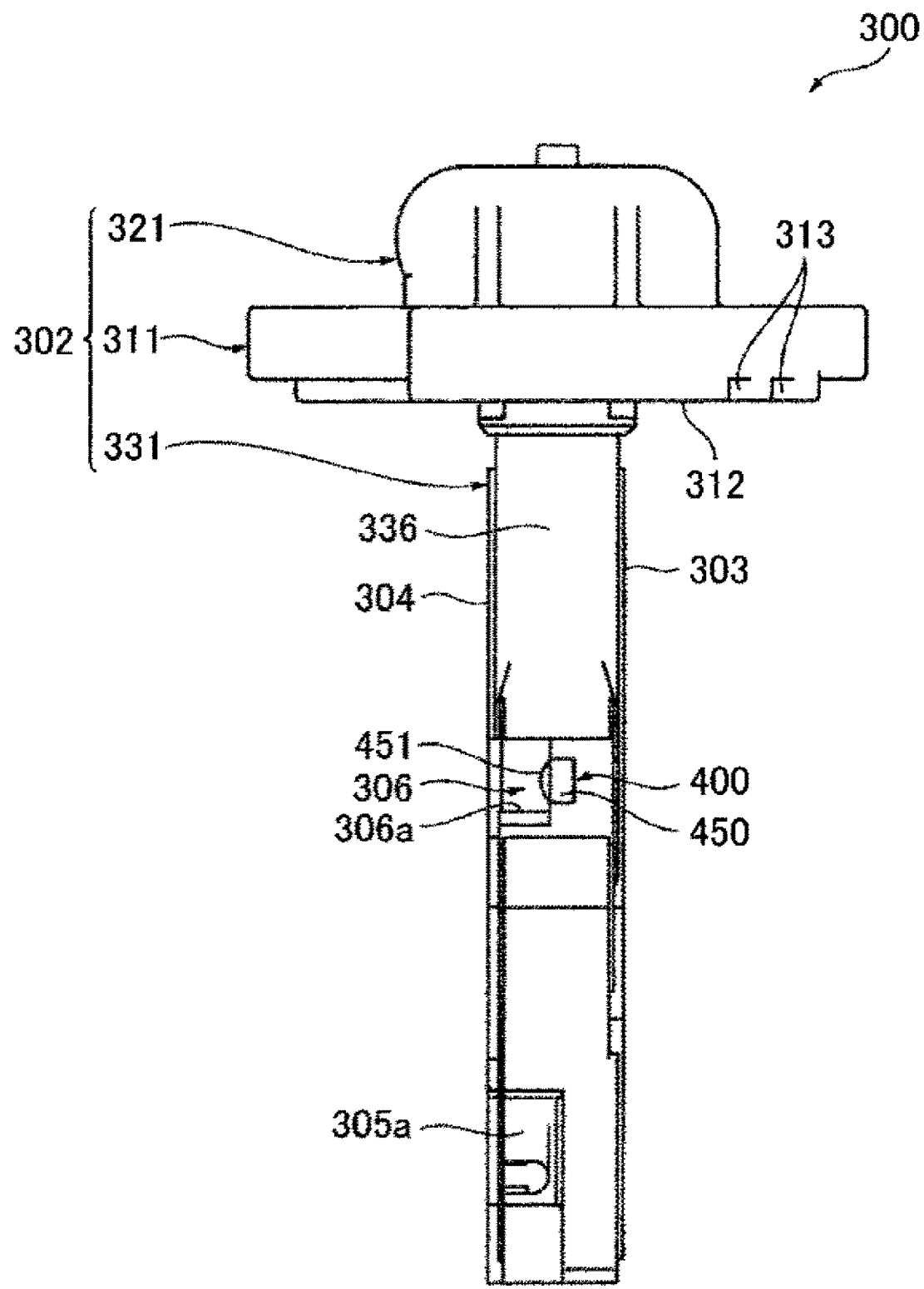

The measurement unit 331 is provided integrally with a circuit board 400 due to insert forming in applying the mold forming to the housing 302 (refer to FIGS. 3-1 and 3-2). The circuit board 400 is provided with: at least one detecting unit that detects the physical quantity of the gas to be measured 30 flowing in the main passage 124; and a circuit unit that processes a signal detected by the detecting unit. The detecting unit is disposed at a position to be exposed to the gas to be measured 30, and the circuit unit is disposed in a circuit room tightly sealed by the front cover 303.

The front face and the back face of the measurement unit 331 are each provided with a sub-passage groove, and a first sub-passage 305 is formed by the sub-passage grooves in cooperation with the front cover 303 and the back cover 304. The leading end portion of the measurement unit 331 is provided with: a first sub-passage inlet 305a for taking part of the gas to be measured 30, such as the inhale air, into the first sub-passage 305; and a first sub-passage outlet 305b for returning the gas to be measured 30 from the first sub-passage 305 to the main passage 124. Part of the circuit board 400 protrudes at a midway passage of the first sub-passage 305, and a flow-amount detecting unit 602 that is a detecting unit is disposed at the protrusion (refer to FIG. 3-1) and detects the amount of flow of the gas to be measured 30.

A second sub-passage 306 for taking part of the gas to be measured 30, such as the inhale air, into a sensor room Rs, is provided at an intermediate portion of the measurement unit 331 closer to the flange 311 with respect to the first sub-passage 305. The second sub-passage 306 is formed by the measurement unit 331 and the back cover 304 in cooperation. The second sub-passage 306 has: a second sub-passage inlet 306a open at an upstream-side outer wall 336 in order to take in the gas to be measured 30; and a second sub-passage outlet 306b open at a downstream-side outer wall 338 in order to return the gas to be measured 30 from the second sub-passage 306 to the main passage 124. The second sub-passage 306 is in communication with the sensor room Rs formed on the rear face side of the measurement unit 331. A pressure sensor and a humidity sensor that are detecting units provided on the back face of the circuit board 400, are disposed in the sensor room Rs.

2.2 Effect Based on External Structure of Physical Quantity Detecting Device 300

The physical quantity detecting device 300 has: the second sub-passage inlet 306a provided at the intermediate portion in the measurement unit 331 extending from the flange 311 to the center of the main passage 124; and the first sub-passage inlet 305a provided at the leading end portion of the measurement unit 331. Therefore, the gas not in the neighborhood of the inner wall face of the main passage 124 but in an area near to a center portion away from the inner wall face, can be taken in each of the first sub-passage 305 and the second sub-passage 306. Therefore, the physical quantity detecting device 300 can measure the physical quantity of the gas in the area away from the inner wall face of the main passage 124, so that a measurement error in the physical quantity can be reduced, the measurement error being related to heat or a reduction in flow rate in the neighborhood of the inner wall face.

Figures 2, 3, 4:
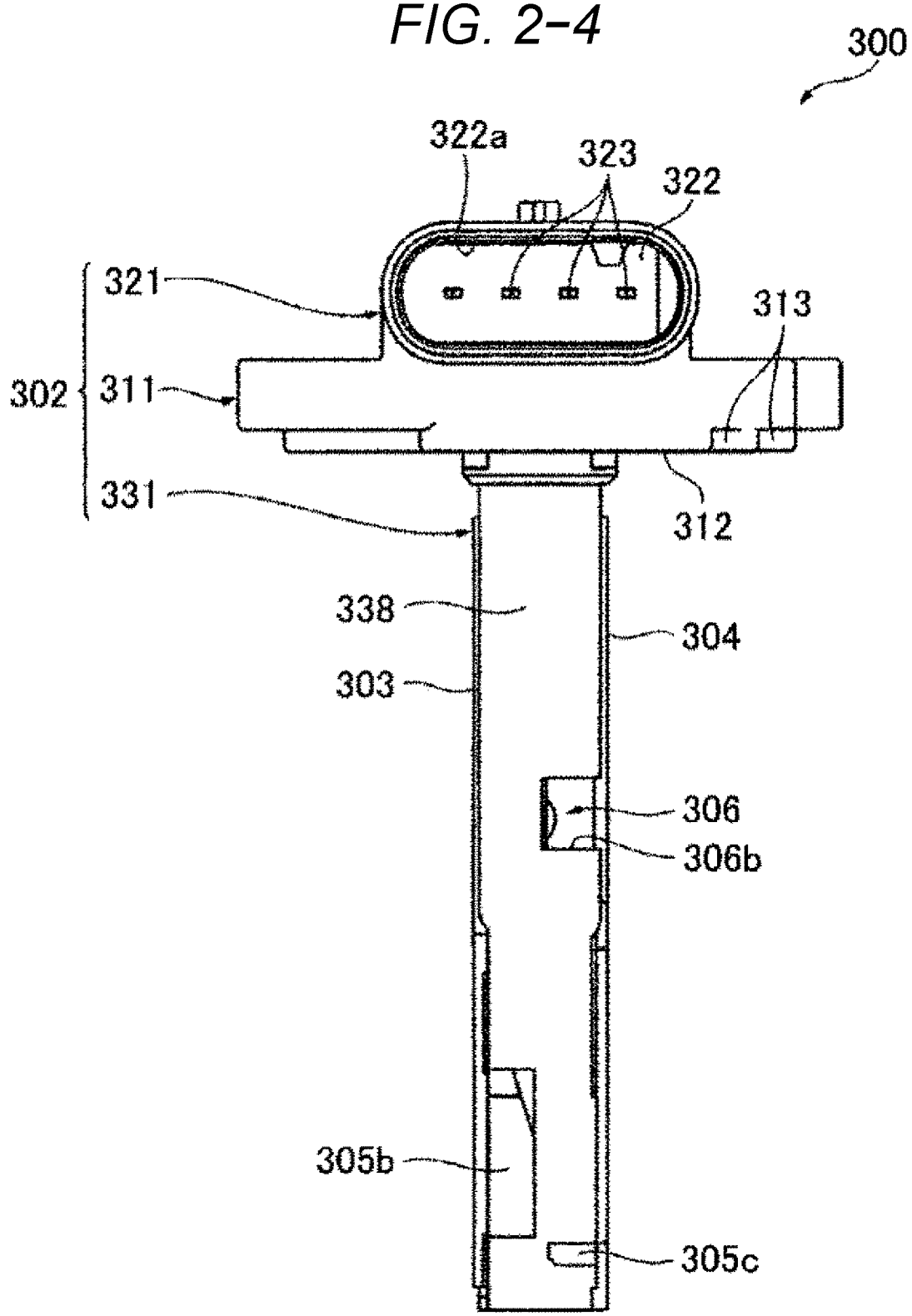

The measurement unit 331 has an elongate shape along an axis from the outer wall to the center of the main passage 124, and the width in thickness has a narrow shape as illustrated in FIGS. 2-3 and 2-4. That is the measurement unit 331 of the physical quantity detecting device 300 has: a front face having a substantially rectangular shape; and side faces thin in width. This arrangement enables the physical quantity detecting device 300 to have the first sub-passage 305 that is sufficient in length and to suppress fluid resistance to the gas to be measured 30, into a small value. Thus, the physical quantity detecting device 300 can highly accurately measure the amount of flow of the gas to be measured 30 with the fluid resistance suppressed in the small value.

2.5 Structure and Effect of Flange 311

Because the flange 311 has a plurality of hollows 313 provided on a bottom face 312 opposed to the main passage 124, the heat-transfer face between the flange 311 and the main passage 124 is reduced, so that the physical quantity detecting device 300 is less likely to be affected by influence of heat. The physical quantity detecting device 300 has the measurement unit 331 inserted inward from an attachment hole provided at the main passage 124, and the bottom face 312 of the flange 311 is opposed to the main passage 124. The main passage 124 includes, for example, an intake body, and the main passage 124 is often retained at high temperature. Conversely, it is thought that the main passage 124 has extremely low temperature during activation in a cold district. When the state of the main passage 124 at the high temperature or the low temperature has influence on measurement of various physical quantities, measuring accuracy deteriorates. Because the flange 311 has the hollows 313 on the bottom face 312, spaces are formed between the bottom face 312 opposed to the main passage 124 and the main passage 124. Therefore, heat transfer from the main passage 124 to the physical quantity detecting device 300 is reduced, so that the measuring accuracy can be prevented from deteriorating due to the heat.

Threaded holes 314 of the flange 311 are for securing the physical quantity detecting device 300 to the main passage 124, and a space is formed between a face opposed to the main passage 124 on the periphery of each threaded hole 314 and the main passage 124 such that the faces opposed to the main passage 124 on the periphery of the threaded holes 314 are spaced away from the main passage 124. This arrangement achieves a structure in which reduction of the heat transfer from the main passage 124 to the physical quantity detecting device 300 can prevent the measuring accuracy from deteriorating due to the heat.

2.6 Structure of External Connecting Unit 321

The external connecting unit 321 has the connector 322 provided on the top face of the flange 311, the connector 322 protruding from the flange 311 to the downstream side in the flow direction of the gas to be measured 30. The connector 322 is provided with a socket 322a into which a communication cable is to be plugged, the communication cable being to connect the connector 322 with the control device 200. The inside of the socket 322a is provided with four external terminals 323, as illustrated in FIG. 2-4. The external terminals 323 serve as a terminal for outputting information regarding the physical quantity that is a measured result of the physical quantity detecting device 300 and as a power-supply terminal for supplying direct-current power with which the physical quantity detecting device 300 operates.

The connector 322 protrudes from the flange 311 to the downstream side in the flow direction of the gas to be measured 30 and has a shape to be plugged in from the downstream side to the upstream side in the flow direction, but is not limited to the shape. For example, the connector 322 may protrude vertically from the top face of the flange 311 and may have a shape to be plugged along the extending direction of the measurement unit 331, and thus various alterations can be made.

3. Entire Structure of Housing 302 and Effect Thereof

Next, the entire structure of the housing 302 will be described with FIGS. 3-1 to 3-5. FIGS. 3-1 to 3-5 are views each illustrating the housing 302 in the physical quantity detecting device 300 having the front cover 303 and the back cover 304 removed. FIGS. 3-1, 3-2, 3-3, 3-4, and 3-5 are a front view of the housing 302, a rear view of the housing 302, a right side view of the housing 302, a left side view of the housing 302, and a sectional view taken along line A-A of FIG. 3-1, respectively.

The housing 302 has a structure in which the measurement unit 331 extends from the flange 311 to the center of the main passage 124. The circuit board 400 subjected to the insert forming, is provided on the base end side of the measurement unit 331. The circuit board 400 is disposed at an intermediate position between the front face and the back face of the measurement unit 331, parallel to the faces of the measurement unit 331, the circuit board 400 being integrally molded with the housing 302, the circuit board 400 segmenting the base end side of the measurement unit 331 into one side and the other side in the thickness direction.

The circuit room Rc is formed on the front face side of the measurement unit 331, the circuit room Rc housing the circuit unit of the circuit board 400. The sensor room Rs is formed on the back face side, the sensor room Rs housing the pressure sensor 421 and the humidity sensor 422. The circuit room Rc is tightly sealed by attachment of the front cover 303 to the housing 302, and then is completely isolated from outside. Meanwhile, attachment of the back cover 304 to the housing 302 forms the second sub-passage 306 and the sensor room Rs that is an in-room space in communication with the outside of the measurement unit 331 through the second sub-passage 306. The part of the circuit board 400 protrudes from a partition wall 335 separating the circuit room Rc and the first sub-passage 305 of the measurement unit 331, into the first sub-passage 305, and the flow-amount detecting unit 602 is provided on a measurement flow-passage face 430 of the protrusion.

3.2 Structure of Sub-Passage Groove

A sub-passage groove for forming the first sub-passage 305, is provided on the leading end side in the length direction of the measurement unit 331. The sub-passage groove for forming the first sub-passage 305 has a front-side sub-passage groove 332 illustrated in FIG. 3-1 and a back-side sub-passage groove 334 illustrated in FIG. 3-2. As illustrated in FIG. 3-1, the front-side sub-passage groove 332 bends gradually to the flange 311 side that is the base end side of the measurement unit 331 as the front-side sub-passage groove 332 leads from the first sub-passage outlet 305b open at the downstream-side outer wall 338 of the measurement unit 331, to the upstream-side outer wall 336. The front-side sub-passage groove 332 is in communication with an opening portion 333 penetrating in the thickness direction of the measurement unit 331, at a position in the neighborhood of the upstream-side outer wall 336. The opening portion 333 is formed along the flow direction of the gas to be measured 30 in the main passage 124 such that the opening portion 333 extends across between the upstream-side outer wall 336 and the downstream-side outer wall 338.

As illustrated in FIG. 3-2, the back-side sub-passage groove 334 leads from the upstream-side outer wall 336 to the downstream-side outer wall 338, and branches into two parts at an intermediate position between the upstream-side outer wall 336 and the downstream-side outer wall 338. One part extends straight as a discharge passage, remaining intact, and has an opening at a discharge outlet 305c of the downstream-side outer wall 338. The other part bends gradually to the flange 311 side that is the base end side of the measurement unit 331 as the other part leads to the downstream-side outer wall 338, and is in communication with the opening portion 333 at a position in the neighborhood of the downstream-side outer wall 338.

The back-side sub-passage groove 334 forms an inlet groove into which the gas to be measured 30 flows from the main passage 124, and the front-side sub-passage groove 332 forms an outlet groove from which the gas to be measured 30 taken from the back-side sub-passage groove 334 returns to the main passage 124. Because the front-side sub-passage groove 332 and the back-side sub-passage groove 334 are provided at the leading end portion of the housing 302, the gas in the area away from the inner wall face of the main passage 124, in other words, the gas flowing in the area near the center portion of the main passage 124 can be taken in as the gas to be measured 30. The gas flowing in the neighborhood of the inner wall face of the main passage 124 is affected by influence of the wall-face temperature of the main passage 124, and thus often has a temperature different from the average temperature of the gas flowing in the main passage 124, such as the inhale air 20. The gas flowing in the neighborhood of the inner wall face of the main passage 124 often indicates a flow rate slower than the average flow rate of the gas flowing in the main passage 124. Because the physical quantity detecting device 300 in the embodiment is less likely to be affected by the influence, the measuring accuracy can be inhibited from deteriorating.

As illustrated in FIG. 3-2, part of the gas to be measured 30 flowing in the main passage 124 is taken from the first sub-passage inlet 305a into the back-side sub-passage groove 334, and flows in the back-side sub-passage groove 334. Then, foreign substances large in mass included in the gas to be measured 30 flow together with partial gas to be measured, from the branch into the discharge passage extending straight and remaining intact, and then are discharged from the discharge outlet 305c of the downstream-side outer wall 338 to the main passage 124.

Because the back-side sub-passage groove 334 has a shape deepening as leading, the gas to be measured 30 gradually moves to the front side of the measurement unit 331 as flowing along the back-side sub-passage groove 334. Particularly, the back-side sub-passage groove 334 is provided with a steep slope portion 334a deepening rapidly on the near side of the opening portion 333, and part of the air small in mass moves along the steep slope portion 334a and then flows on the measurement flow-passage face 430 side of the circuit board 400 in the opening portion 333. Meanwhile, foreign substances large in mass have difficulty in changing a course rapidly and thus flow on the measurement-flow-passage-face back face 431 side.

As illustrated in FIG. 3-1, the gas to be measured 30 moved on the front side in the opening portion 333, flows along the measurement flow-passage face 430 of the circuit board, and heat transfer is performed between the gas to be measured 30 and the flow-amount detecting unit 602 provided on the measurement flow-passage face 430, so that the amount of flow is measured. The air flowed from the opening portion 333 to the front-side sub-passage groove 332, flows together along the front-side sub-passage groove 332, and then is discharged from the first sub-passage outlet 305b open at the downstream-side outer wall 338 to the main passage 124.

Because substances large in mass, such as waste mixing with the gas to be measured 30, have large inertial force, the substances have difficulty in changing a course rapidly along the front-face portion of the steep slope portion 334a having a groove increasing rapidly in depth, in the deep direction of the groove. Thus, the foreign substances large in mass move to the measurement-flow-passage-face back face 431 side, so that the foreign substances can be inhibited from passing by the flow-amount detecting unit 602. In the present embodiment, because a number of foreign substances large in mass other than the gas pass through the measurement-flow-passage-face back face 431 that is the rear face of the measurement flow-passage face 430, influence of pollution due to foreign substances, such as oil content, carbon, and waste, can be reduced and the measuring accuracy can be inhibited from deteriorating. That is, because provided is the shape in which the course of the gas to be measured 30 changes rapidly along an axis across the stream axis of the main passage 124, influence of the foreign substances mixing with the gas to be measured 30 can be reduced.

3.3 Structures and Effects of Second Sub-Passage and Sensor Room

The second sub-passage 306 is formed straight across from the second sub-passage inlet 306a to the second sub-passage outlet 306b, parallel to the flange 311 along the flow direction of the gas to be measured 30. The second sub-passage inlet 306a is formed by cutting away part of the upstream-side outer wall 336, and the second sub-passage outlet 306b is formed by cutting away part of the downstream-side outer wall 338. Specifically, as illustrated in FIG. 3-3, the second sub-passage inlet 306a is formed by cutting away the part of the upstream-side outer wall 336 and the part of the downstream-side outer wall 338, from the back face side of the measurement unit 331, at positions continuing along the top face of a partition wall 335. The second sub-passage inlet 306a and the second sub-passage outlet 306b are each cut away by a position in depth flush with the back face of the circuit board 400. Because the gas to be measured 30 passes along the back face of a board body 401 of the circuit board 400, the second sub-passage 306 functions as a cooling channel that cools the board body 401. The circuit board 400 having a number of elements, such as an LSI and a microcomputer, that generate heat, transfers the heat to the back face of the board body 401, and then heat dissipation can be performed by the gas to be measured 30 passing through the second sub-passage 306.

The sensor room Rs is provided on the base end side the measurement unit 331 with respect to the second sub-passage 306. The gas to be measured 30 flowed from the second sub-passage inlet 306a into the second sub-passage 306, partially flows into the sensor room Rs, and the pressure and the relative humidity are detected by the pressure sensor 421 and the humidity sensor 422 in the sensor room Rs, respectively. Because the sensor room Rs is disposed on the base end side of the measurement unit 331 with respect to the second sub-passage 306, influence of the dynamic pressure of the gas to be measured 30 passing through the second sub-passage 306, can be reduced. Therefore, the detecting accuracy of the pressure sensor 421 in the sensor room Rs, can improve.

Because the sensor room Rs is disposed on the base end side of the measurement unit 331 with respect to the second sub-passage 306, for example, in a case where the measurement unit 331 having an attitude in which the leading end side is downward is attached to the intake passage, pollutants or water droplets flowed together with the gas to be measured 30 into the second sub-passage 306, can be inhibited from adhering to the pressure sensor 421 or adhering to the humidity sensor 422 disposed downstream thereof.

Particularly, according to the present embodiment, because the pressure sensor 421 having a relatively large external form is disposed on the upstream side and the humidity sensor 422 having a relatively small external form is disposed on the downstream side of the pressure sensor 421 in the sensor room Rs, pollutants or water droplets flowed together with the gas to be measured 30 adhere to the pressure sensor 421 and thus are inhibited from adhering to the humidity sensor 422. Therefore, the humidity sensor 422 having low resistance against the pollutants or the water droplets, can be protected.

The pressure sensor 421 and the humidity sensor 422 are less likely to be affected by the flow of the gas to be measured 30 than the flow-amount detecting unit 602 is, and particularly the humidity sensor 422 is required at least to ensure the diffusion level of moisture in the gas to be measured 30. Thus, the pressure sensor 421 and the humidity sensor 422 can be provided in the sensor room Rs adjacent to the straight second sub-passage 306. In contrast to this, the flow-amount detecting unit 602 needs a certain flow rate or more. In addition, it is necessary to keep dust or pollutants apart or it is necessary to take influence of pulsation into account. Therefore, the flow-amount detecting unit 602 is provided in the first sub-passage 305 having a shape circling in a loop.

FIGS. 4-1 and 4-2 are views illustrating another embodiment of the second sub-passage.

In the embodiment, instead of cutting away the upstream-side outer wall 336 and the downstream-side outer wall 338, provision of a through hole 337 to each of the upstream-side outer wall 336 and the downstream-side outer wall 338 forms the second sub-passage inlet 306a and the second sub-passage outlet 306b. Similarly to the second sub-passage illustrated in FIGS. 3-2 to 3-5 described above, if cutting away each of the upstream-side outer wall 336 and the downstream-side outer wall 338 forms the second sub-passage inlet 306a and the second sub-passage outlet 306b, because the width of the upstream-side outer wall 336 and the width of the downstream-side outer wall 338 are locally narrow at the positions, there is a risk that the measurement unit 331 deforms in a substantially V shape at the cut-away parts as a point of origin, for example, due to heat sink marks during the mold forming. According to the present embodiment, because of the provision of the through holes instead of the cut-away parts, the measurement unit 331 can be prevented from warping in a substantially V shape. Therefore, the detecting accuracy can be prevented from being affected by a variation in the position or orientation of each detecting unit to the gas to be measured 30 due to deformation of the housing 302, so that the detecting accuracy that is always constant can be ensured with no individual difference.

FIGS. 8-1, 8-2, and 8-3 are views illustrating other embodiments of the second sub-passage.

The back cover 304 may be provided with a segmentation wall that segments the second sub-passage 306 and the sensor room Rs. The configuration enables the gas to be measured 30 to flow indirectly from the second sub-passage 306 to the sensor room Rs, so that influence of the dynamic pressure on the pressure sensor can be reduced and pollutants or water droplets can be inhibited from adhering to the humidity sensor.

Figure 8:
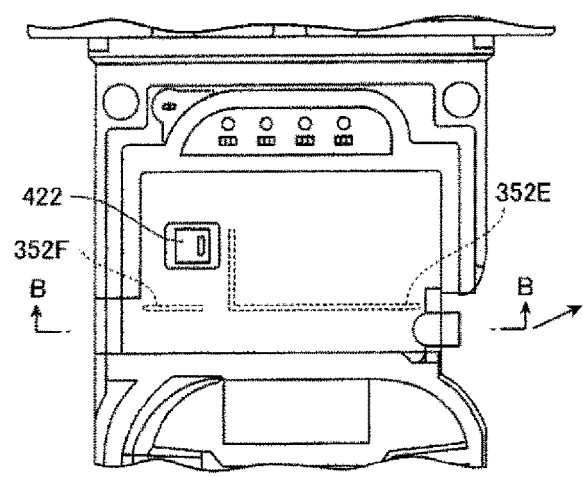
Figure 3:
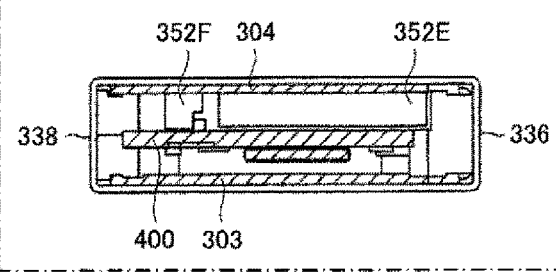

In the example illustrated in FIG. 8-1, two pressure sensors 421A and 421B are provided in a line along the second sub-passage 306 in the sensor room Rs, and one humidity sensor 422 is provided downstream thereof. Segmentation walls 352A and 352B are provided at the back cover 304, and attachment of the back cover 304 to the housing 302 disposes the segmentation walls 352A and 352B such that the segmentation walls 352A and 352B extend between the second sub-passage 306 and the sensor room Rs. Specifically, the segmentation wall 352A is disposed between the pressure sensor on the upstream side and the upstream wall of the sensor room Rs, and the segmentation wall 352B is disposed along the humidity sensor across from the pressure sensor on the downstream side to the downstream wall of the sensor room Rs.

The example illustrated in FIG. 8-2, indicates a specification in which only the pressure sensor 421B on the downstream side is provided and the pressure sensor 421A on the upstream side is omitted, and thus a segmentation wall 352c is long by the omission. A segmentation wall 352D on the downstream side is disposed along the humidity sensor across from the pressure sensor on the downstream side to the downstream wall of the sensor room Rs, similarly to the segmentation wall 352B of FIG. 8-1. Therefore, the segmentation walls 352A and 352C can cause the gas to be measured 30 not to hit the pressure sensors directly, so that the influence of the dynamic pressure can be reduced. The segmentation walls 352B and 352D can inhibit the pollutants or water droplets from adhering to the humidity sensor.

The example illustrated in FIG. 8-3, indicates a specification in which both of the two pressure sensors 421A and 421B are omitted, and only one humidity sensor 422 is provided in the sensor room Rs. A segmentation wall 352E on the upstream side has a substantially L shape extending from the upstream wall of the sensor room Rs to the upstream position of the humidity sensor along between the second sub-passage 306 and the sensor room Rs, the substantially L shape warping at a downstream end, the substantially L shape being opposed to the upstream side of the humidity sensor. A segmentation wall 352F is disposed along the humidity sensor across from the pressure sensor on the downstream side to the downstream wall of the sensor room Rs, similarly to the segmentation walls 352B and 352D. Therefore, the segmentation wall 352E can prevent the pollutants or water droplets included in the gas to be measured 30 passing through the second sub-passage 306, from moving to the humidity sensor, so that the humidity sensor can be protected against the pollutants, for example.

3.4 Shapes and Effects of Front Cover 303 and Back Cover 304

Figures 2, 3, 4, 5:
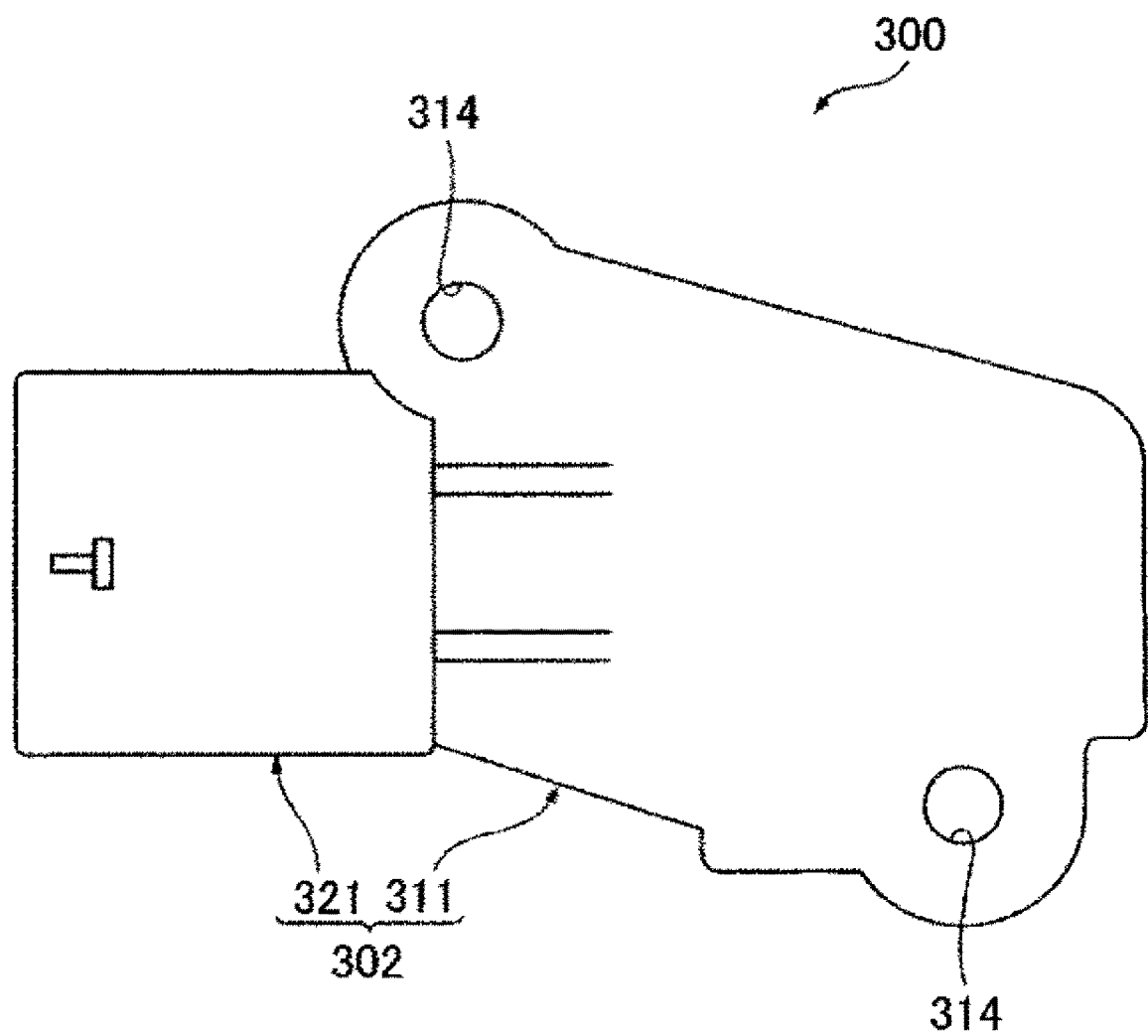
Figures 2, 3, 4, 5, 6:
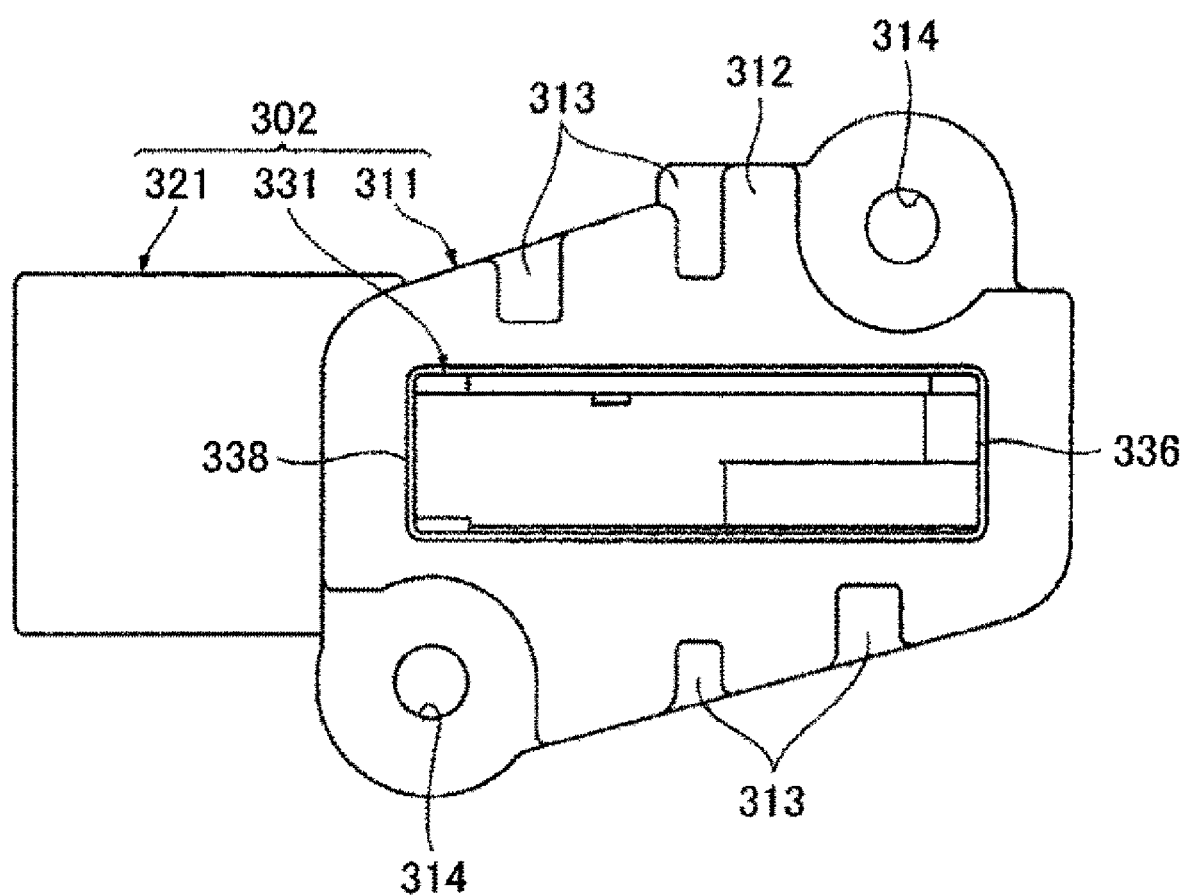
Figures 1, 3:
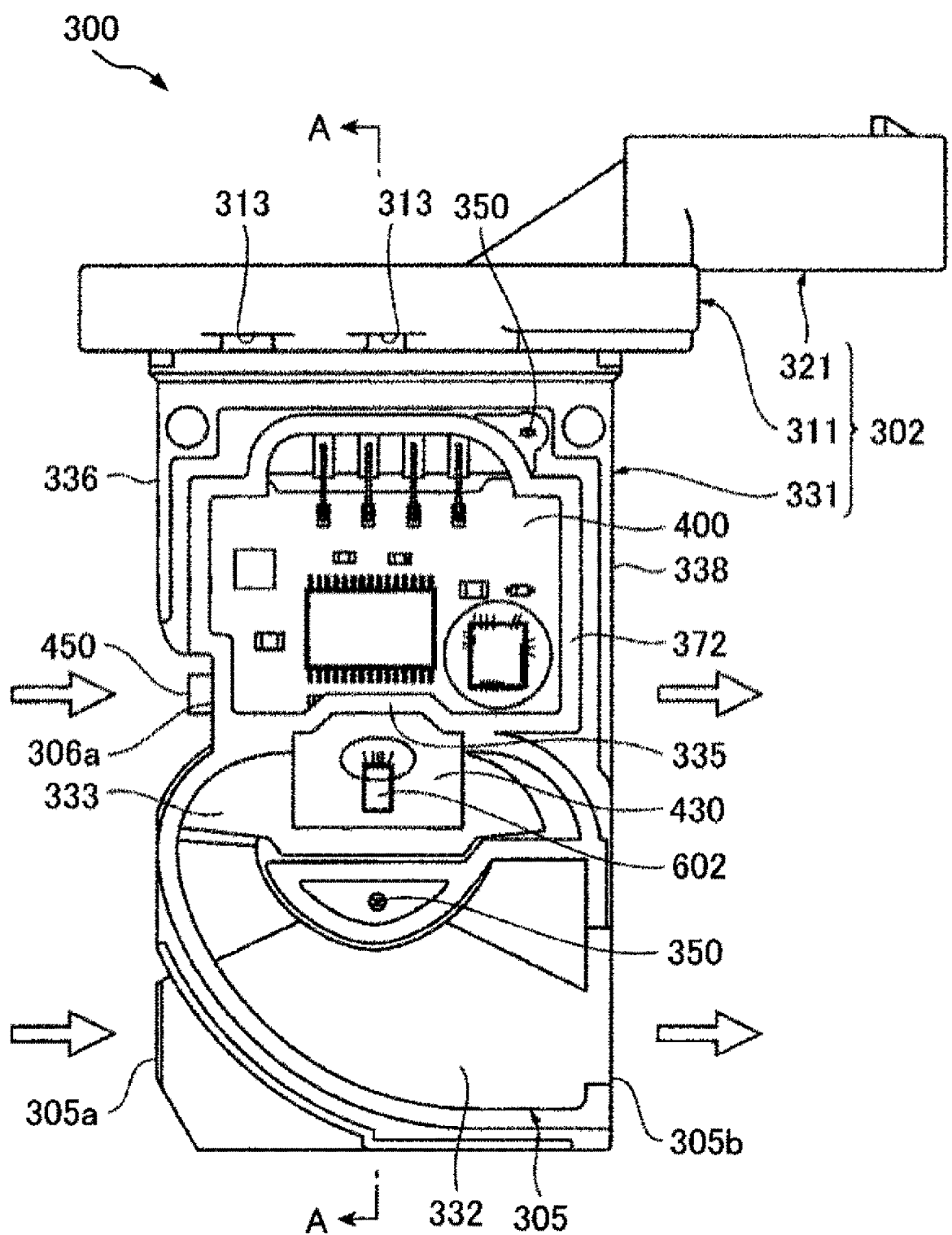
Figures 2, 3:
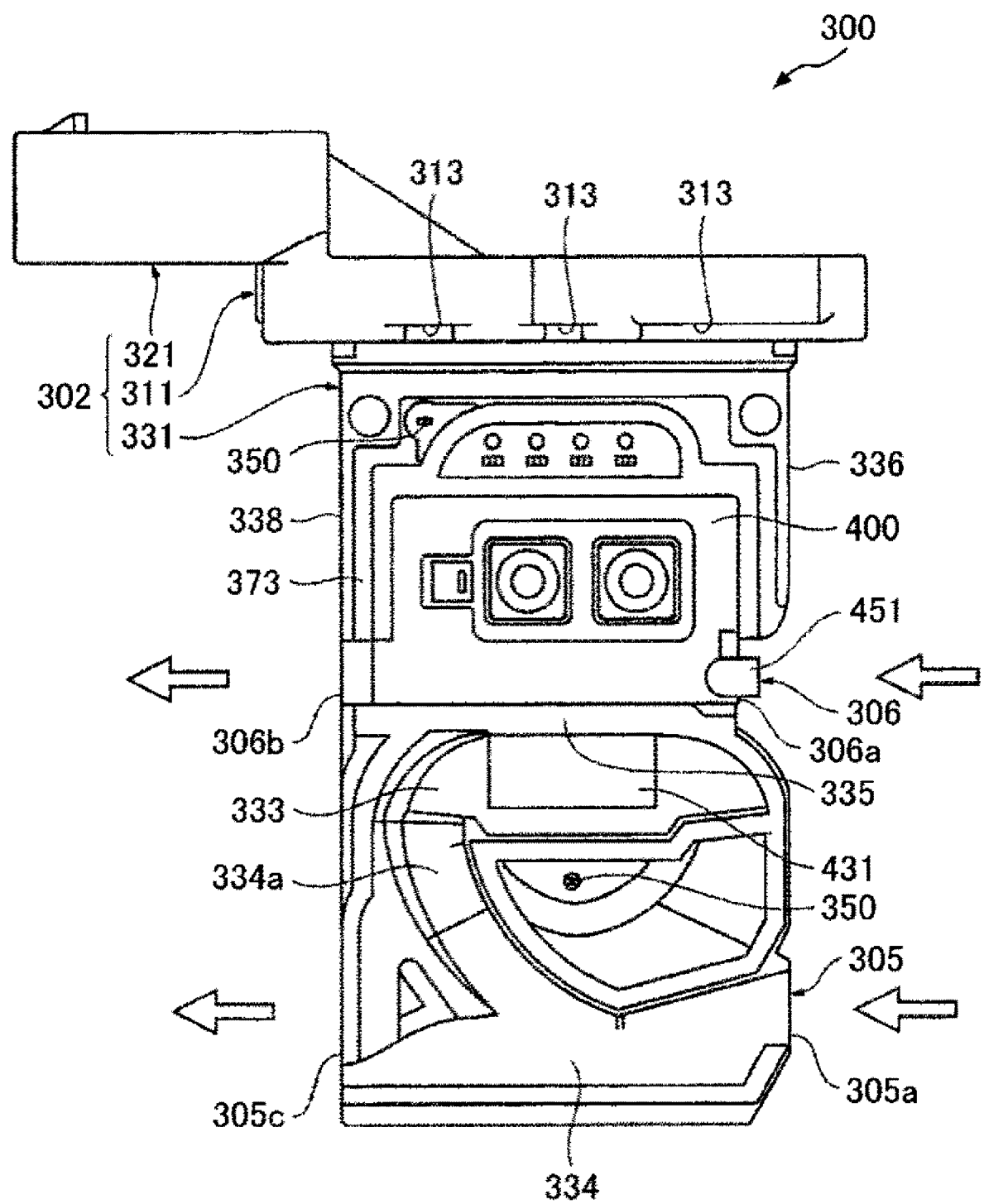
Figure 3:
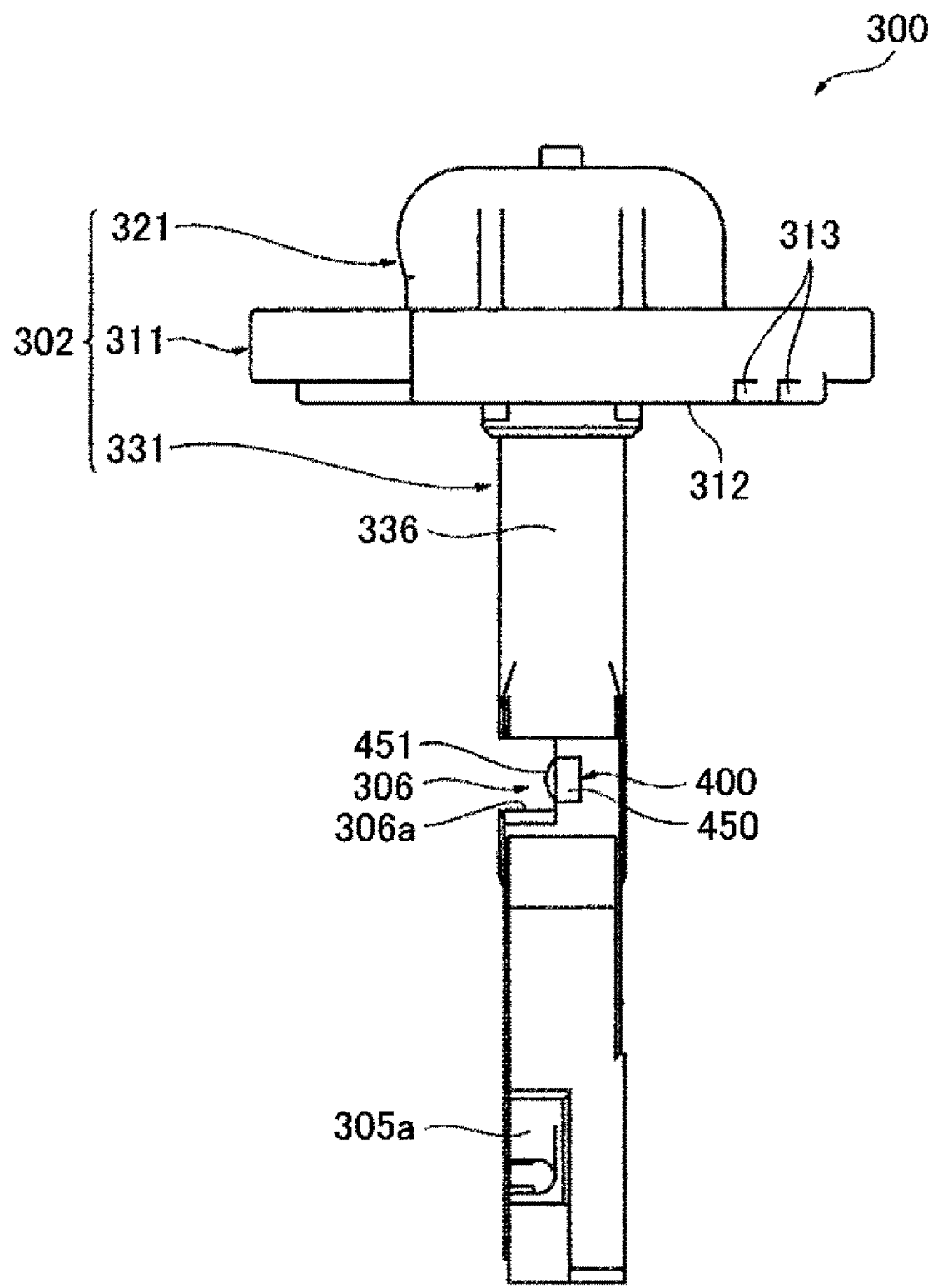
Figures 3, 4:
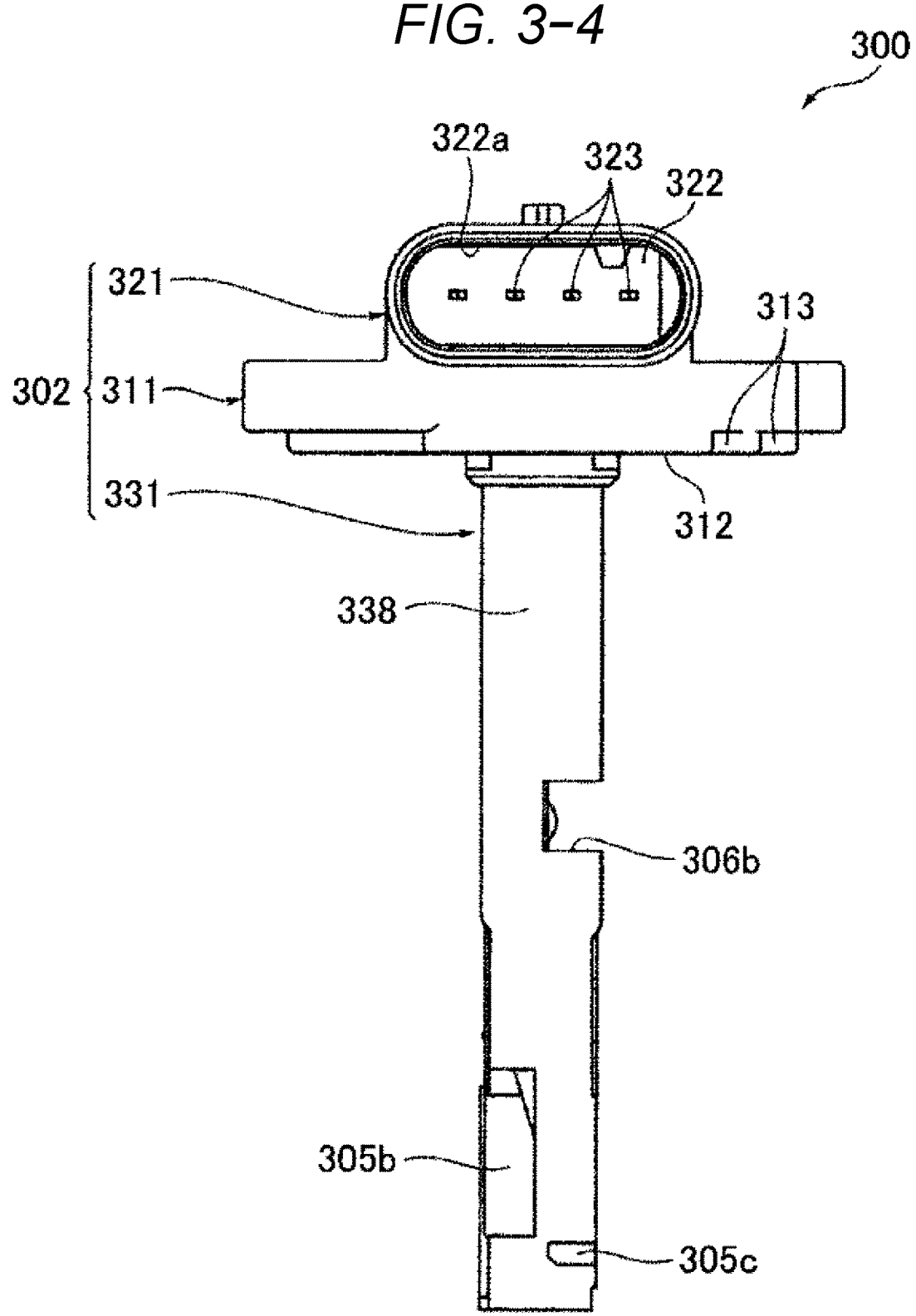
Figures 3, 4, 5:
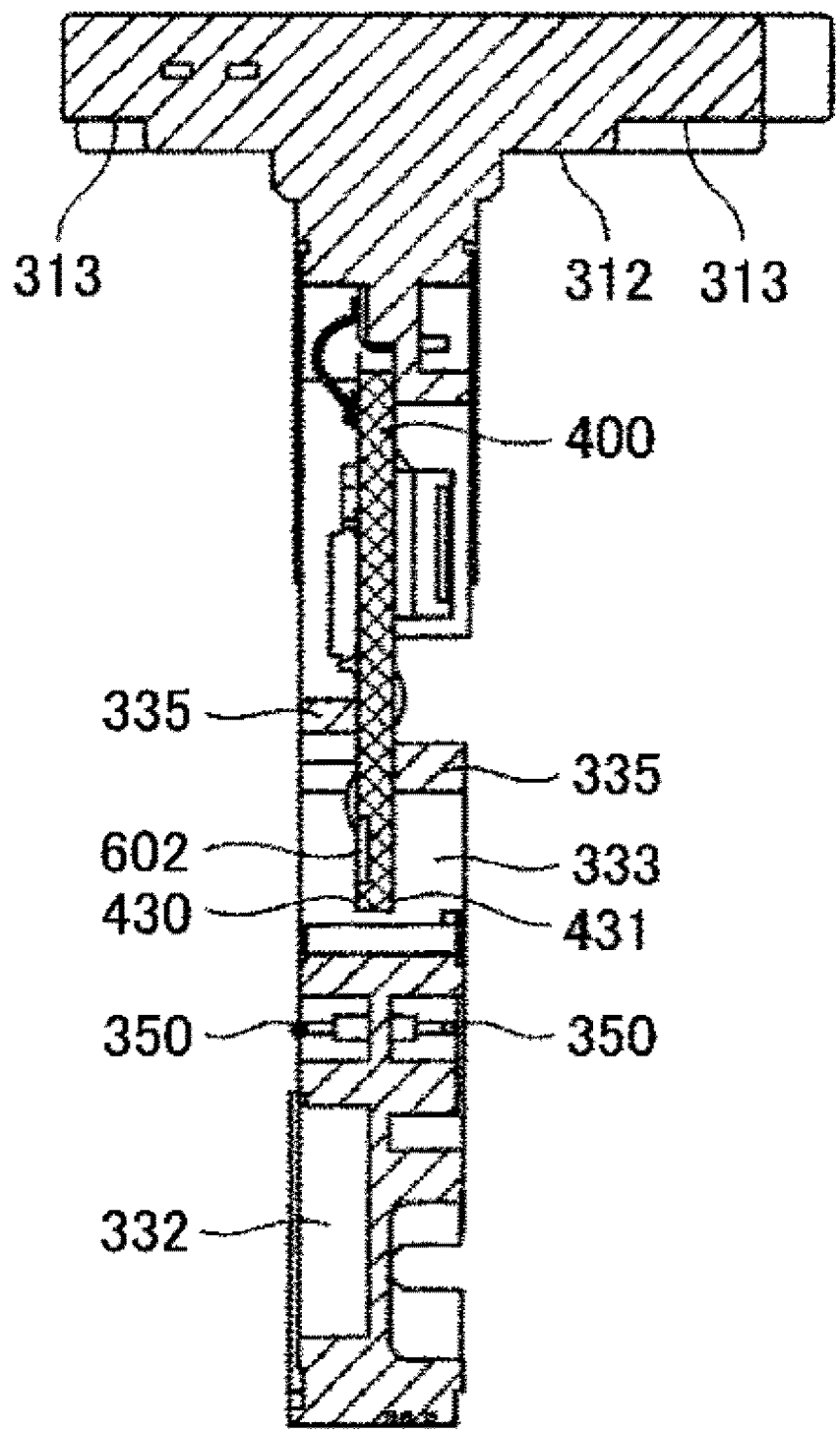
Figures 1, 4:
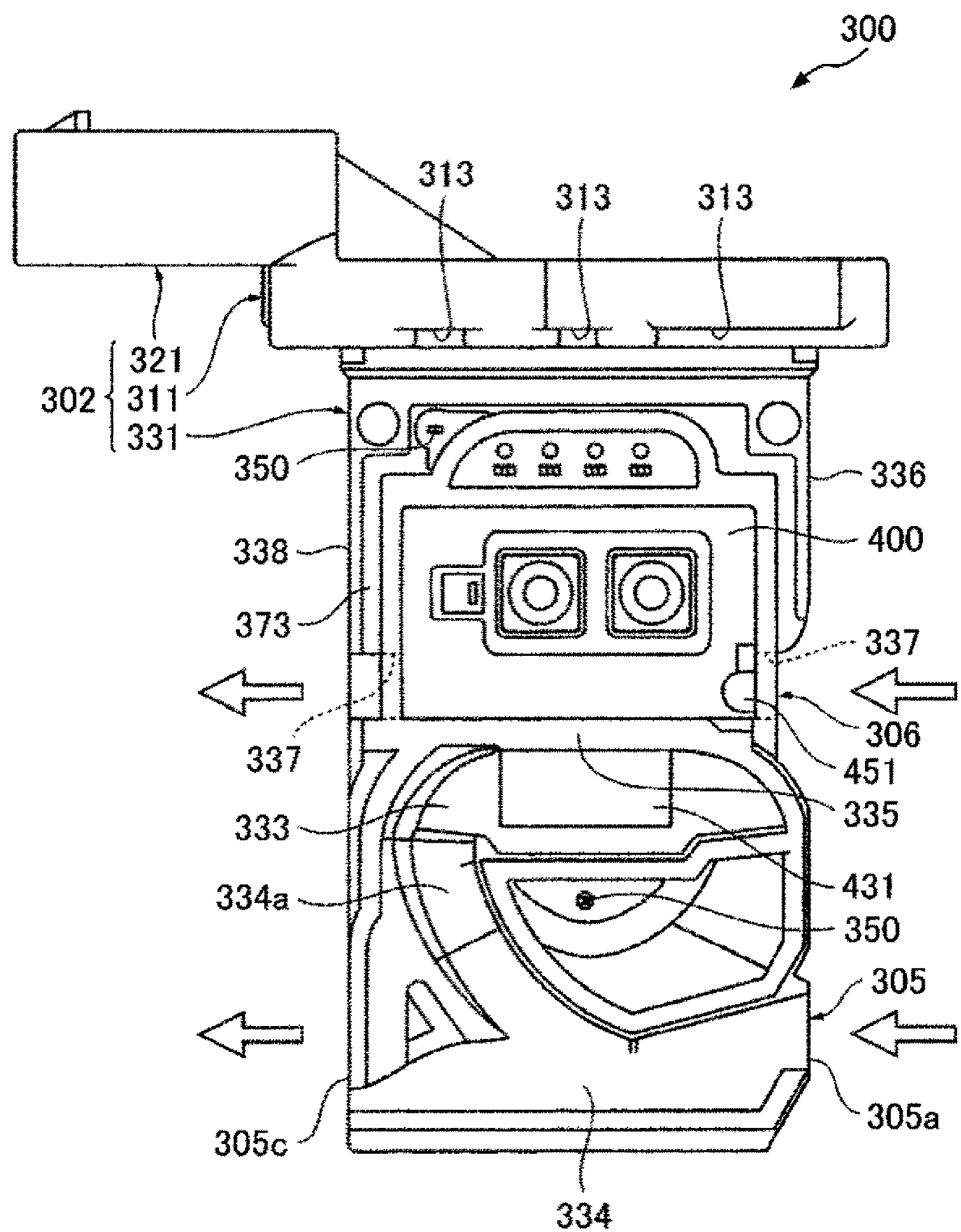
Figures 2, 4:
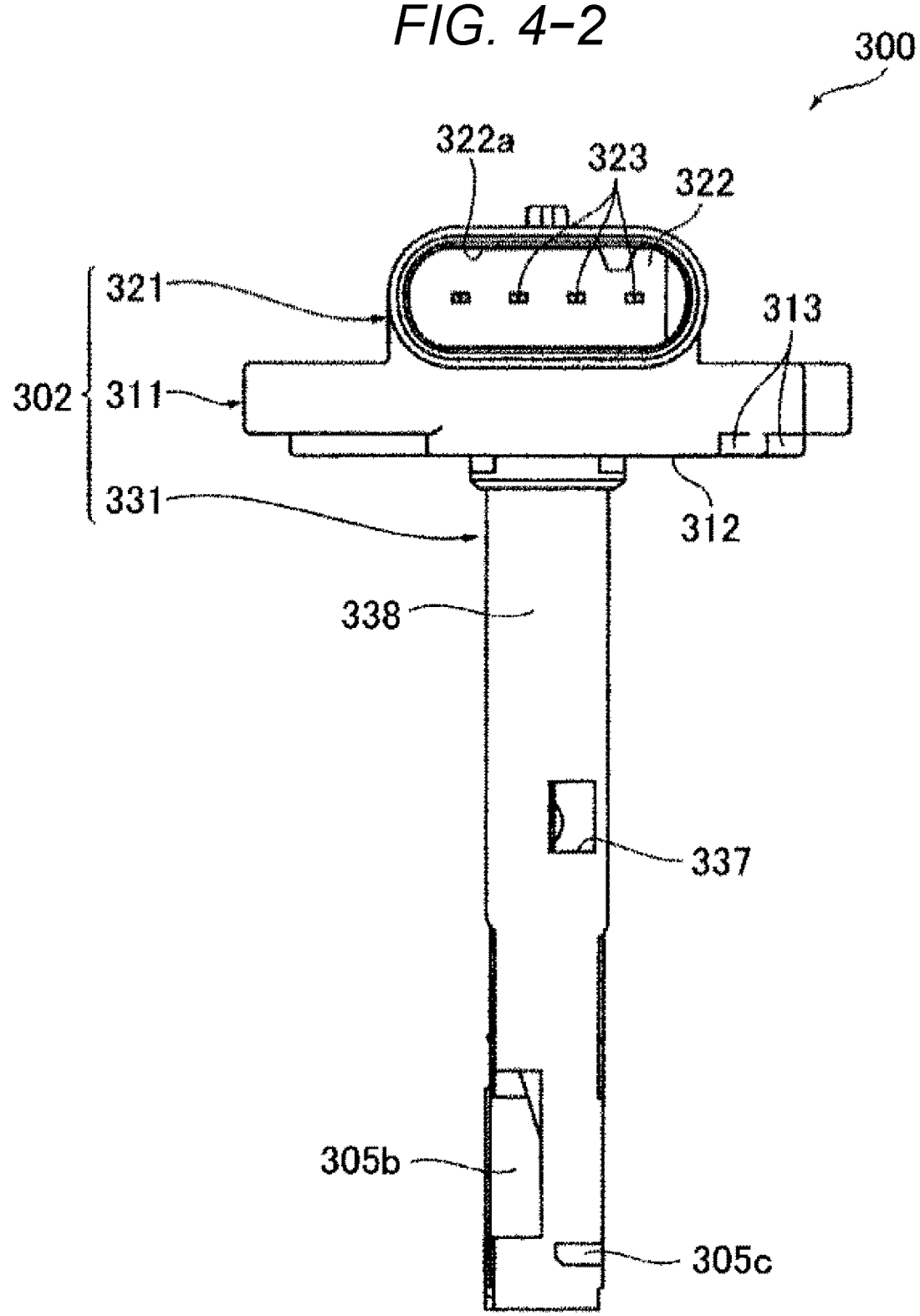
Figure 5:
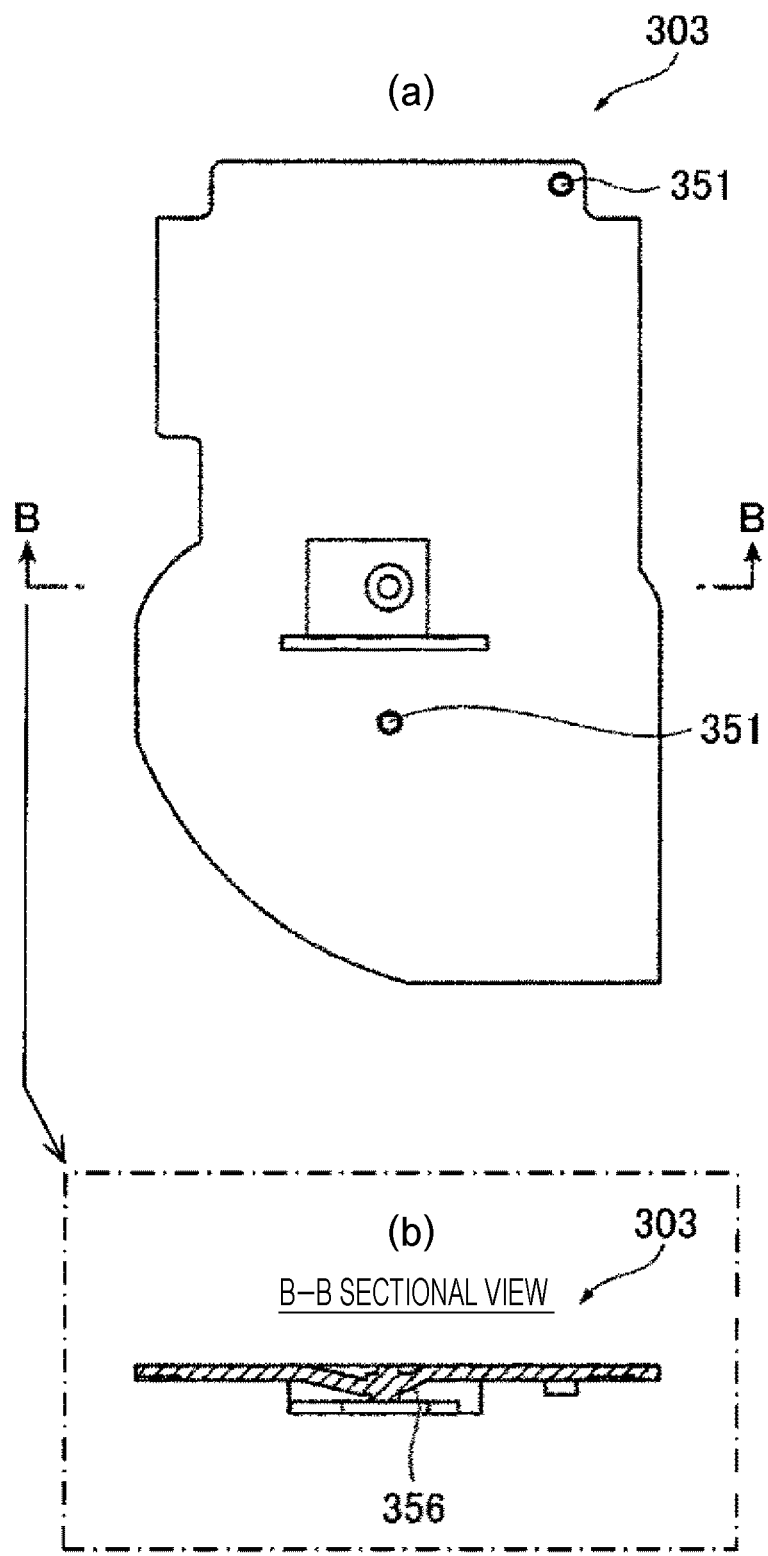
Figure 6:
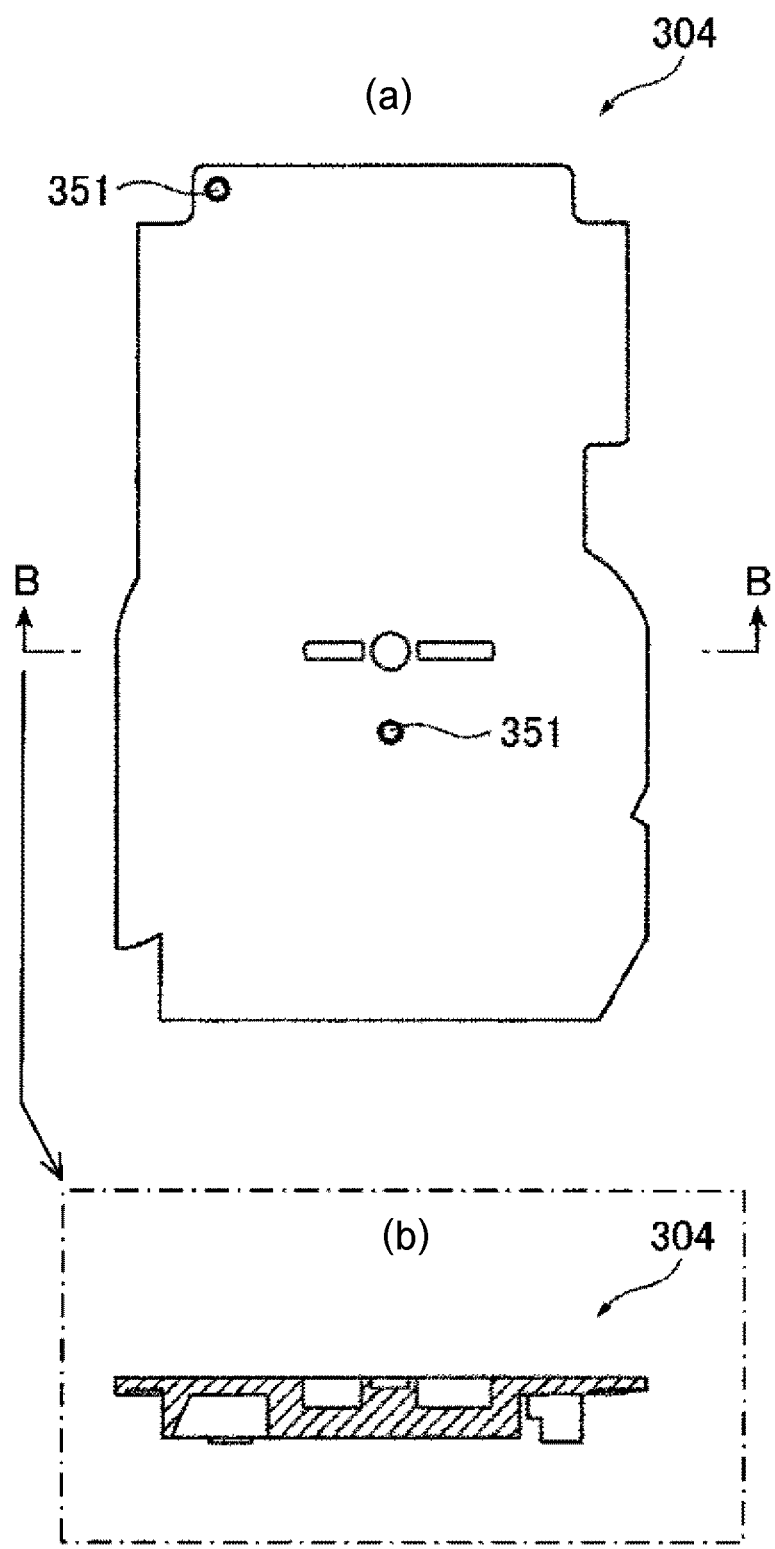

FIG. 5 is a view illustrating the external appearance of the front cover 303, and FIGS. 5(a) and 5(b) are a front view and a sectional view taken along line B-B of FIG. 5(a), respectively. FIG. 6 is a view illustrating the external appearance of the back cover 304, and FIGS. 6(a) and 6(b) are a front view and a sectional view taken along line B-B of FIG. 6(a), respectively.

The front cover 303 and the back cover 304 in FIGS. 5 and 6 cover the front-side sub-passage groove 332 and the back-side sub-passage groove 334 of the housing 302, respectively, to form the first sub-passage 305. The front cover 303 forms the circuit room Rc that is tightly sealed, and the back cover 304 covers the recess portion on the back face side of the measurement unit 331 to form the second sub-passage 306 and the sensor room Rs in communication with the second sub-passage 306.

The front cover 303 has a projecting portion 356 at a position opposed to the flow-amount detecting unit 602, and the projecting portion 356 is used to make a squeeze between the front cover 303 and the measurement flow-passage face 430. Thus, it is desirable that forming accuracy is high. Because the front cover 303 and the back cover 304 are formed in a resin mold process in which thermoplastic resin is injected into a die, the front cover 303 and the back cover 304 can be formed with high forming accuracy.

The front cover 303 and the back cover 304 are each provided with a plurality of securing holes 351 into which a plurality of securing pins 350 protruding from the measurement unit 331 is to be inserted. The front cover 303 and the back cover 304 are attached to the front face and the back face of the measurement unit 331, respectively. In that case, the securing pins 350 are inserted into the securing holes 351, and positioning is made. Then, the front cover 303 and the back cover 304 are joined along the edges of the front-side sub-passage groove 332 and the back-side sub-passage groove 334, for example, by laser welding. Similarly, the front cover 303 and the back cover 304 are joined along the edges of the circuit room Rc and the sensor room Rs, for example, by laser welding.

3.5 Secured Structure and Effect of Circuit Board 400 Due to Housing 302

Next, securing the circuit board 400 to the housing 302 with a resin mold process, will be described. The circuit board 400 is integrally molded with the housing 302 such that the flow-amount detecting unit 602 of the circuit board 400 is disposed at a predetermined location of the sub-passage groove for forming the sub-passage, for example, according to the present embodiment, at the opening portion 333 that is a portion at which the front-side sub-passage groove 332 and the back-side sub-passage groove 334 are in communication.

The measurement unit 331 of the housing 302 is provided with portions at which the outer circumferential edge portion of a base portion 402 of the circuit board 400 is embedded and secured in the housing 302 due to the resin molding, as securing portions 372 and 373. The securing portions 372 and 373 pinch and secure the outer circumferential edge portion of the base portion 402 of the circuit board 400 from the front side and the back side.

The housing 302 is manufactured in the resin mold process. In the resin mold process, the circuit board 400 is built into the resin of the housing 302 and then is secured in the housing 302 by the resin molding. This arrangement can retain, with extremely high accuracy, the relationship with the sub-passage in which the flow-amount detecting unit 602 performs heat transfer with the gas to be measured 30 to measure the amount of flow, for example, positional relationship or orientation relationship that is the relationship with the shapes of the front-side sub-passage groove 332 and the back-side sub-passage groove 334, so that an error or a variation to occur for each circuit board 400 can be suppressed in a considerably small value. As a result, the measuring accuracy of the circuit board 400 can improve dramatically. For example, the measuring accuracy can improve more tremendously in comparison with a conventional method of performing securing with adhesive.

The physical quantity detecting device 300 is often produced in mass production, in which an adhering method with adhesive with precise measurement has a limit for improvement in measuring accuracy. However, as in the present embodiment, securing the circuit board 400 simultaneously with forming the sub-passage in the resin mold process in which the sub-passage into which the gas to be measured 30 flows is to be formed, can reduce a variation in measuring accuracy massively, so that the measuring accuracy of each physical quantity detecting device 300 can improve massively.

For example, according to a further description with the embodiment illustrated in FIGS. 3-1 to 3-5, the circuit board 400 can be secured to the housing 302 with high accuracy such that the relationship between the front-side sub-passage groove 332, the back-side sub-passage groove 334, and the flow-amount detecting unit 602 meets a prescribed relationship. This arrangement can steadily acquire, in each physical quantity detecting device 300 to be mass-produced, for example, the positional relationship or the shape relationship between the flow-amount detecting unit 602 in the circuit board 400 and the first sub-passage 305, with considerably high accuracy.

For the first sub-passage 305 in which the flow-amount detecting unit 602 of the circuit board 400 is securely disposed, because, for example, the front-side sub-passage groove 332 and the back-side sub-passage groove 334 can be formed with high accuracy, the work of forming the first sub-passage 305 from the sub-passage grooves 332 and 334 corresponds to the work of covering both faces of the housing 302 with the front cover 303 and the back cover 304. The work is significantly simple and includes a work process in which factors that deteriorate the measuring accuracy are few. The front cover 303 and the back cover 304 are produced in the resin mold process having high forming accuracy. Therefore, the sub-passage to be provided in the prescribed relationship with the flow-amount detecting unit 602 of the circuit board 400, can be completed with high accuracy. This method allows high productivity to be acquired in addition to improvement in the measuring accuracy.

In contrast to this, conventionally, a sub-passage is manufactured and next a measurement unit is adhered to the sub-passage with adhesive, so that a thermal flowmeter is produced. The method with the adhesive in this manner has a large variation in the thickness of the adhesive and a variation in adhered position or in adhered angle for each product. Thus, there is a limit on increasing the measuring accuracy. Furthermore, in a case where the work is performed in a mass-production process, it is considerably difficult that the measuring accuracy improves.

In the embodiment according to the present invention, the circuit board 400 is secured by the resin molding and simultaneously the sub-passage groove for forming the first sub-passage 305 is formed by the resin molding. This arrangement enables the flow-amount detecting unit 602 to be secured to the shape of the sub-passage groove and the sub-passage groove with extremely high accuracy.

Parts related to the measurement of the amount of flow, for example, the flow-amount detecting unit 602 and the measurement flow-passage face 430 to which the flow-amount detecting unit 602 is attached, are provided on the front face of the circuit board 400. The flow-amount detecting unit 602 and the measurement flow-passage face 430 are exposed from the resin forming the housing 302. That is the flow-amount detecting unit 602 and the measurement flow-passage face 430 are not covered with the resin forming the housing 302. The flow-amount detecting unit 602 and the measurement flow-passage face 430 of the circuit board 400 are utilized remaining intact after the resin molding of the housing 302, and are used for the measurement of the amount of flow of the physical quantity detecting device 300. This arrangement causes the measuring accuracy to improve.

In the embodiment according to the present invention, because forming the circuit board 400 integrally with the housing 302 secures the circuit board 400 to the housing 302 having the first sub-passage 305, the circuit board 400 can be reliably secured to the housing 302. Particularly, because provided is the configuration in which the protruding portion 403 of the circuit board 400 penetrates through the partition wall 335 and protrudes to the first sub-passage 305, the sealing performance between the first sub-passage 305 and the circuit room Rc is high and the gas to be measured 30 is prevented from leaking from the first sub-passage 305 to the circuit room Rc, so that, for example, the circuit components or the wiring of the circuit board 400 can be prevented from corroding in contact with the gas to be measured 30.

3.6 Structure and Effect of Terminal Connecting Unit 320

Figures 1, 10:
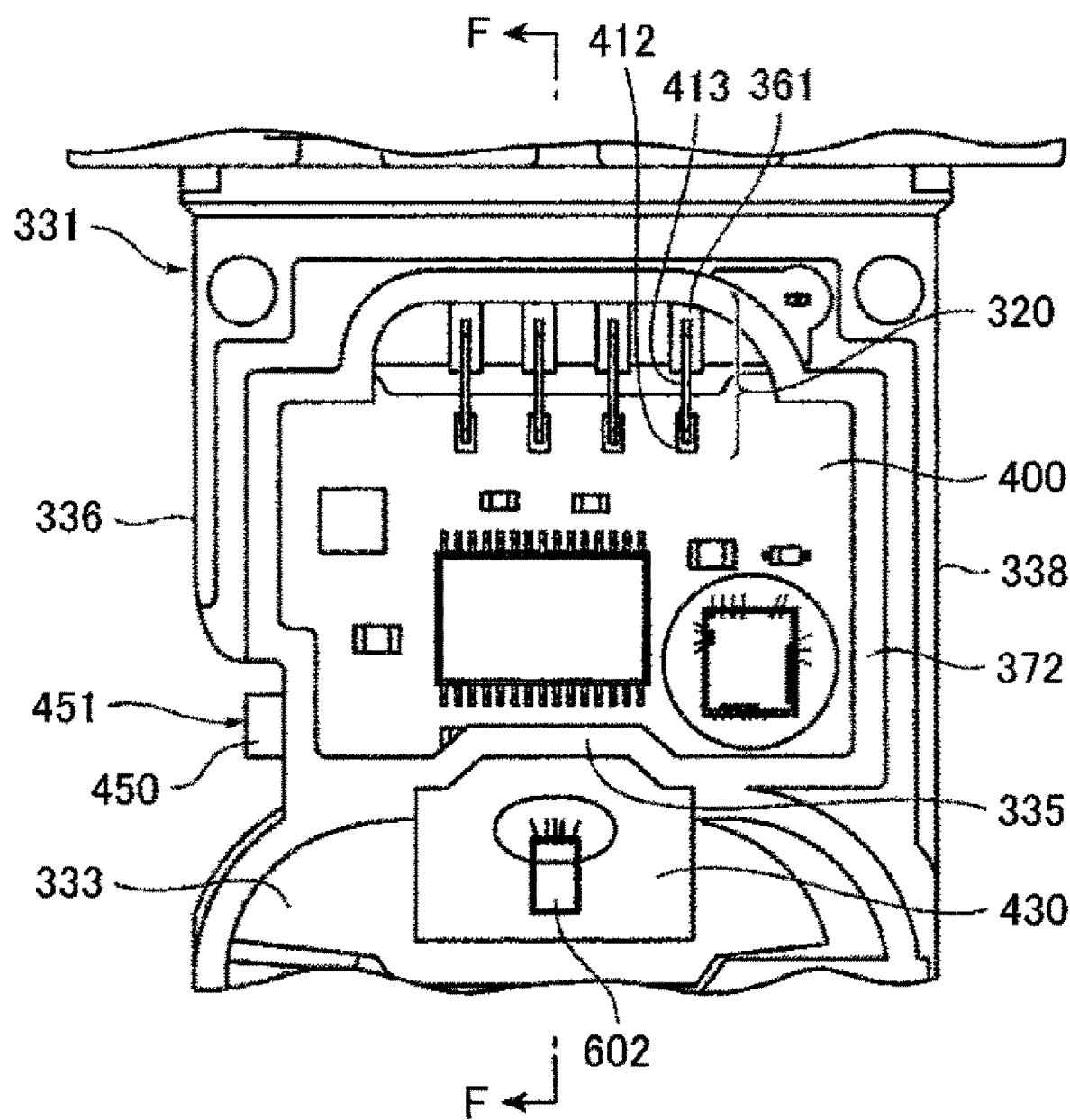
Figures 2, 10:
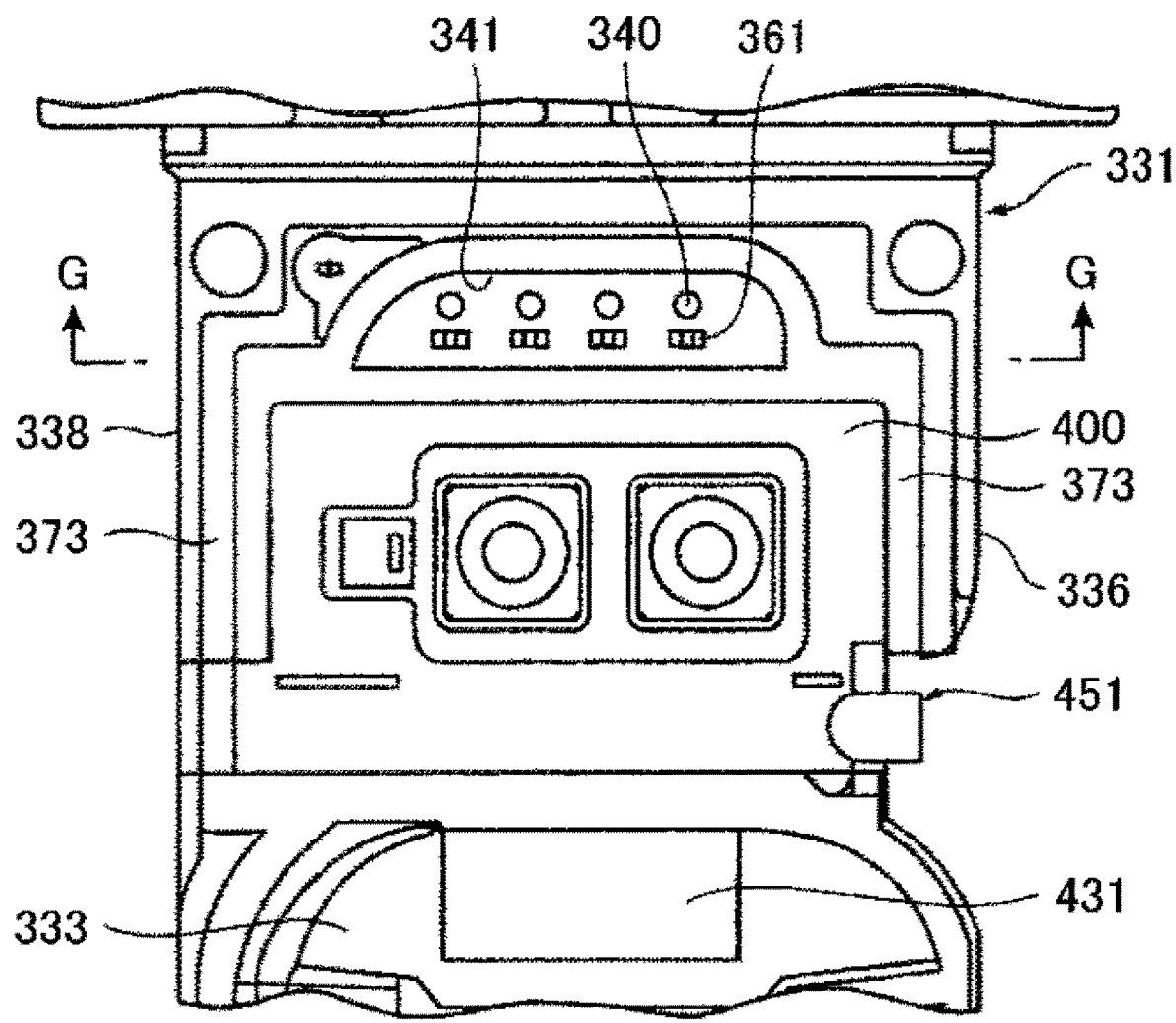
Figures 3, 10:
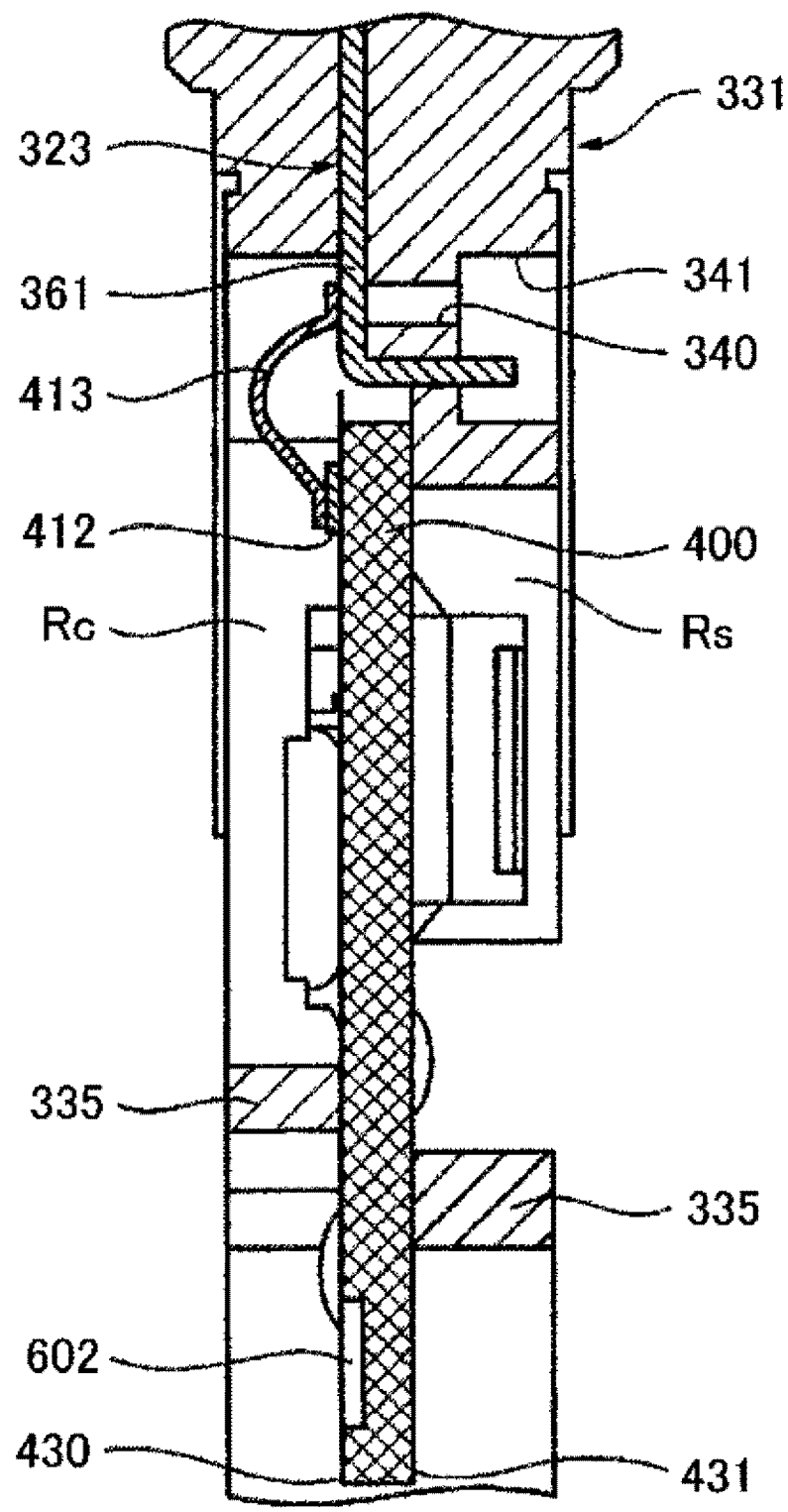
Figures 4, 10:
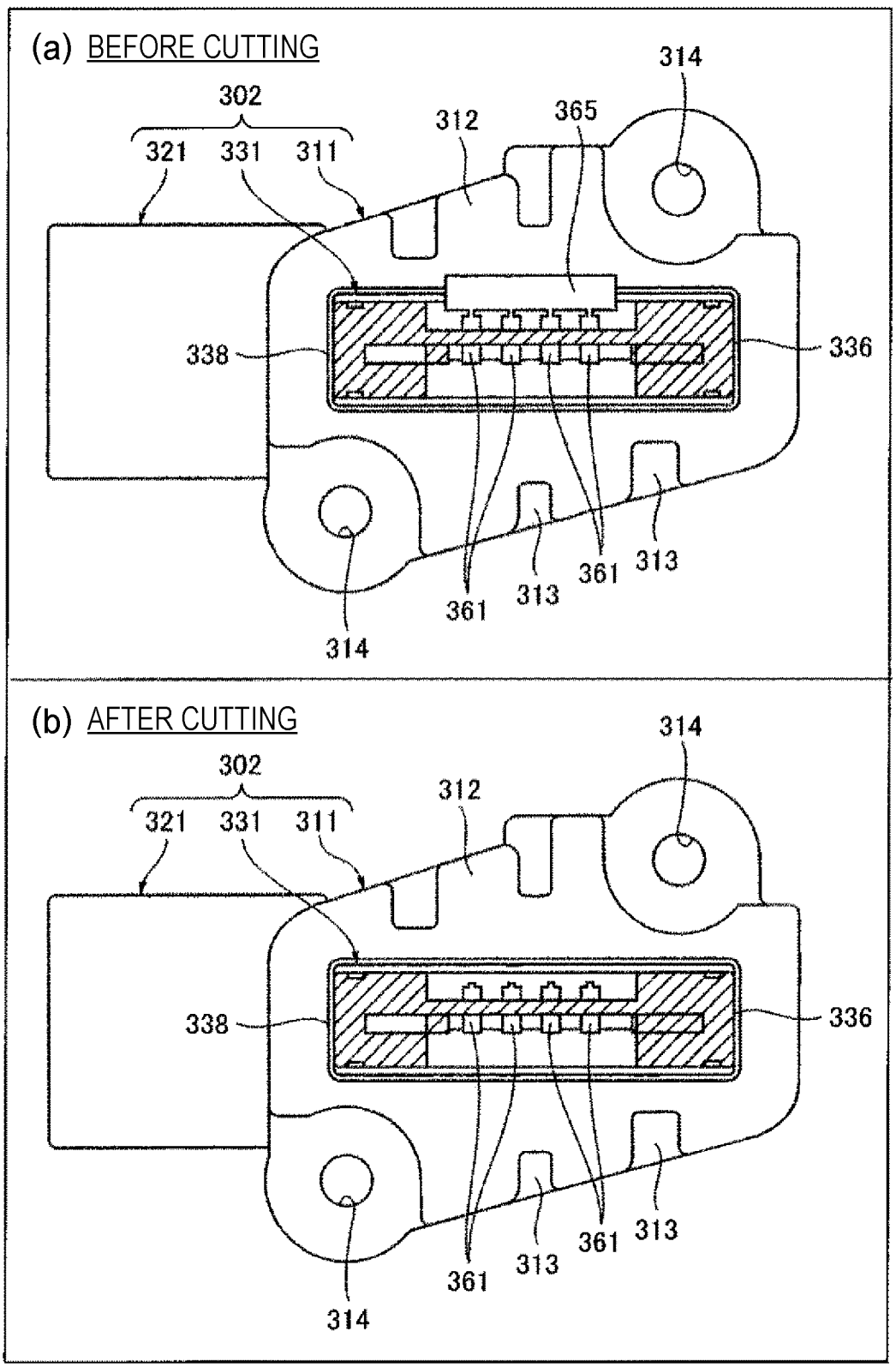

Next, the structure of a terminal connecting unit will be described below with FIGS. 10-1 to 10-4. FIGS. 10-1 and 10-2 are views each for describing the structure of the terminal connecting unit, and FIGS. 10-3 and 10-4 are a sectional view taken along line F-F of FIG. 10-1 and a sectional view taken along line G-G of FIG. 10-2, respectively.

The terminal connecting unit 320 has inner end portions 361 of the external terminals 323 connected with connecting terminals 412 of the circuit board 400 through gold wires 413. As illustrated in FIG. 10-1, the respective inner end portions 361 of the external terminals 323 are disposed at predetermined intervals, the inner end portions 361 meeting the positions of the connecting terminals 412 of the circuit board 400, the inner end portions 361 protruding from the flange 311 side into the circuit room Rc.

As illustrated in FIG. 10-3, the inner end portion 361 is disposed at a position substantially flush with the front face of the circuit board 400. Then, the leading end thereof warps in a substantially L shape from the front face side to the back face side of the measurement unit 331, and protrudes to the back face of the measurement unit 331. As illustrated in FIG. 10-4(a), the respective leading ends of the inner end portions 361 are linked together through a linking portion 365. As illustrated in FIG. 10-4(b), the linking portion 365 is cut off after the mold forming, so that the inner end portions 361 are divided individually.

Each inner end portion 361 is secured to the housing 302 by the resin molding in the mold process such that the inner end portions 361 and the circuit board 400 are disposed on the same plane. The inner end portions 361 that have been integrally linked together through the linking portion 365 in order to prevent deformation or a shift in disposition, are secured to the housing 302. Then, after the securing to the housing 302, the linking portion 365 is cut off.

The inner end portions 361 that have been pinched from the front face side and the back face side of the measurement unit 331, is subjected to the resin molding. In that case, a die abuts on the entirety of the front faces of the inner end portions 361, and a securing pin abuts on the back face of each inner end portion 361. Therefore, the front face of each inner end portion 361 on which the gold wire is to be welded, can be exposed completely without being covered with the mold resin due to resin leakage, so that welding of the gold wire can be easily performed. Note that pin holes 340 that are marks due to holding the inner end portions 361 with the securing pins, are formed in the measurement unit 331.

The leading ends of the inner end portions 361 protrude in a recess portion 341 formed on the back face of the measurement unit 331. The recess portion 341 is covered with the back cover 304 and then the circumference of the recess portion 341 is joined continuously with the back cover 304, for example, by laser welding, so that a tightly sealed in-room space is formed. Therefore, the inner end portions 361 can be prevented from corroding in contact with the gas to be measured 30.

4. External Appearance of Circuit Board 400

4.1 Forming of Measurement Flow-Passage Face 430 Having Flow-Amount Detecting Unit 602

Figures 1, 7:
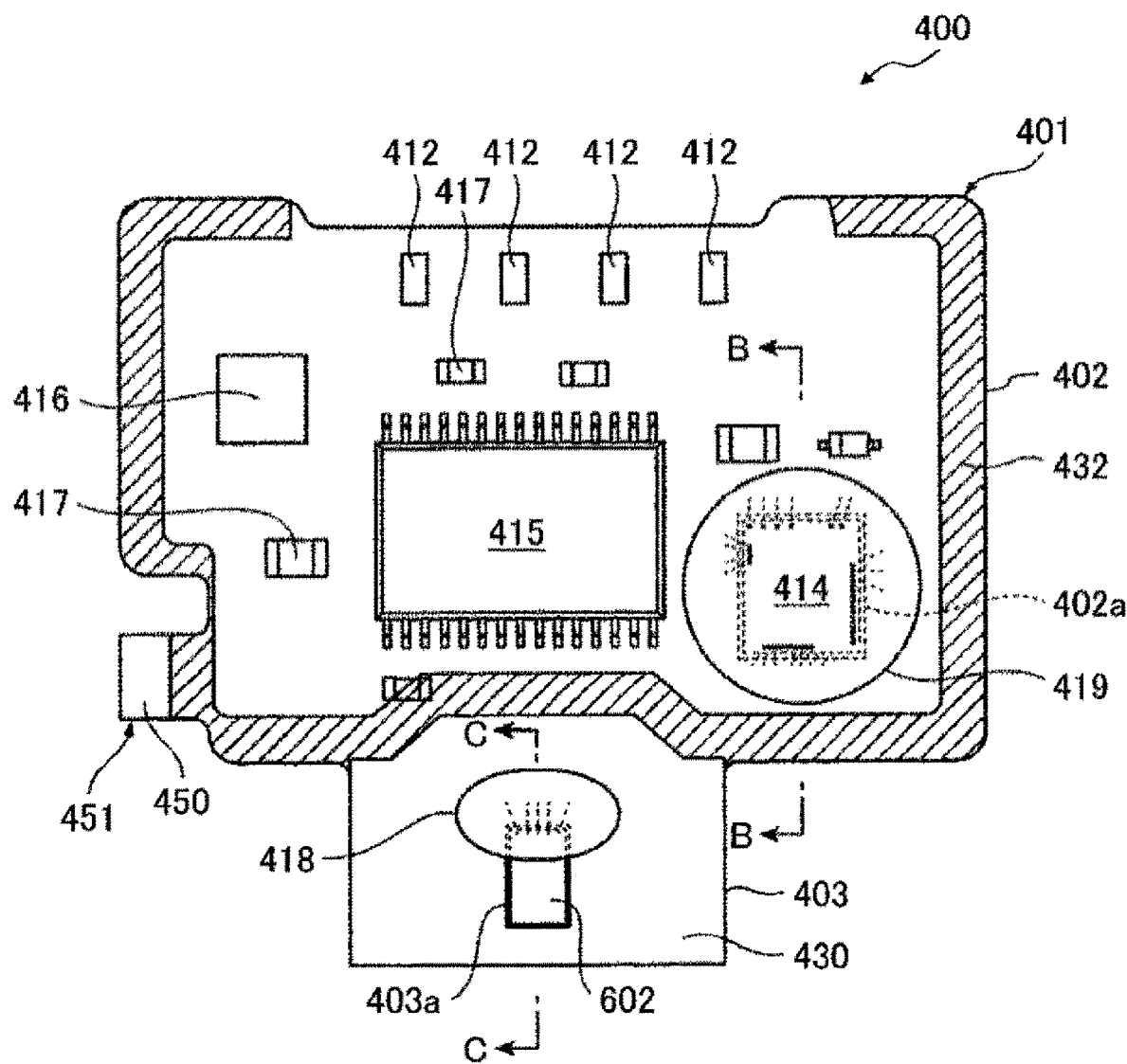
Figures 2, 7:
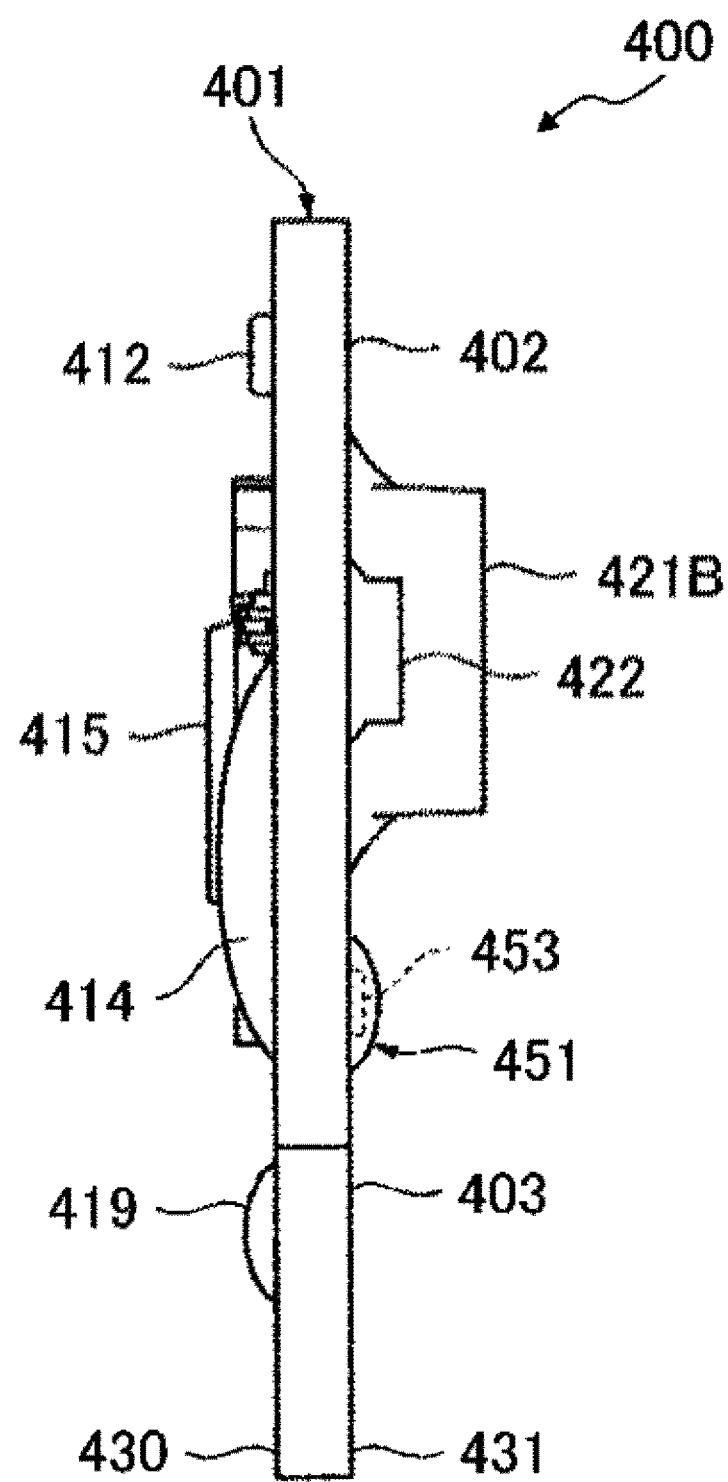
Figures 3, 7:
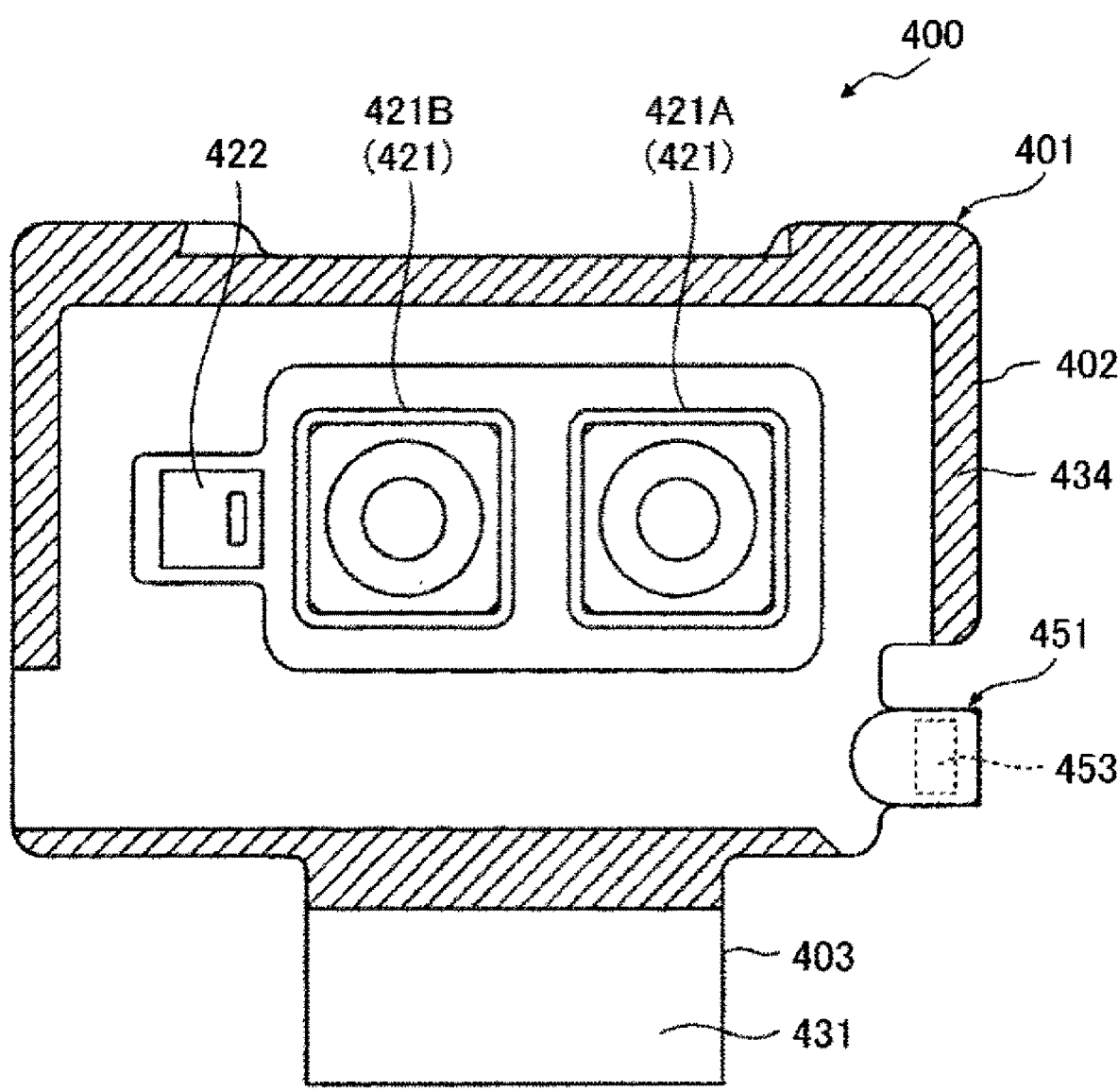
Figures 4, 7:
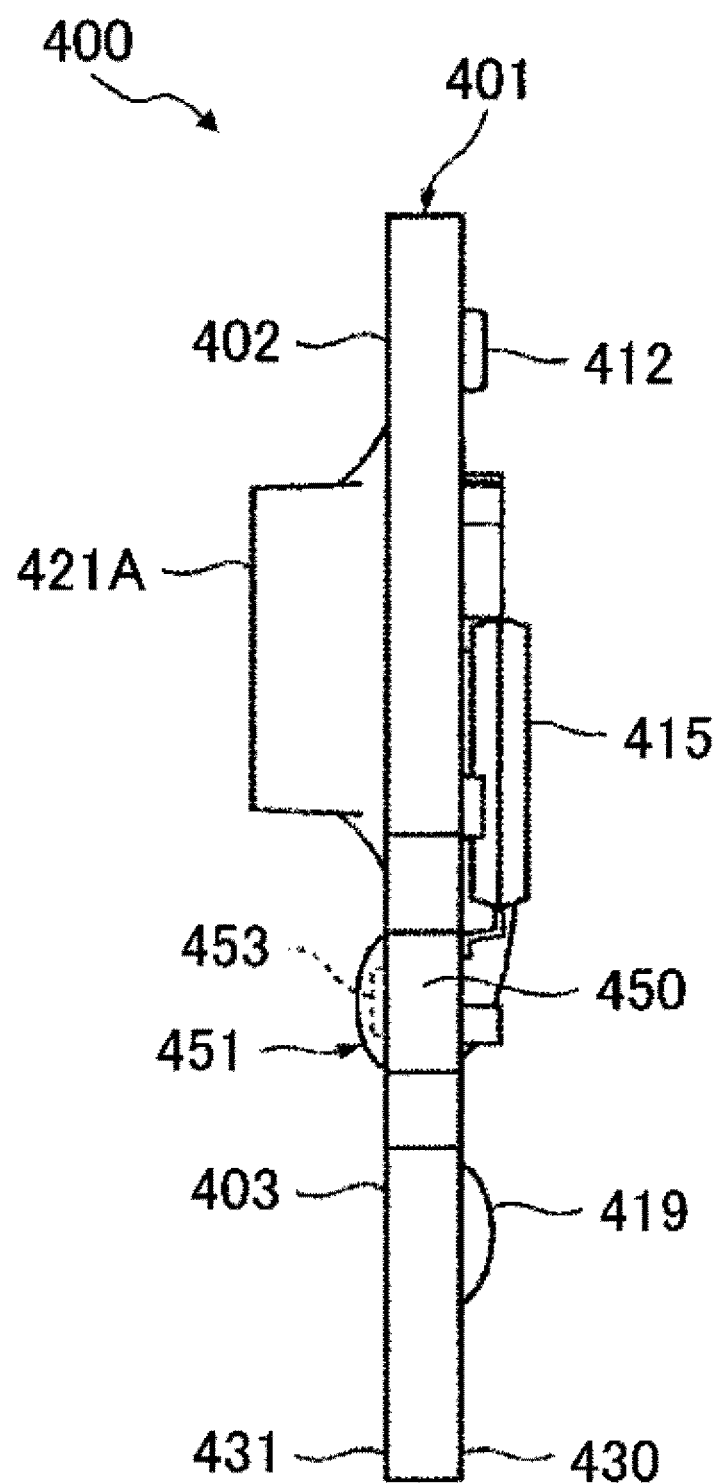
Figures 5, 7:
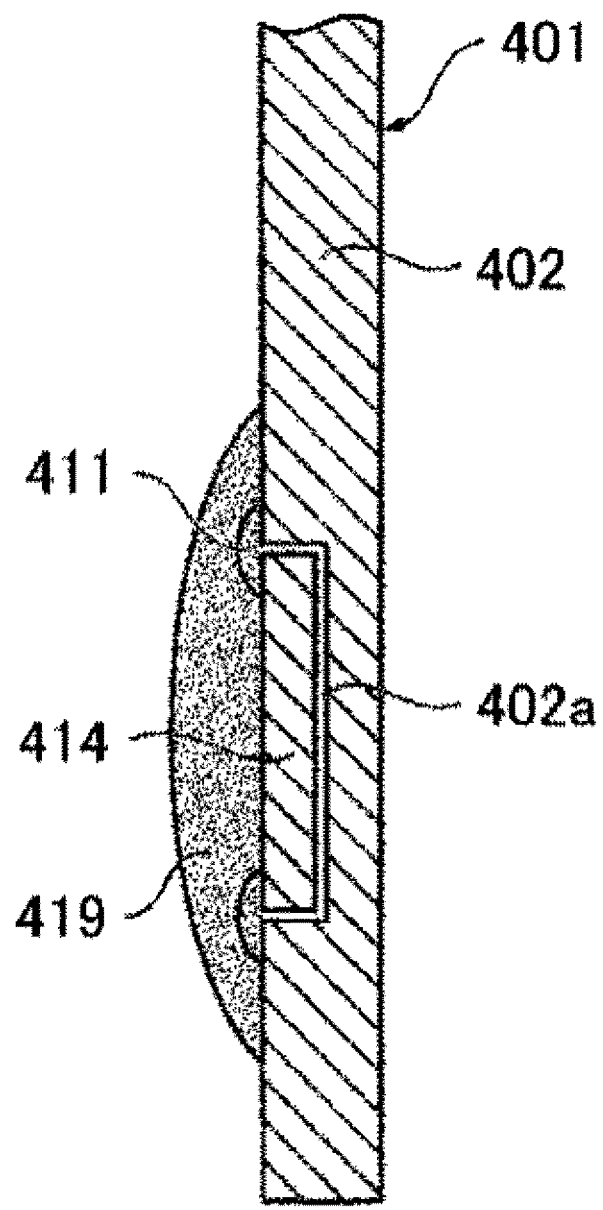
Figures 6, 7:
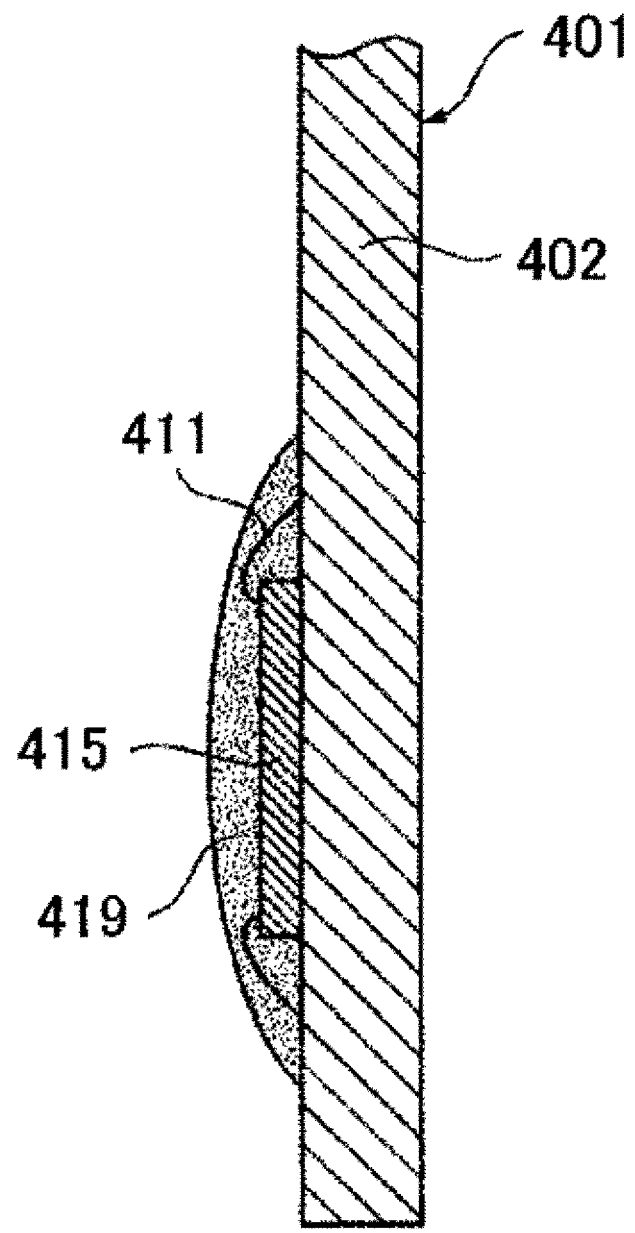
Figure 7:
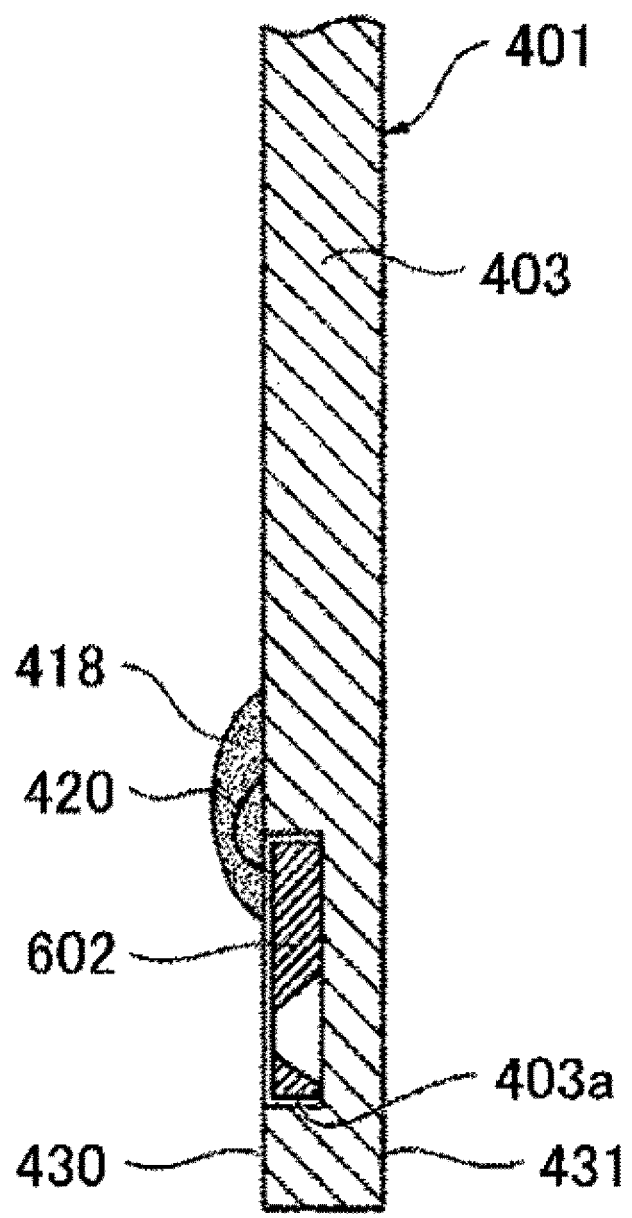

FIGS. 7-1 to 7-6 each illustrate the external appearance of the circuit board 400. Note that the shaded portions illustrated on the external appearance of the circuit board 400 indicate secured faces 432 and 434 at which the circuit board 400 is to be covered and secured with the resin in forming the housing 302 in the resin mold process.

FIGS. 7-1, 7-2, 7-3, 7-4, 7-5, 7-6, and 7-7 are a front view of the circuit board, a right side view of the circuit board, a rear view of the circuit board, a left side view of the circuit board, a sectional view taken along line B-B illustrating a section of an LSI portion of FIG. 7-1, a view illustrating another embodiment corresponding to the section taken along line B-B of FIG. 7-1, and a sectional view taken along line C-C of the detecting unit of FIG. 7-1, respectively.

The circuit board 400 has the board body 401, the front face of the board body 401 being provided with the circuit unit and the flow-amount detecting unit 602 that is a sensing element, the back face of the board body 401 being provided with the pressure sensor 421 and the humidity sensor 422 that are sensing elements. The board body 401 including glass-epoxy-resin material, has the same value as or an approximate value to the coefficient of thermal expansion of the thermoplastic resin forming the housing 302. Therefore, stress due to a difference in the coefficient of thermal expansion in the insert forming to the housing 302, can be reduced, so that deformation of the circuit board 400 can be reduced.

The board body 401 having a flat shape with a constant thickness, has, in a substantially T shape in plan view: the base portion 402 having a substantially quadrilateral shape; and the protruding portion 403 having a substantially quadrilateral shape that is a size smaller than the base portion 402, the protruding portion 403 protruding from a side of the base portion 402. The front face of the base portion 402 is provided with the circuit unit. The circuit unit includes electronic components, such as an LSI 414, a microcomputer 415, a power-supply regulator 416, and chip components 417, such as a resistor and a capacitor, implemented on circuit wiring not illustrated. Because the power-supply regulator 416 has the amount of heat generation larger than the other electronic components, such as the microcomputer 415 and the LSI 414, have, the power-supply regulator 416 is disposed on the relatively upstream side in the circuit room Rc. The entire LSI 414 is sealed with synthetic-resin material 419 such that gold wires 411 are included, and thus the handling of the circuit board 400 improves in the insert forming.

As illustrated in FIG. 7-5, the front face of the board body 401 is provided with a recess portion 402a into which the LSI 414 is to be fit. The board body 401 is subjected to laser processing, so that the recess portion 402a can be formed. The glass-epoxy-resin board body 401 has easier processing than a ceramic board body has, and thus the recess portion 402 can be provided easier. The recess portion 402 has a depth such that the front face of the LSI 414 is flush with the front face of the board body 401. The agreement in height between the front face of the LSI 414 and the front face of the board body 401 in this manner, facilitates wire bonding of connecting the LSI 414 and the board body 401 with the gold wires 411, so that the manufacture of the circuit board 400 is facilitated. For example, as illustrated in FIG. 7-6, the LSI 414 can be directly provided on the front face of the board body 401. For the structure, although the synthetic-resin material 419 covering the LSI 414 protrudes larger, the processing for forming the recess portion 402 on the board body 401 is unnecessary, so that the manufacture can be simplified.

In the insert forming of the circuit board 400 into the housing 302, the protruding portion 403 is disposed in the first sub-passage 305, and the measurement flow-passage face 430 that is the front face of the protruding portion 403, extends along the flow direction of the gas to be measured 30. The measurement flow-passage face 430 of the protruding portion 403 is provided with the flow-amount detecting unit 602. The flow-amount detecting unit 602 performs heat transfer with the gas to be measured 30, measures the state of the gas to be measured 30, for example, the flow rate of the gas to be measured 30, and outputs an electrical signal indicating the amount of flow flowing in the main passage 124. It is desirable that the gas flowing in the neighborhood of the measurement flow-passage face 430 includes a laminar flow with less turbulence so that the flow-amount detecting unit 602 measures the state of the gas to be measured 30 with high accuracy. Thus, it is desirable that the front face of the flow-amount detecting unit 602 and the face of the measurement flow-passage face 430 are flush with each other or the difference therebetween is a predetermined value or less.

The front face of the measurement flow-passage face 430 is provided with a recess portion 403a, and the flow-amount detecting unit 602 is fit therein. The recess portion 403a can be formed by application of laser processing. The recess portion 403a has a depth such that the front face of the flow-amount detecting unit 602 is flush with the front face of the measurement flow-passage face 430. The flow-amount detecting unit 602 and the wiring portion thereof are coated with synthetic-resin material 418 that prevents electrolytic corrosion from occurring due to adhesion of salt water.

The back face of the board body 401 is provided with the two pressure sensors 421A and 421B and the one humidity sensor 422. The two pressure sensors 421A and 421B are disposed in a line, the two pressure sensors 421A and 421B being separated on the upstream side and the downstream side. Then, the humidity sensor 422 is disposed on the downstream side of the pressure sensor 421B. The two pressure sensors 421A and 421B and the one humidity sensor 422 are disposed in the sensor room Rs. The case where the two pressure sensors 421A and 421B and the one humidity sensor 422 are provided, has been described in the example illustrated in FIG. 7-3, but only the pressure sensor 421B and the humidity sensor 422 may be provided as illustrated in FIG. 8-2(a) or only the humidity sensor 422 may be provided as illustrated in FIG. 8-3(a).

The circuit board 400 has the second sub-passage 306 disposed on the back face side of the board body 401. Therefore, the entire board body 401 can be cooled by the gas to be measured 30 passing through the second sub-passage 306.

4.2 Structure of Temperature Detecting Unit 451

A temperature detecting unit 451 is provided at the corner portion on the protruding portion 403 side of the end side on the upstream side of the base portion 402. The temperature detecting unit 451 is one detecting unit that detects the physical quantity of the gas to be measured 30 flowing in the main passage 124, and is provided at the circuit board 400. The circuit board 400 has a protruding portion 450 protruding from the second sub-passage inlet 306a of the second sub-passage 306 upstream of the gas to be measured 30. The temperature detecting unit 451 has a chip-type temperature sensor 453 provided at the protruding portion 450 on the back face of the circuit board 400. The temperature sensor 453 and the wiring portion thereof are coated with synthetic-resin material that prevents electrolytic corrosion from occurring due to adhesion of salt water.

For example, as illustrated in FIG. 3-2, the upstream-side outer wall 336 in the measurement unit 331 included in the housing 302, is hollowed to the downstream side at the center portion of the measurement unit 331 provided with the second sub-passage inlet 306*a*. The protruding portion 450 of the circuit board 400 protrudes from the upstream-side outer wall 336 having the hollow shape, to the upstream side. The leading end of the protruding portion 450 is disposed at a position recessed with respect to the face on the most upstream side of the upstream-side outer wall 336. The temperature detecting unit 451 is provided at the protruding portion 450 such that the temperature detecting unit 451 is located on the back face of the circuit board 400, namely, faces the second sub-passage 306 side.

Because the second sub-passage inlet 306*a* is formed on the downstream side of the temperature detecting unit 451, the gas to be measured 30 to flow from the second sub-passage inlet 306*a* to the second sub-passage 306, comes in contact with the temperature detecting unit 451 and then flows into the second sub-passage inlet 306*a*. The temperature is detected in contact with the temperature detecting unit 451. The gas to be measured 30 contacted with the temperature detecting unit 451, remaining intact, flows from the second sub-passage inlet 306*a* to the second sub-passage 306. Then, the gas to be measured 30 passes through the second sub-passage 306 and is discharged from the second sub-passage outlet 306*b* to the main passage 123.

4.4 Securing of Circuit Board 400 in Resin Mold Process and Effect Thereof

Figures 1, 9:
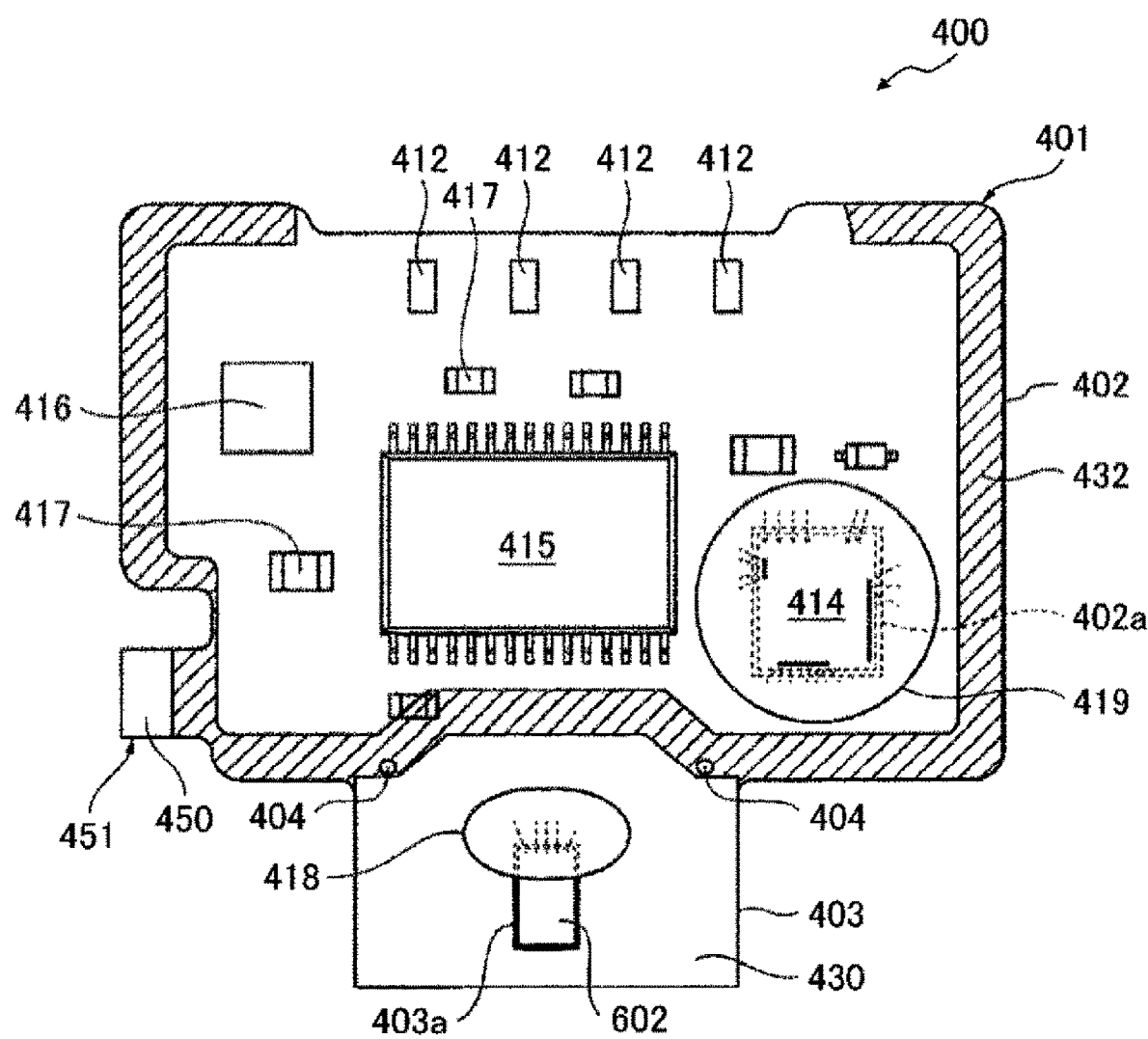
Figures 2, 9:
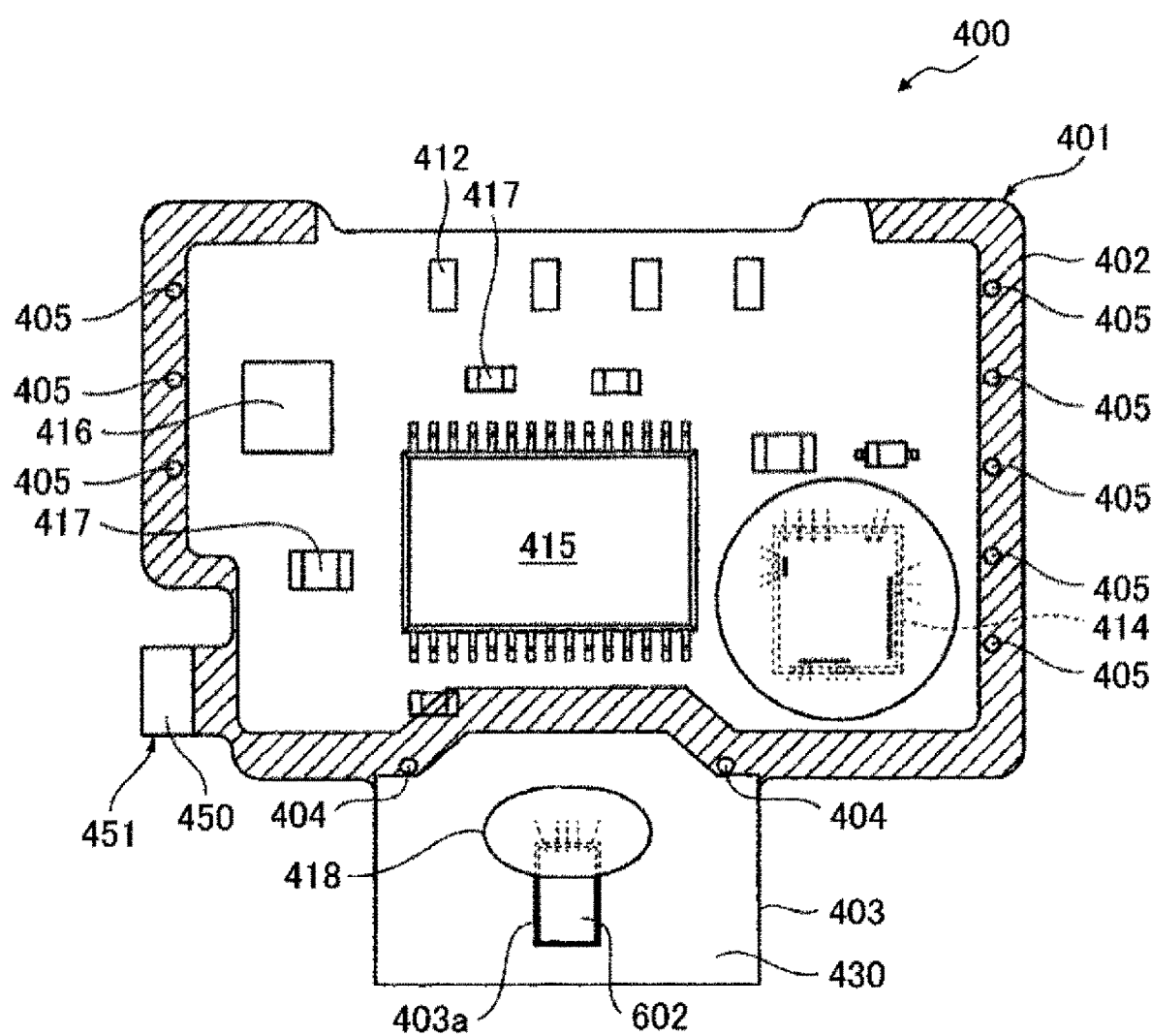
Figures 3, 9:
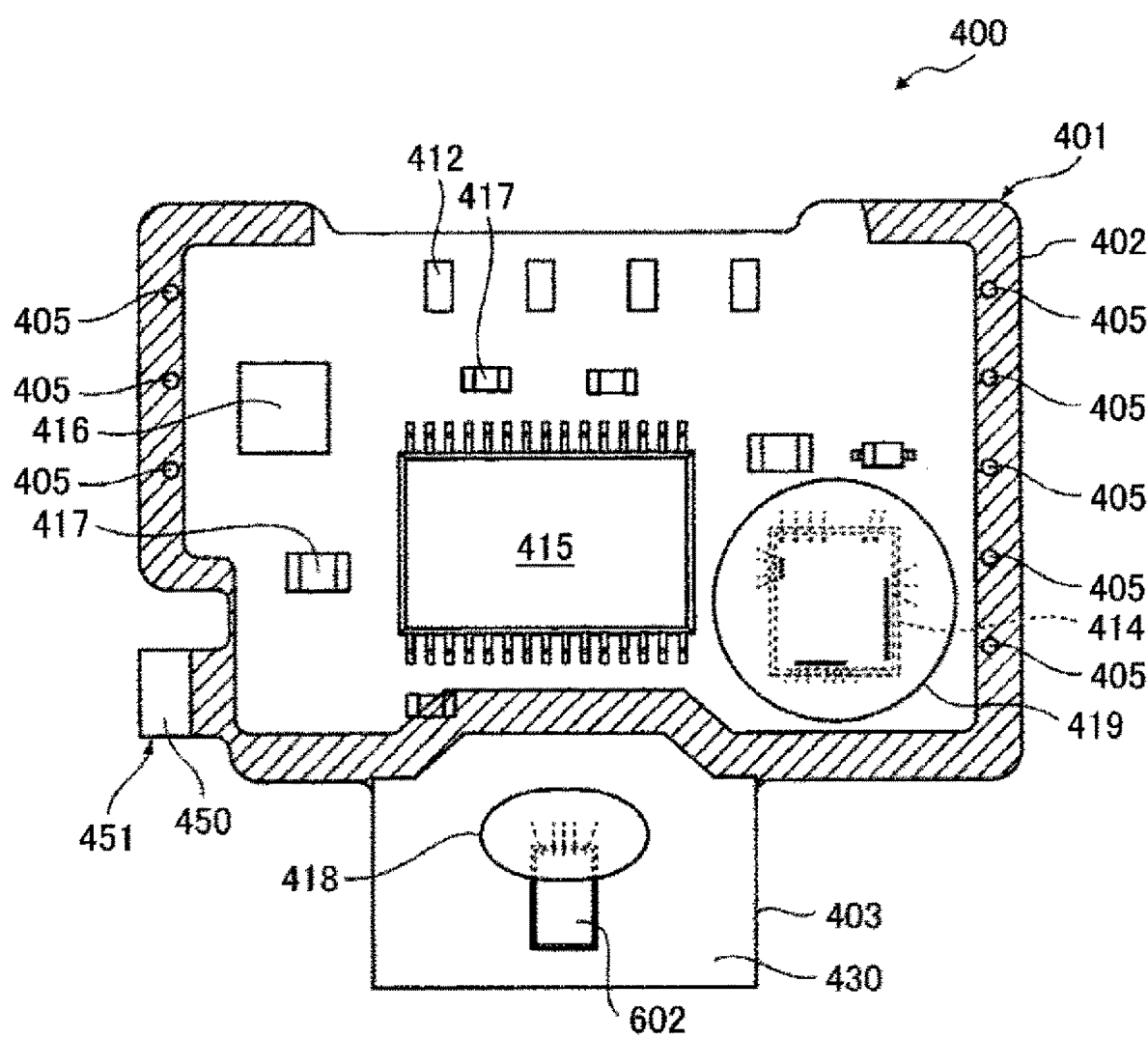
Figures 4, 9:
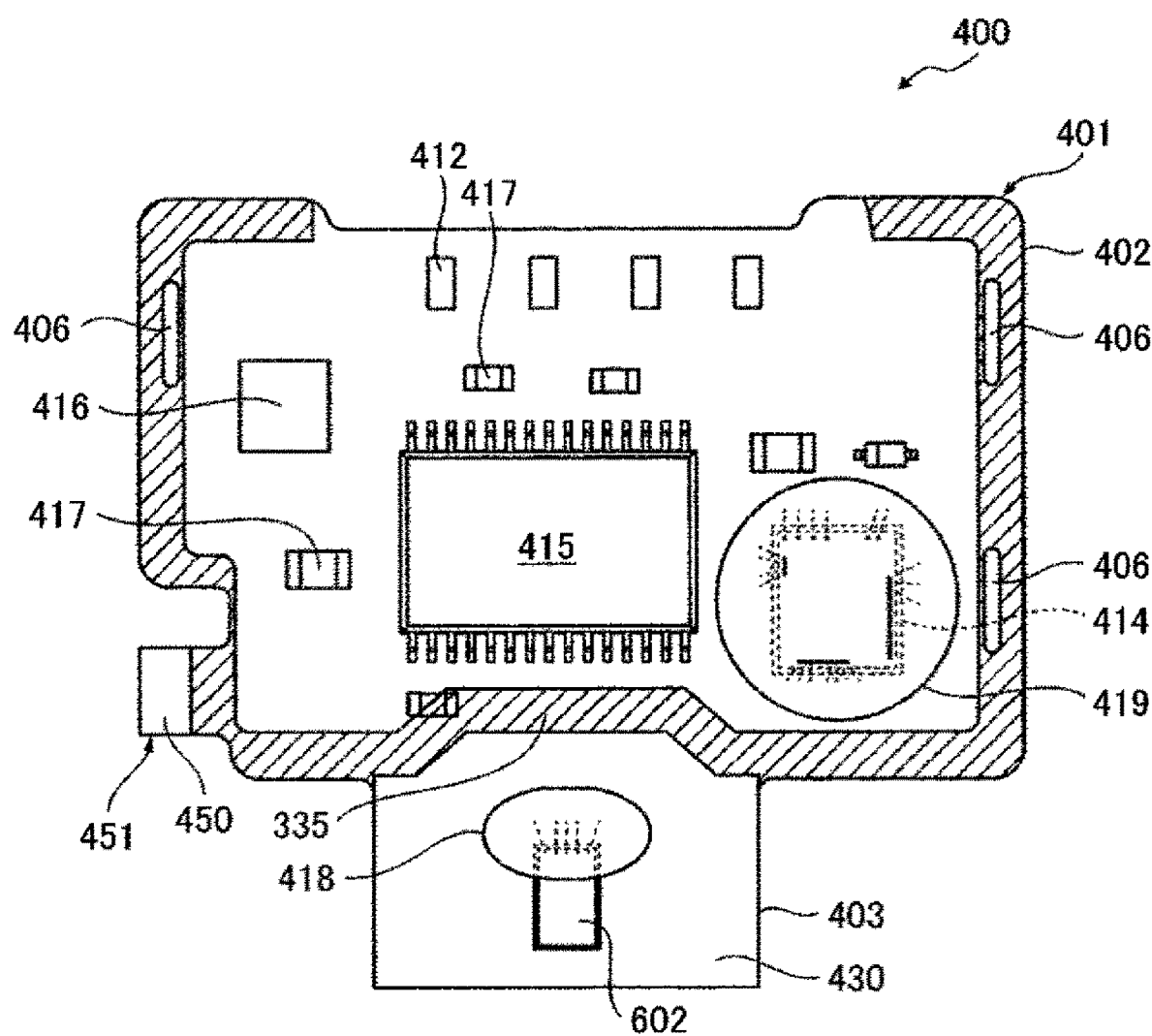
Figures 5, 9:
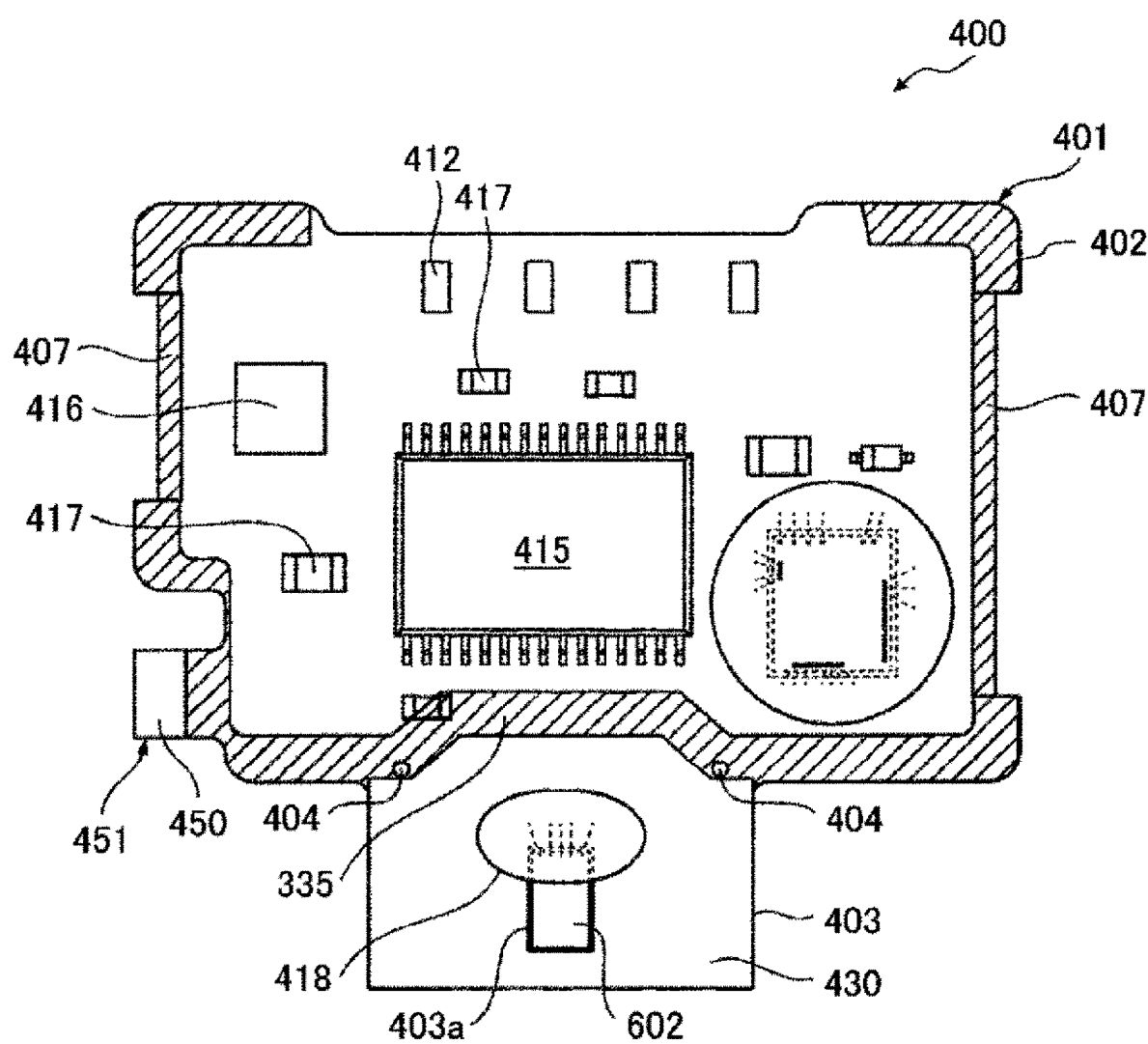
Figures 6, 9:
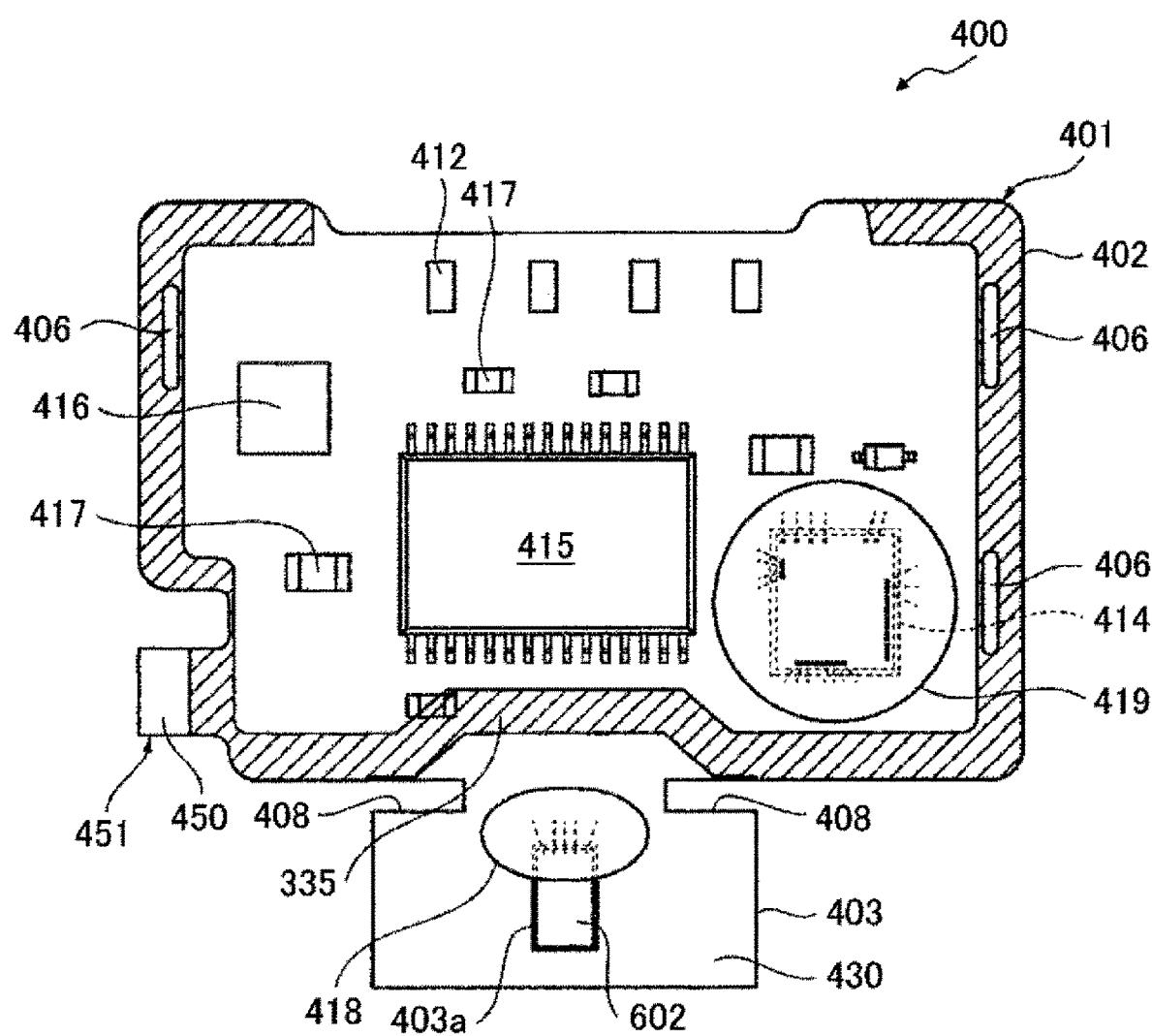
Figures 7, 9:
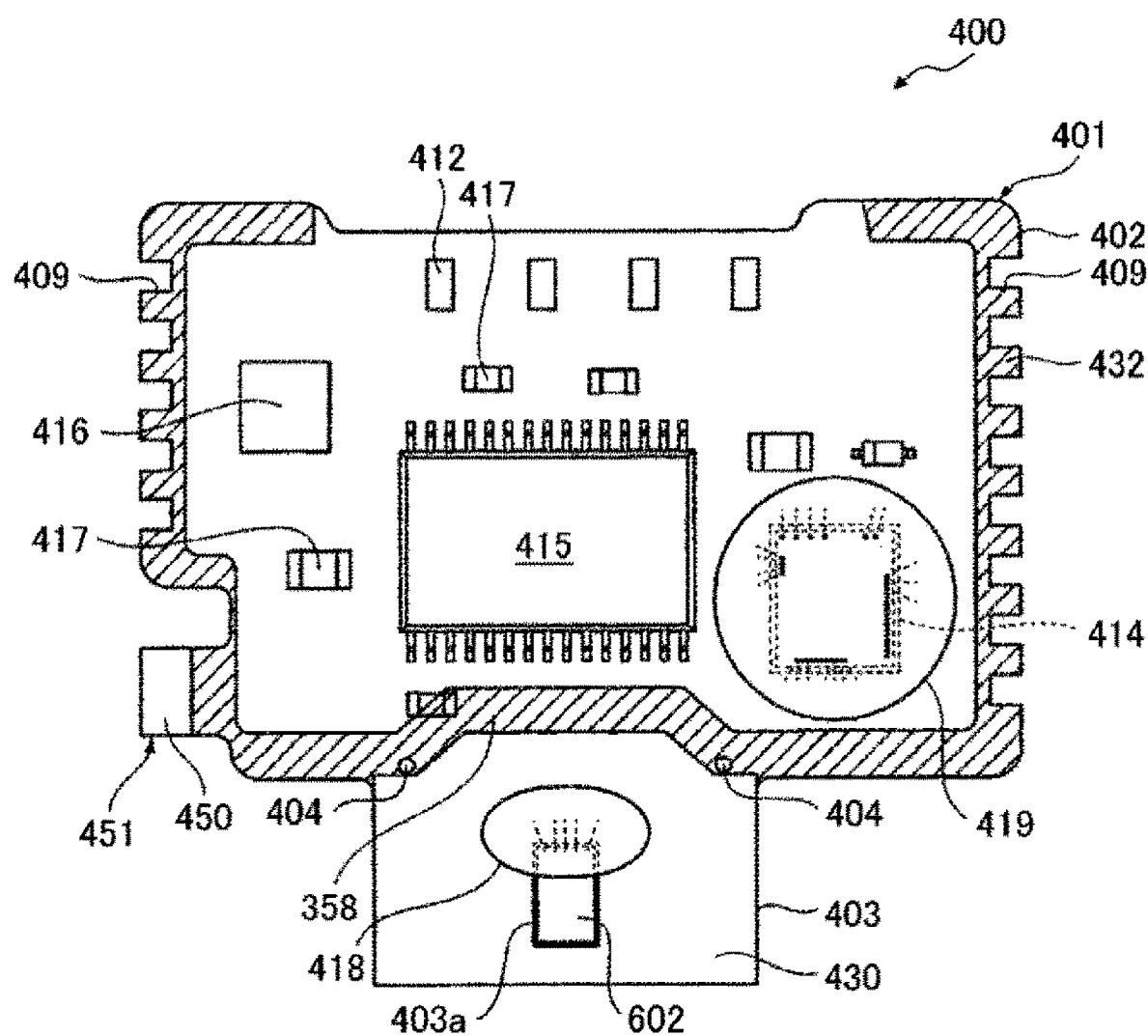
Figures 8, 9:
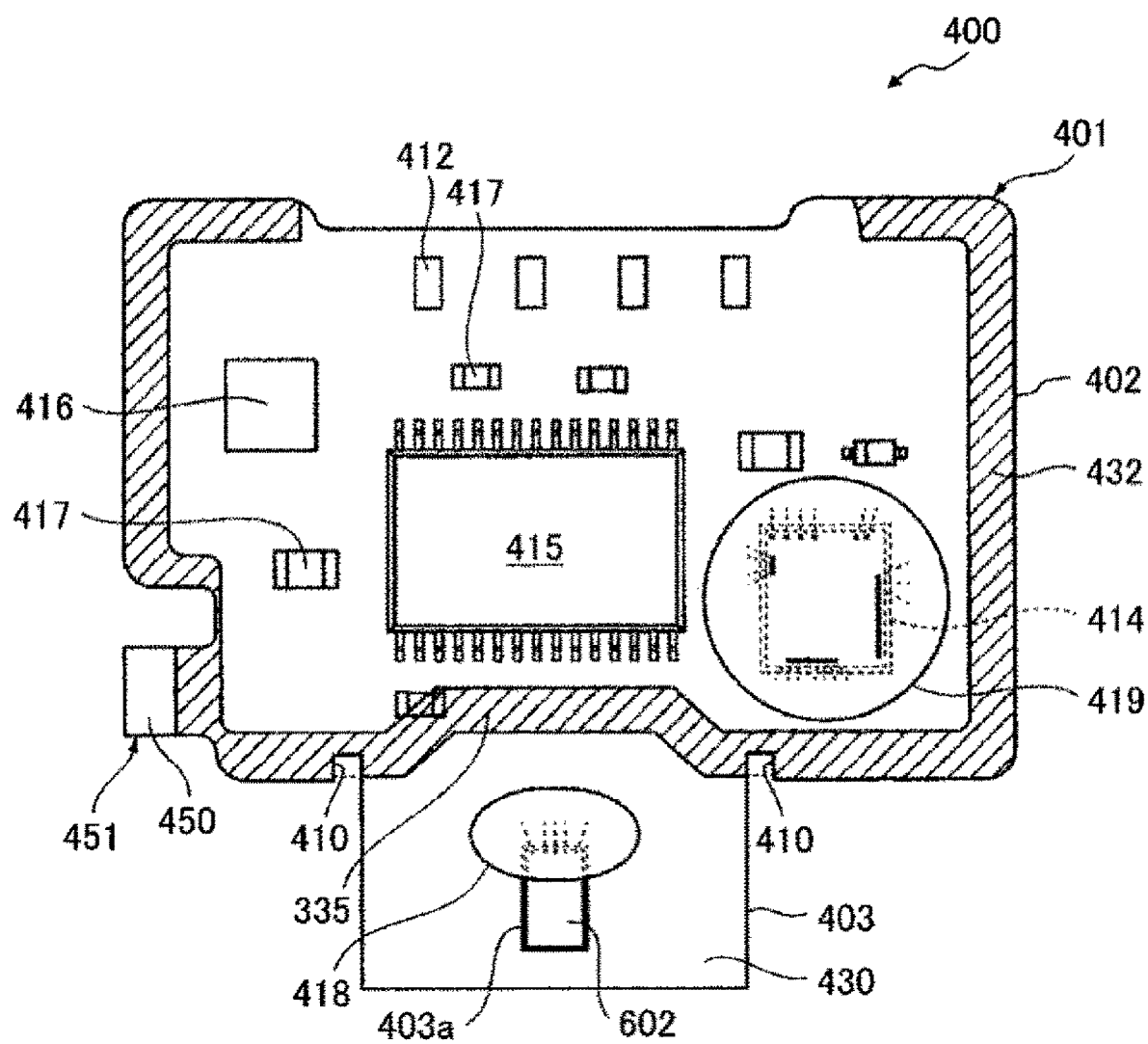

The shaded portion in FIG. 9-1 indicates the secured faces 432 and 434 at which the circuit board 400 is to be covered with the thermoplastic resin used in the resin mold process so that the circuit board 400 is secured to the housing 302 in the resin mold process. It is important that the relationship between the measurement flow-passage face 430 and the flow-amount detecting unit 602 provided on the measurement flow-passage face 430, and the shape of the sub-passage, is retained with high accuracy, meeting the prescribed relationship.

Because the sub-passage is formed and simultaneously the circuit board 400 is secured to the housing 302 that forms the sub-passage, in the resin mold process, the relationship between the sub-passage, and the measurement flow-passage face 430 and the flow-amount detecting unit 602 can be retained with extremely high accuracy. That is, because the circuit board 400 is secured to the housing 302 in the resin mold process, the circuit board 400 can be positioned and secured with high accuracy in the die for forming the housing 302 including the sub-passage. Injecting the thermoplastic resin at high temperature into the die, allows the sub-passage to be formed with high accuracy and additionally the circuit board 400 to be secured with high accuracy. Therefore, an error or a variation to occur for each circuit board 400, can be suppressed into a considerably small value. As a result, the measuring accuracy of the circuit board 400 can improve dramatically.

In the present embodiment, provided are the secured faces 432 and 434 including the circumference of the base portion 402 of the board body 401 covered by the securing portions 372 and 373 of the mold resin forming the housing 302. In the embodiment illustrated in FIG. 9-1, as securing means of performing securing more firmly, through holes 404 are provided at the board body 401 of the circuit board 400 and then the through holes 404 are filled with the mold resin, so that the securing force of the board body 401 increases. The through holes 404 are provided at locations to be secured by the partition walls 335, and the partition wall 335 on the front side and the partition wall 335 on back side are connected through the through holes 404.

It is favorable that the through holes 404 are provided at locations corresponding to the partition walls 335. Because the chemical bond action between the mold resin including thermoplastic resin and the board body 401 including glass epoxy is low, the mold resin and the board body 401 are less likely to adhere to each other. Then, the partition walls 335 each have a length longer than the width thereof and thus tend to expand apart from the board body 401. Therefore, the provision of the through holes 404 at the locations corresponding to the partition walls 335, enables the partition walls 335 that pinch the board body 401 therebetween, to be physically joined together through the through holes 404. Therefore, the circuit board 400 can be secured more firmly to the housing 302, so that a gap can be prevented from being formed to the protruding portion 403. Therefore, the gas to be measured 30 can be prevented from passing through the gap between the partition wall 335 and the protruding portion 403 and entering the circuit room Rc, so that the inside of the circuit room Rc can be completely tightly sealed.

In an embodiment illustrated in FIG. 9-2, in addition to the through holes 404, the end side on the upstream side and the end side on the downstream side of the base portion 402 are each provided with circular-hole-shaped through holes 405. Filling the through holes 405 with the mold resin, further increases the securing force of the board body 401. The end side on the upstream side and the end side on the downstream side of the base portion 402 are pinched from both sides in the thickness direction by the securing portions 372 and 373, and furthermore the front side and the back side are connected through the through holes 405. Therefore, the circuit board 400 can be secured more firmly to the housing 302.

Note that although it is favorable that the through holes 404 are provided to the partition walls 335, in a case where the partition walls 335 are secured to the board body 401 by predetermined securing force, the through holes 404 can be omitted. In an embodiment illustrated in FIG. 9-3, the through holes 404 are omitted and the end side on the upstream side and the end side of the downstream side of the base portion 402 are each provided with the through holes 405. The configuration enables the board body 401 of the circuit board 400 to be secured firmly to the housing 302.

Note that the through holes are not limited to a circular-hole shape, and thus, as illustrated in FIG. 9-4, elongate through holes 406 may be provided. In the present embodiment, the elongate through holes 406 are provided such that the elongate through holes 406 extend along the end side on the upstream side and the end side of the downstream side of the base portion 402. The through holes 406 have the amount of resin for connecting the front side and the back side of the measurement unit 331, larger than the circular-hole-shaped through holes have, and thus stronger securing force can be acquired.

Each embodiment described above, the case of through hole 404, 405, or 406 as exemplary securing means, has been described, but the securing means is not limited to the through holes. For example, in an embodiment illustrated in FIG. 9-5, the end side on the upstream side and the end side on the downstream side of the base portion 402 are each provided with a large cut-away portion 407 extending in the length direction thereof. Then, in an embodiment illustrated in FIG. 9-6, cut-away portions 408 are provided along between the base portion 402 and the protruding portion 403. In an embodiment illustrated in FIG. 9-7, the end side on the upstream side and the end side on the downstream side of the base portion 402 are each provided with a plurality of cut-away portions 409 at predetermined intervals. Then, in an embodiment illustrated in FIG. 9-8, provided is a pair of cut-away portions 410 cut away from both sides of the protruding portion 403 to the base portion 402. The configurations enable the board body 401 of the circuit board 400 to be secured firmly to the housing 302.

7. Circuit Configuration of Physical Quantity Detecting Device 300

7.1 Entire Circuit Configuration of Physical Quantity Detecting Device 300

Figures 1, 11:
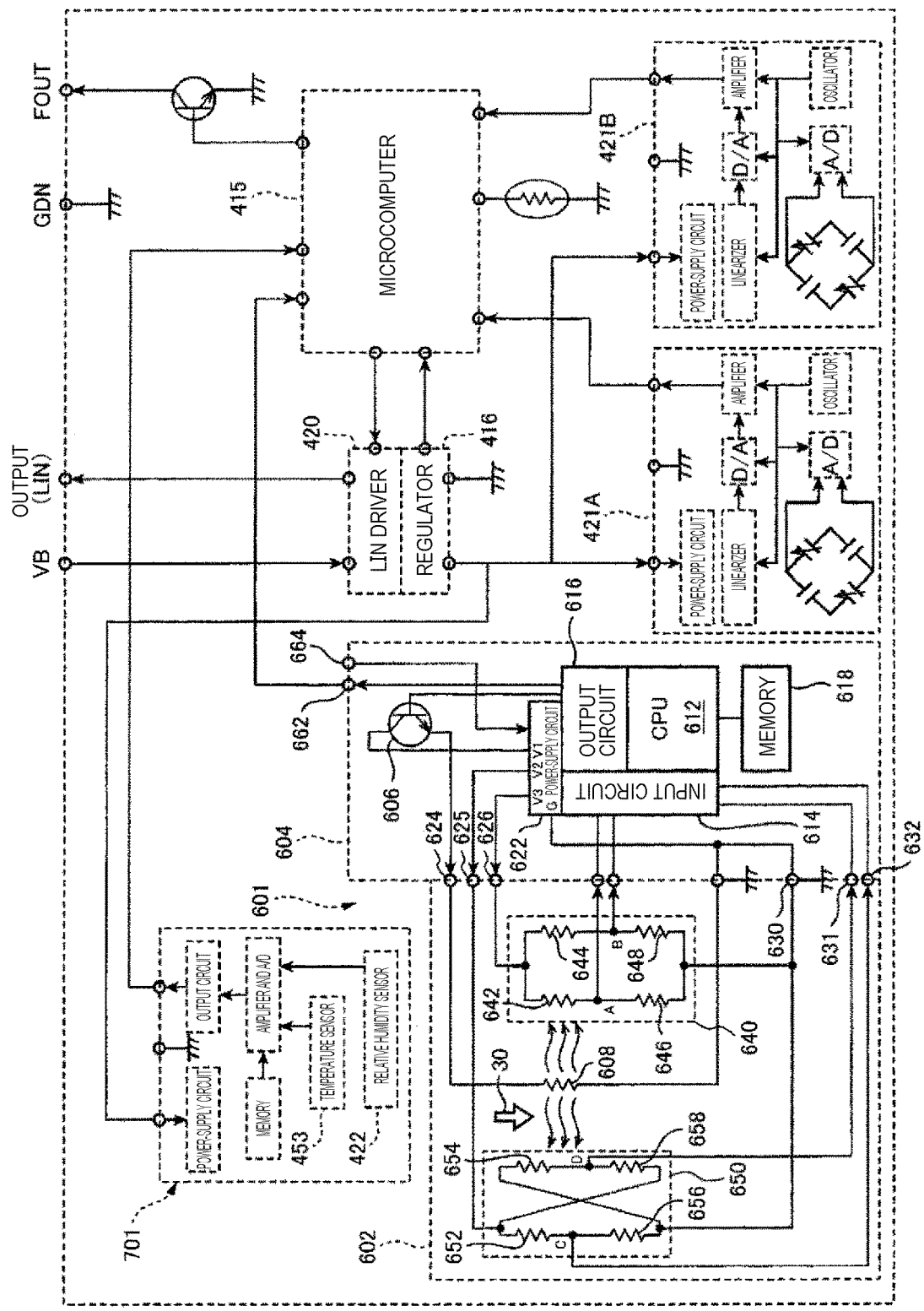
Figures 2, 11:
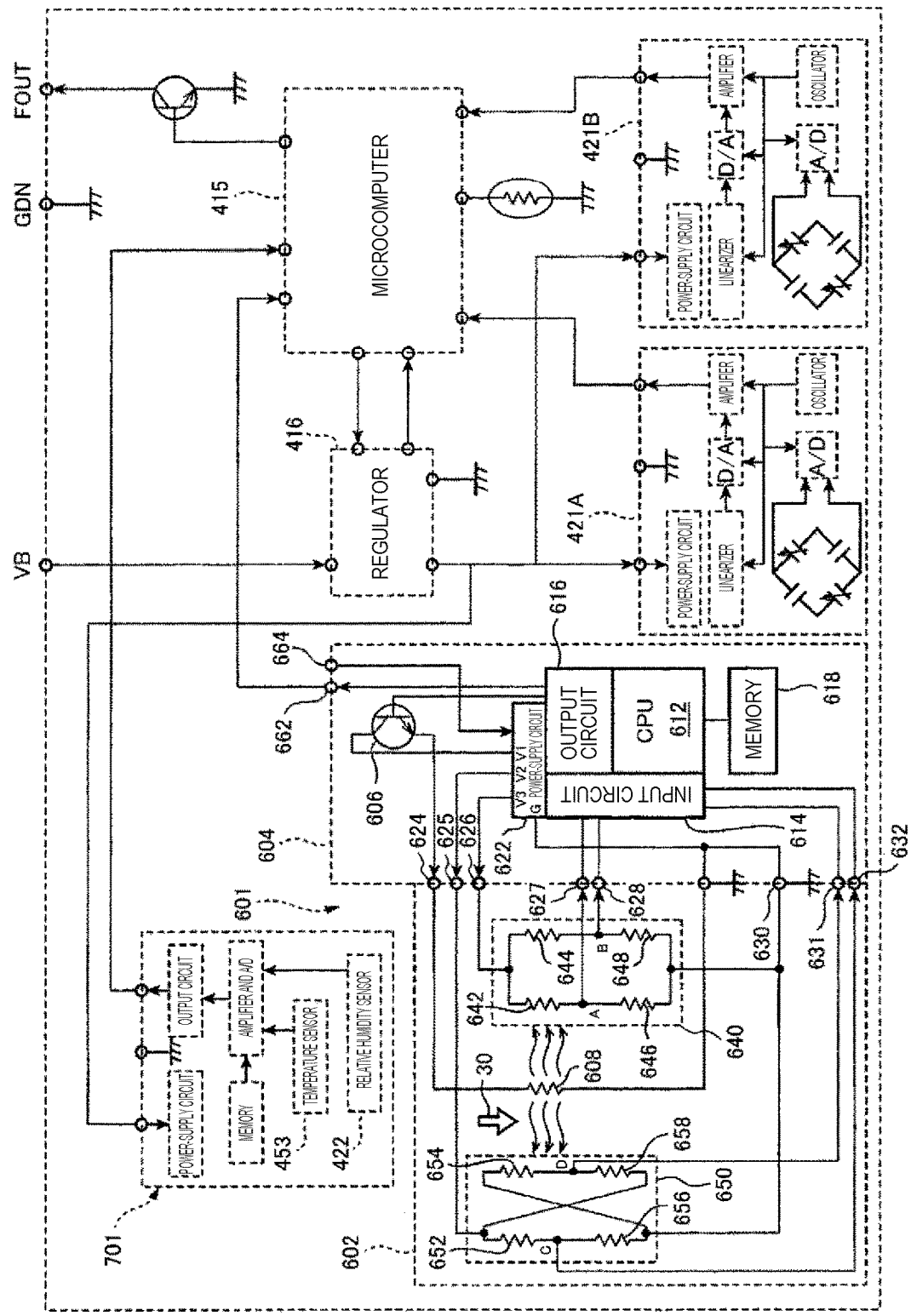

FIG. 11-1 is a circuit diagram of the physical quantity detecting device 300. The physical quantity detecting device 300 has a flow-amount detecting circuit 601 and a temperature and humidity detecting circuit 701.

The flow-amount detecting circuit 601 includes the flow-amount detecting unit 602 having a heating element 608 and a processing unit 604. The processing unit 604 controls the amount of heat generation of the heating element 608 of the flow-amount detecting unit 602, and additionally outputs a signal indicating the amount of flow to the microcomputer 415 through a terminal 662, on the basis of an output of the flow-amount detecting unit 602. In order to perform the processing, the processing unit 604 includes a central processing unit (hereinafter, referred to as a CPU) 612, an input circuit 614, an output circuit 616, a memory 618 retaining a correction value and data indicating the relationship between a measured value and the amount of flow, and a power-supply circuit 622 that supplies constant voltage to each circuit needing the constant voltage. The power-supply circuit 622 is supplied with direct-current power from an external power supply, such as an in-vehicle battery, through a terminal 664 and a ground terminal not illustrated.

The flow-amount detecting unit 602 is provided with the heating element 608 that heats the gas to be measured 30. The power-supply circuit 622 supplies voltage V1 to the collector of a transistor 606 included in a current-supply circuit of the heating element 608, and the CPU 612 adds a control signal to the base of the transistor 606 through the output circuit 616. On the basis of the control signal, the transistor 606 supplies current to the heating element 608 through a terminal 624. The amount of current to be supplied to the heating element 608 is controlled by the control signal added, through the output circuit 616, from the CPU 612 to the transistor 606 included in the current-supply circuit of the heating element 608. The processing unit 604 controls the amount of heat generation of the heating element 608 such that the temperature of the gas to be measured 30 is higher than the original temperature by a predetermined temperature, such as 100° C., due to heating of the heating element 608.

The flow-amount detecting unit 602 has a heating control bridge 640 that controls the amount of heat generation of the heating element 608 and a flow-amount detecting bridge 650 that measures the amount of flow. One end of the heating control bridge 640 is supplied with constant voltage V3 from the power-supply circuit 622 through a terminal 626, and the other end of the heating control bridge 640 is connected to a ground terminal 630. One end of the flow-amount detecting bridge 650 is supplied with constant voltage V2 from the power-supply circuit 622 through a terminal 625, and the other end of the flow-amount detecting bridge 650 is connected to the ground terminal 630.

The heating control bridge 640 has a resistor 642 including a temperature-sensing resistive element having a resistance value varying on the basis of the temperature of the gas to be measured 30 that has been heated, and the resistor 642 and resistors 644, 646, and 648 are included in a bridge circuit. The difference in potential between the intersection A of the resistors 642 and 646 and the intersection B of the resistors 644 and 648 is input into the input circuit 614 through terminals 627 and 628, and the CPU 612 controls current to be supplied from the transistor 606 and controls the amount of heat generation of the heating element 608 such that the difference in potential between the intersections A and B is a predetermined value that is zero volts in the embodiment. The flow-amount detecting circuit 601 illustrated in FIG. 11-1 heats the gas to be measured 30 with the heating element 608 such that the original temperature of the gas to be measured 30 increases by a certain temperature, for example, constantly 100° C. In order to perform the heating control with high accuracy, the resistance value of each resistor included in the heating control bridge 640 is set such that the difference in potential between the intersections A and B is zero volts when the temperature of the gas to be measured 30 heated by the heating element 608 is higher than the original temperature by the certain temperature, for example, constantly 100° C. Therefore, in the flow-amount detecting circuit 601, the CPU 612 controls the current to be supplied to the heating element 608 such that the difference in potential between the intersections A and B is zero volts.

The flow-amount detecting bridge 650 includes four temperature-sensing resistive elements of resistors 652, 654, 656, and 658. The four temperature-sensing resistive elements are disposed along the flow of the gas to be measured 30. The resistors 652 and 654 are disposed on the upstream side of the flow passage of the gas to be measured with respect to the heating element 608, and the resistors 656 and 658 are disposed on the downstream side of the flow passage of the gas to be measured 30 with respect to the heating element 608. In order to improve the measuring accuracy, the resistors 652 and 654 are disposed mutually having substantially the same distances to the heating element 608, and the resistors 656 and 658 are disposed mutually having substantially the same distances to the heating element 608.

The difference in potential between the intersection C of the resistors 652 and 656 and the intersection D of the resistors 654 and 658, is input into the input circuit 614 through terminals 631 and 632. In order to improve the measuring accuracy, for example, each resistor of the flow-amount detecting bridge 650 is set such that the difference in potential between the intersections C and D is zero with the flow of the gas to be measured 30 zero. Therefore, in a state where the difference in potential between the intersections C and D is, for example, zero volts, the CPU 612 outputs an electrical signal indicating that the amount of flow in the main passage 124 is zero, from the terminal 662, on the basis of a measured result in which the amount of flow of the gas to be measured 30 is zero.

In a case where the gas to be measured 30 flows in the arrow direction of FIG. 11-1, the resistors 652 and 654 disposed on the upstream side are cooled by the gas to be measured 30, and the resistors 656 and 658 disposed on the downstream side of the gas to be measured 30, are heated by the gas to be measured 30 heated by the heating element 608, thereby the resistors 656 and 658 increase in temperature. Thus, a difference in potential occurs between the intersections C and D of the flow-amount detecting bridge 650, and the difference in potential is input into the input circuit 614 through the terminals 631 and 632. On the basis of the difference in potential between the intersections C and D of the flow-amount detecting bridge 650, the CPU 612 retrieves the data indicating the relationship between the difference in potential and the amount of flow in the main passage 124, stored in the memory 618, and acquires the amount of flow in the main passage 124. An electrical signal indicating the amount of flow in the main passage 124 acquired in this manner, is output through the terminal 662. Note that the terminals 664 and 662 illustrated in FIG. 11-1 are denoted with new reference numbers, but are included in the connecting terminals 412 illustrated in FIG. 9-1.

The memory 618 stores the data indicating the relationship between the difference in potential between the intersections C and D and the amount of flow in the main passage 124, and further stores correction data for reducing a measurement error, such as a variation, acquired on the basis of an actual measured value of the gas after the production of the circuit board 400.

The temperature and humidity detecting circuit 701 includes: an input circuit including, for example, an amplifier and A/D, into which detected signals are input from the temperature sensor 453 and the humidity sensor 422; an output circuit; a memory retaining a correction value and data indicating the relationship between temperature and absolute humidity; and a power-supply circuit 622 that supplies constant voltage to each circuit needing the constant voltage. The signal output from the flow-amount detecting circuit 601 and a signal output from the temperature and humidity detecting circuit 701, are input into the microcomputer 415. The microcomputer 415 having a flow-amount calculation unit, a temperature calculation unit, and an absolute humidity calculation unit, calculates, on the basis of the signals, the amount of flow, temperature, and absolute humidity included in the physical quantity of the gas to be measured 30, and outputs the amount of flow, the temperature, and the absolute humidity to the ECU 200.

The physical quantity detecting device 300 and the ECU 200 are connected with a communication cable, and communication is performed with a digital signal in accordance with a communication standard, such as SENT, LIN, or CAN. In the present embodiment, the microcomputer 415 inputs a signal into a LIN driver 420, and then LIN communication is performed from the LIN driver 420. Information to be output from the LIN driver of the physical quantity detecting device 300 to the ECU 200, is superimposed and output in digital communication with a single communication cable or two communication cables.

The absolute humidity calculation unit of the microcomputer 415 calculates absolute humidity, on the basis of relative humidity information and temperature information output from the humidity sensor 422, and performs processing of correcting the absolute humidity on the basis of the error. The corrected absolute humidity calculated by the absolute humidity calculation unit, is used for various types of engine drive control in a control unit of the ECU 200. The ECU 200 can directly use information regarding a comprehensive error, for the various types of engine drive control.

Note that the case where the physical quantity detecting device 300 having the LIN driver 420 performs the LIN communication, has been described in the embodiment illustrated in FIG. 11-1 described above, but the physical quantity detecting device 300 is not limited to this. Thus, as illustrated in FIG. 11-2, direct communication may be performed with the microcomputer 415 instead of using the LIN communication.

The basic configuration of the temperature detecting unit 451 has been given in the physical quantity detecting device 300 described above. In the basic configuration described above, the protruding portion 450 protrudes from the second sub-passage inlet 306a of the second sub-passage 306 upstream of the gas to be measured 30. However, in an embodiment of the present invention, a protruding portion 460 corresponding to the protruding portion 450 protrudes along the extending direction of the upstream-side outer wall 336 of the measurement unit 331. The configuration of the temperature detecting unit 451 according to the present invention, will be described in detail below with FIGS. 12-1 to 12-11.

Figures 1, 12:
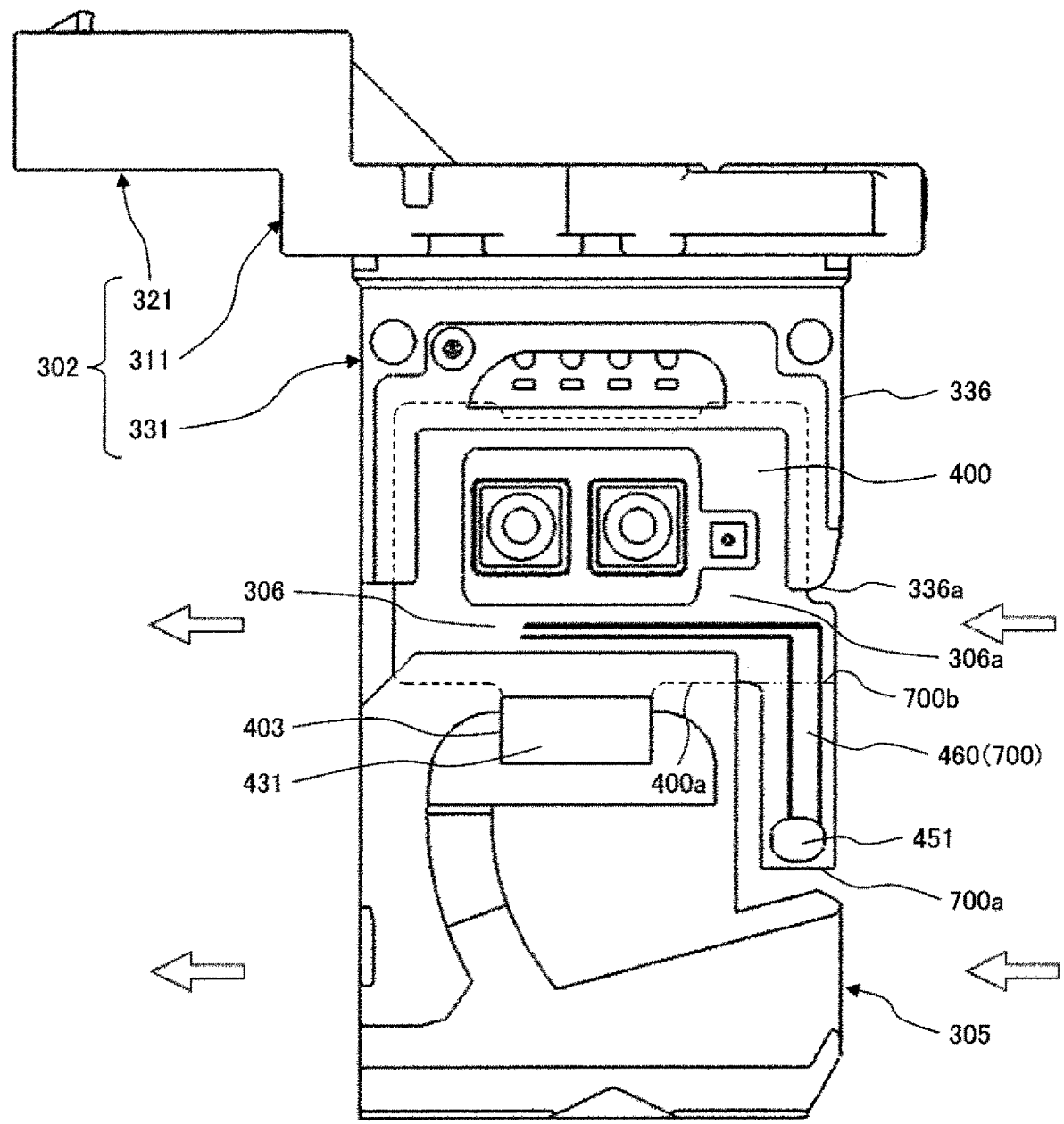
Figures 2, 12:
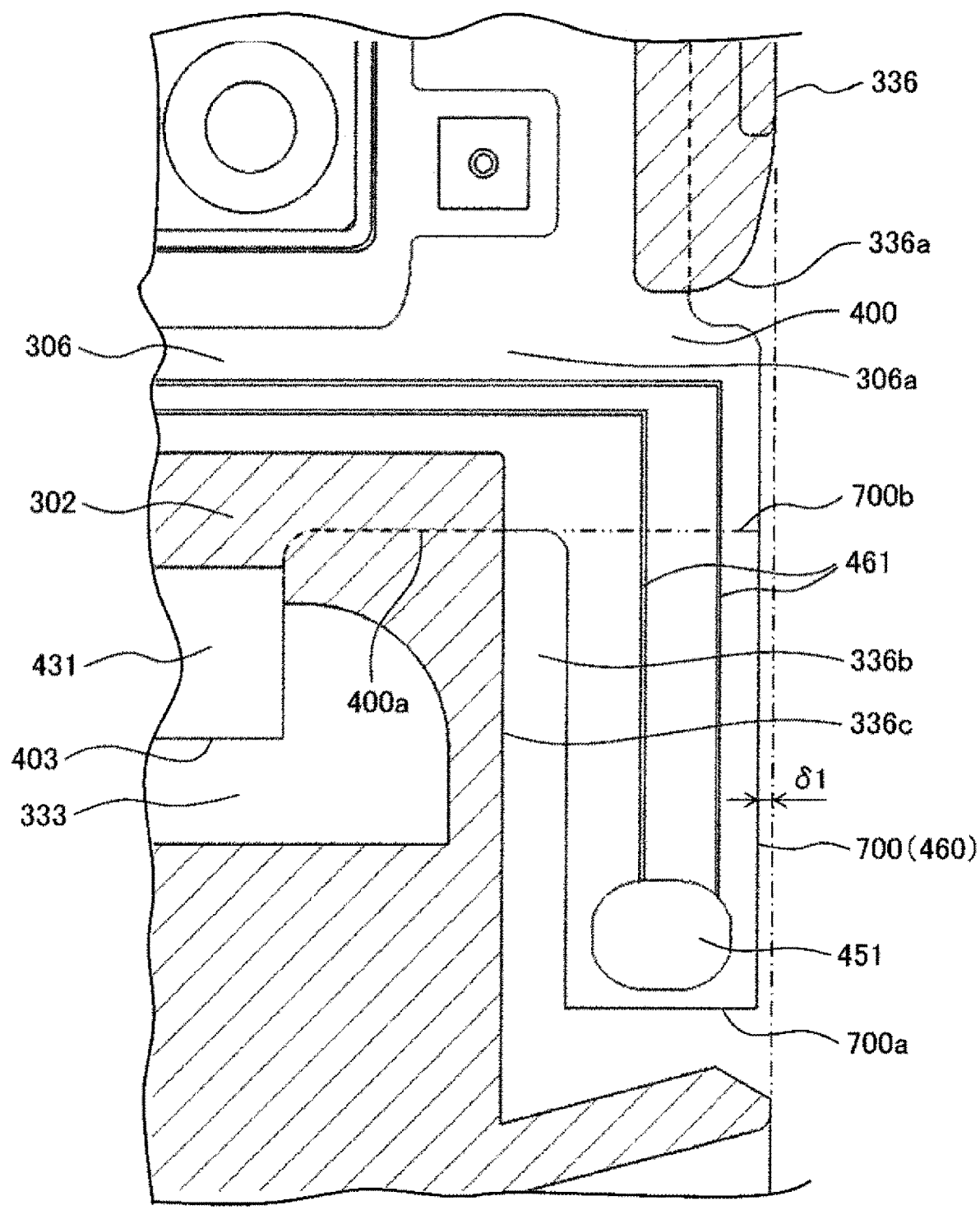
Figures 3, 12:
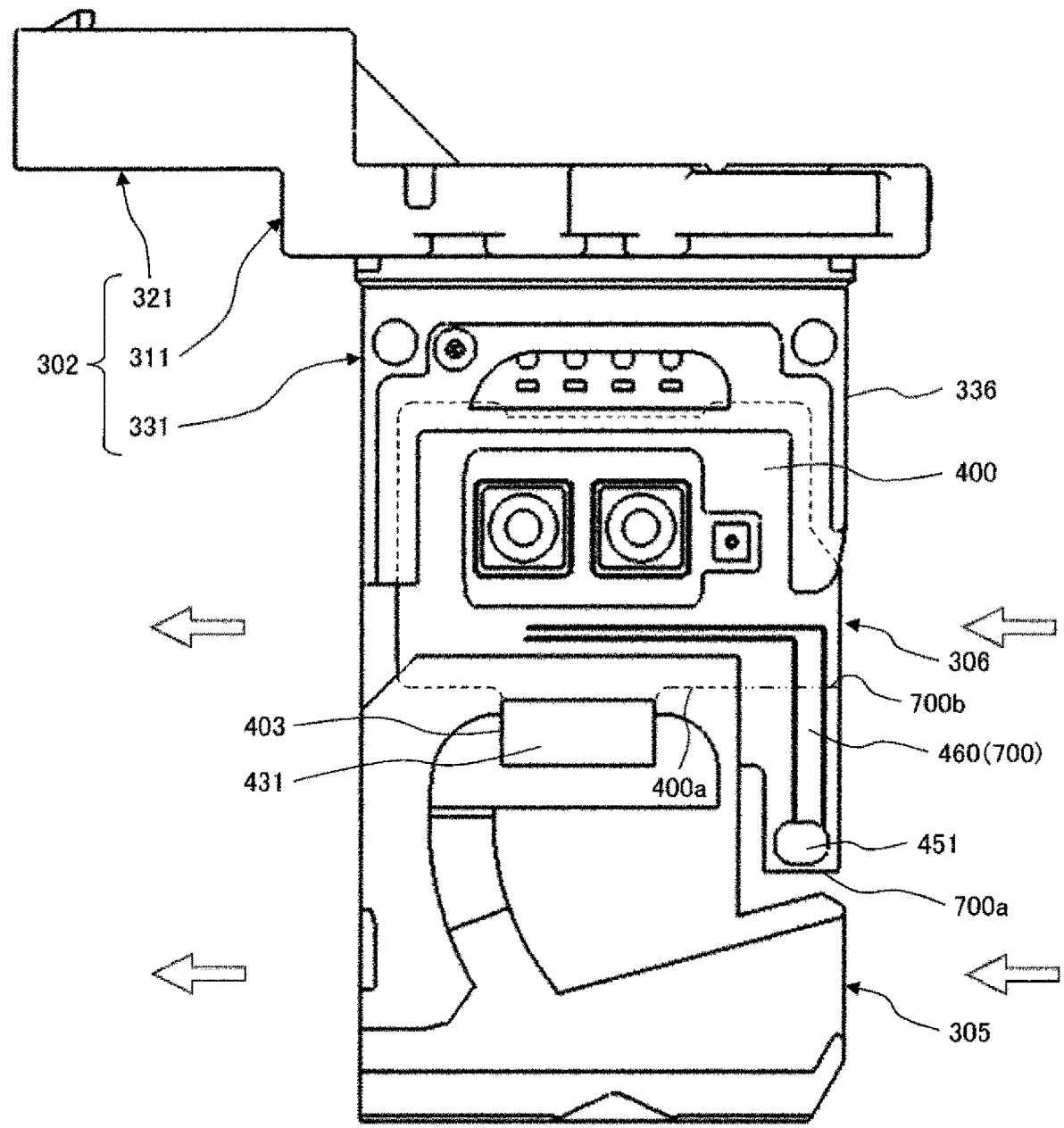
Figures 4, 12:
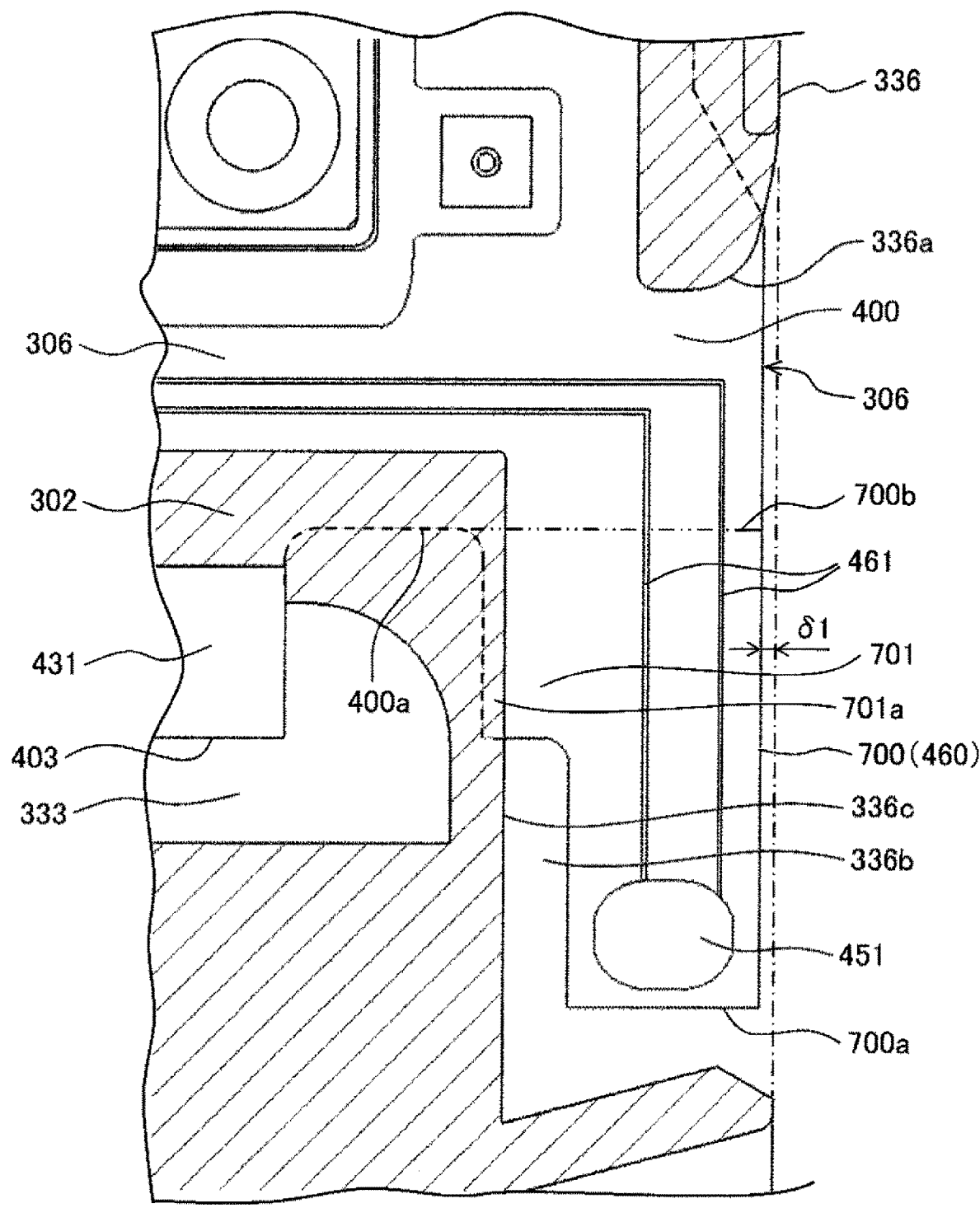
Figures 5, 12:
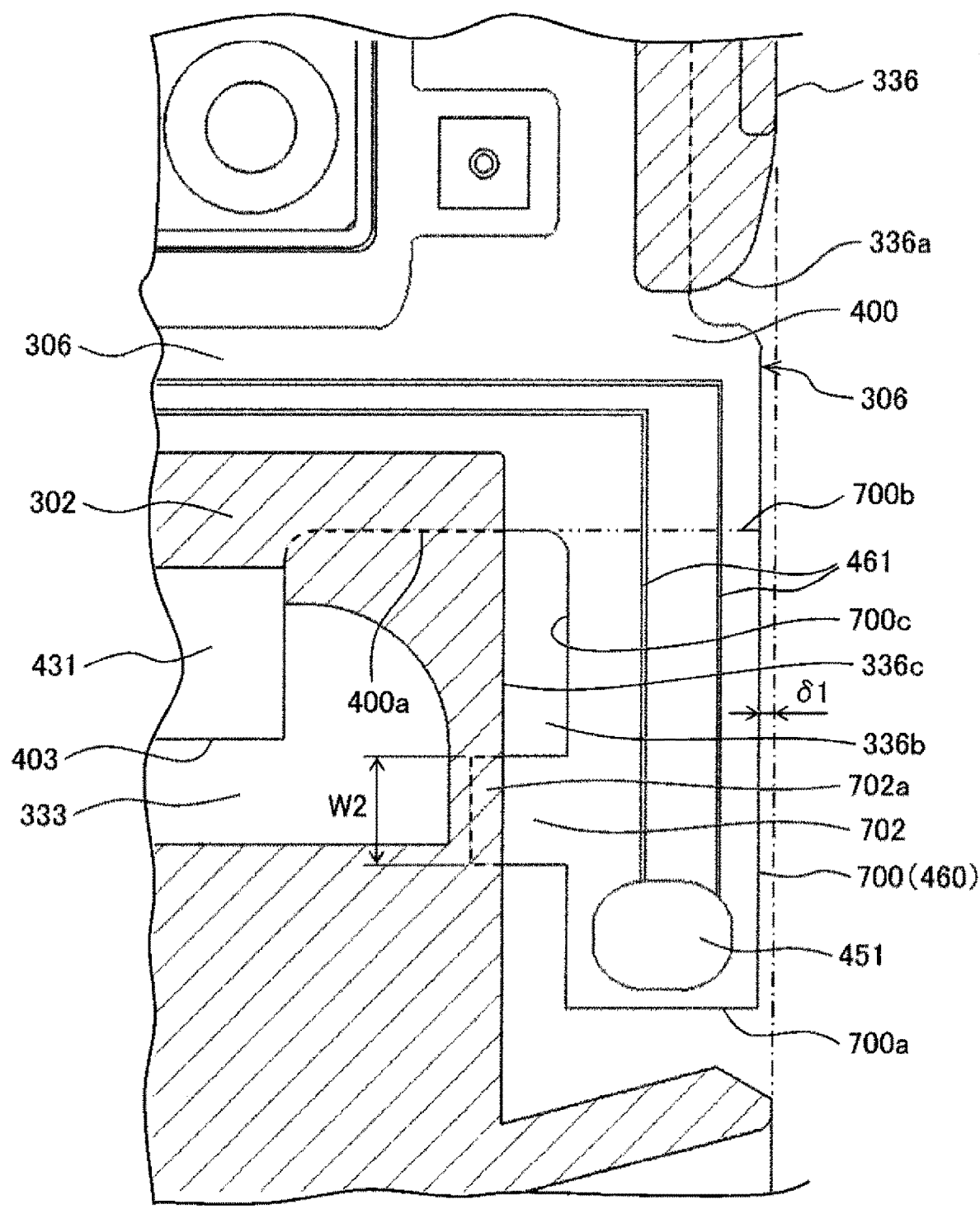
Figures 6, 12:
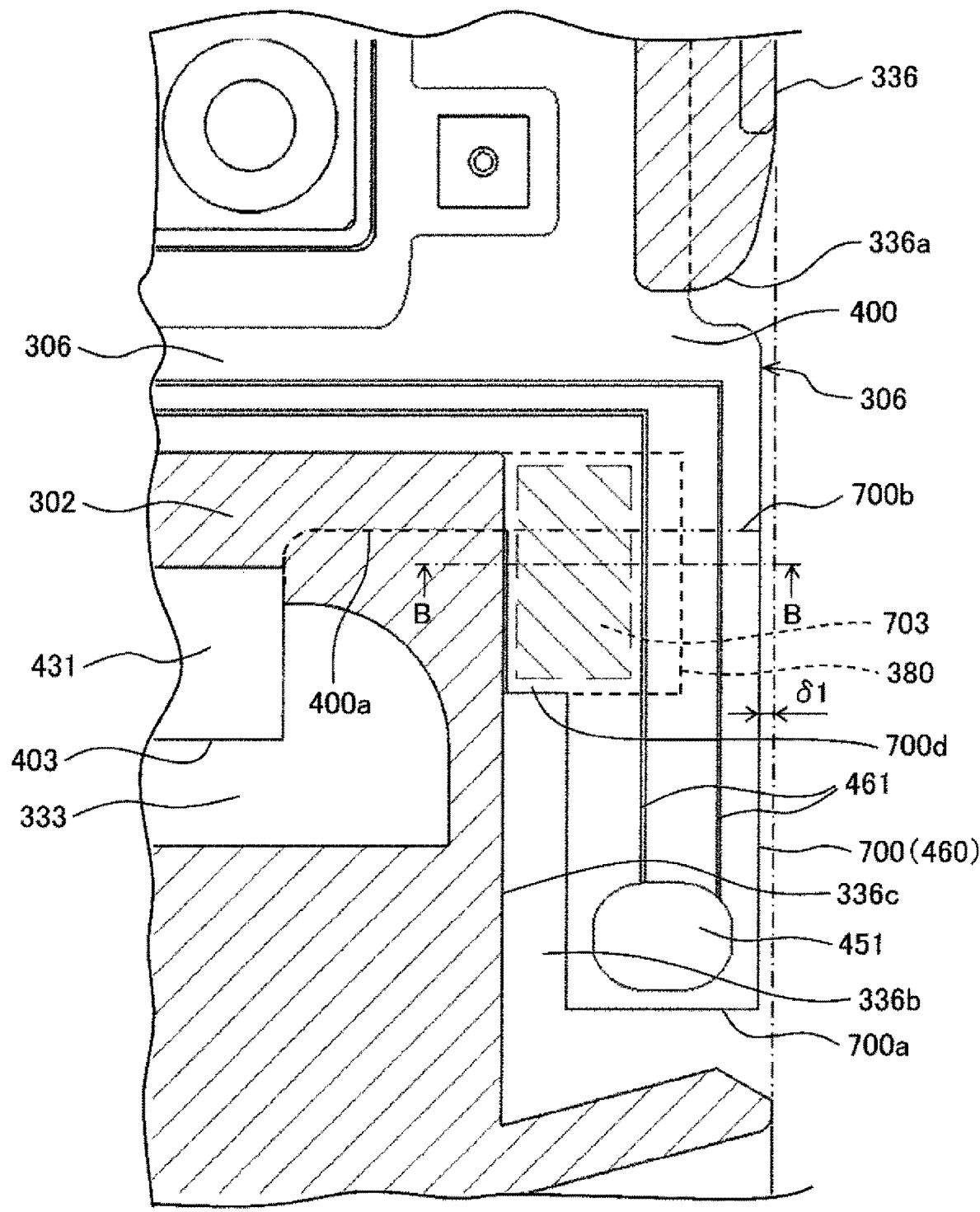
Figures 7, 12:
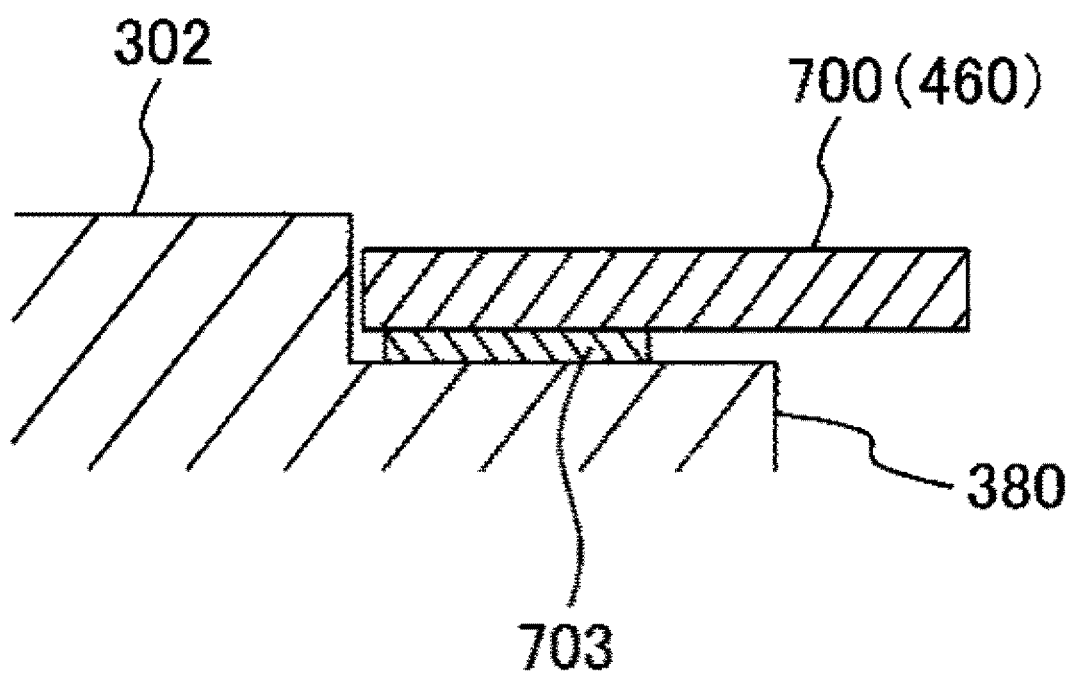
Figures 8, 12:
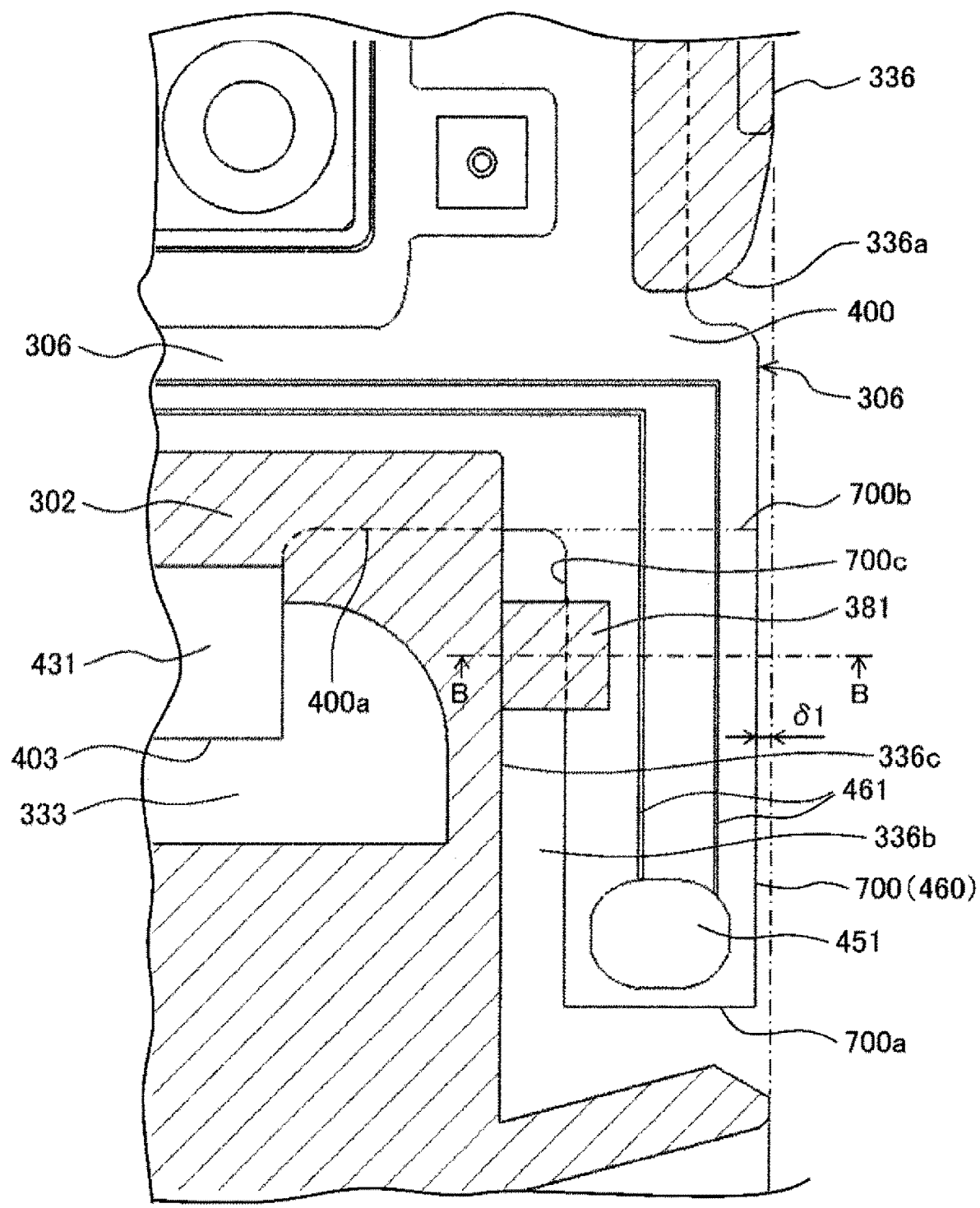
Figures 9, 12:
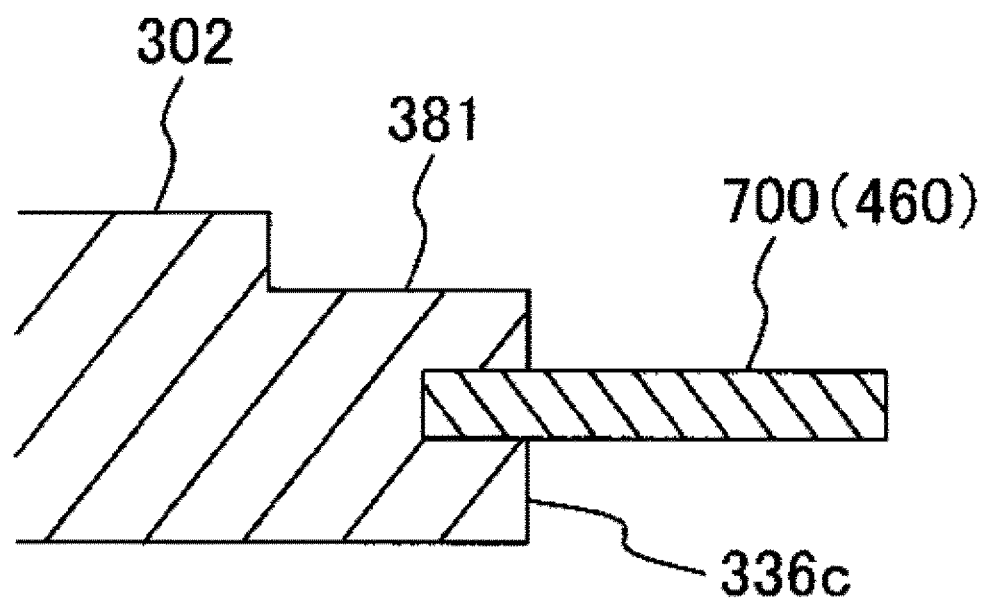
Figures 10, 12:
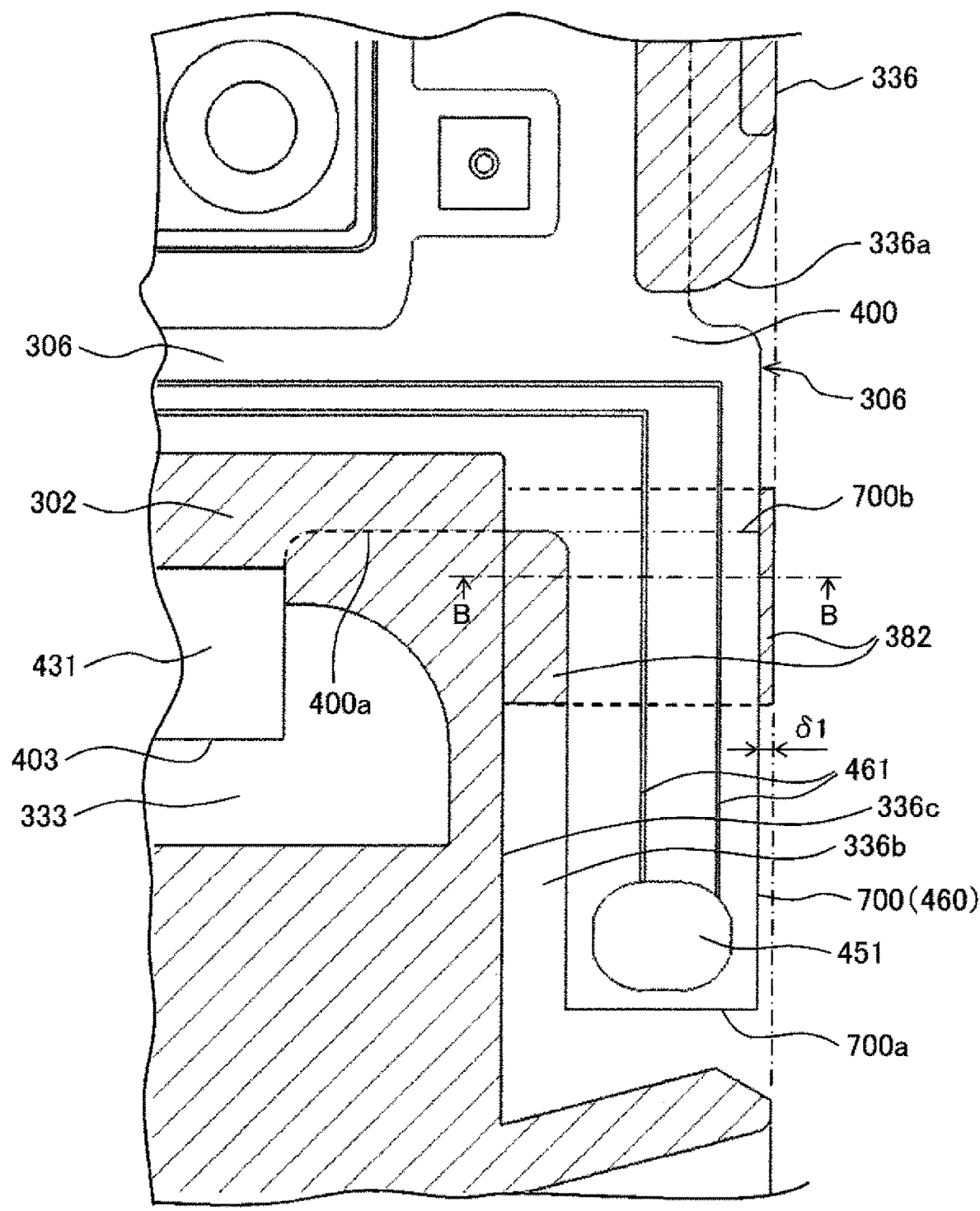
Figures 11, 12:
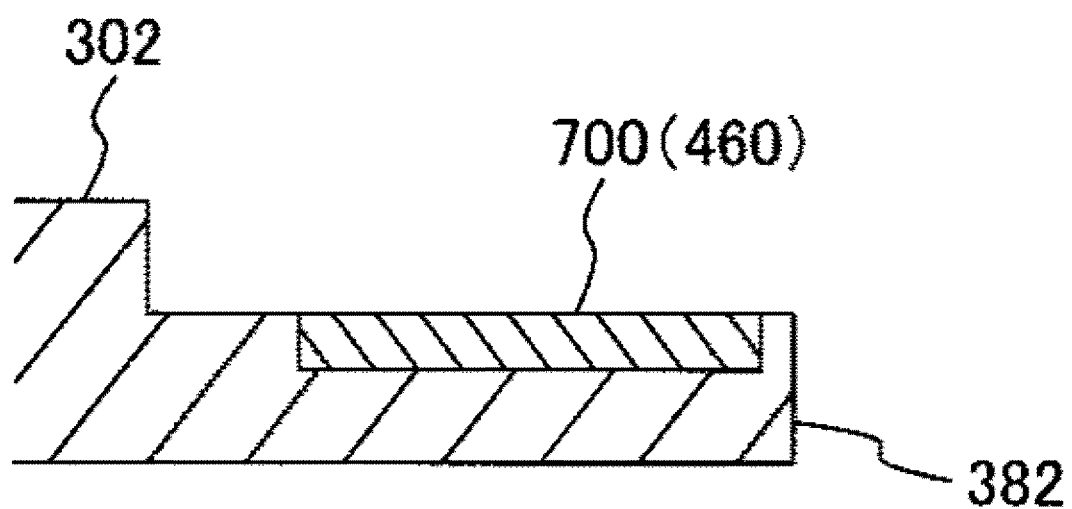

8. Structure of Temperature Detecting Unit 451 According to Present Invention 8.1 Structure of Structure of Temperature Detecting Unit 451 in Comparative Example with Present Invention FIG. 12-1 is a view illustrating a comparative example of the physical quantity detecting device, and is a rear view illustrating the physical quantity detecting device having the back cover removed. FIG. 12-2 is a rear view illustrating the temperature detecting unit provided at a cantilever-shaped portion of the physical quantity detecting device illustrated in FIG. 12-1.

In the comparative example, as illustrated in FIGS. 12-1 and 12-2, at the center portion of the measurement unit 331 provided with the second sub-passage inlet 306a, the upstream-side outer wall 336 in the measurement unit 331 included in the housing 302, hollows to the second sub-passage inlet 306a side of the second sub-passage 306, namely, to the downstream-side outer wall 338 side of the measurement unit 331 such that a hollow-shaped portion 336a is provided. The hollow-shaped portion 336a forms a temperature-detecting-unit housing space 336b housing the temperature detecting unit 451, and the second sub-passage inlet 306a opens inside the temperature-detecting-unit housing space 336b.

The protruding portion 460 of the circuit board 400 is disposed in the temperature-detecting-unit housing space 336b. The protruding portion 460 protrudes from the hollow-shaped portion 336a formed at the upstream-side outer wall 336 to the temperature-detecting-unit housing space 336b along the extending direction of the upstream-side outer wall 336. That is the protruding portion 460 protrudes from the hollow-shaped portion 336a in the opposite direction to the side on which the flange 311 is provided. Then, the protruding portion 460 includes a cantilever-shaped portion 700.

As illustrated in FIG. 12-2, the leading end of the protruding portion 460 is disposed at a position recessed with respect to the face on the most upstream side of the upstream-side outer wall 336 in the flow direction of the gas to be measured 30. In FIG. 12-2, the face on the most upstream side of the upstream-side outer wall 336 is indicated with a dot-and-dash line, and the leading end of the protruding portion 460 is positioned inside the temperature-detecting-unit housing space 336b by 51 with respect to the dot-and-dash line. The gas to be measured 30 flows from the temperature-detecting-unit housing space 336b into the second sub-passage 306. Thus, the leading end of the protruding portion 460 is positioned on the downstream side with respect to the face on the most upstream side of the upstream-side outer wall 336 in the flow direction of the gas to be measured 30.

The temperature detecting unit 451 having the temperature sensor (temperature detecting element) 453 is provided on the rear face of the circuit board 400, and is disposed facing the second sub-passage 306 side. The protruding portion 460 (cantilever-shaped portion 700) having the temperature detecting unit 451 provided at the leading end thereof, includes a support portion of the temperature detecting unit 451, formed in a cantilever shape.

8.2 Secured Structure and Effect of Circuit Board 400 Due to Housing 302

Securing the circuit board 400 to the housing 302 in the resin mold process, will be described with separated embodiments. Note that each embodiment to be described below is applied to the physical quantity detecting device 300 described above.

Note that the circuit board 400 has a substantially rectangular shape, and the protruding portion 403 having the measurement flow-passage face 430 and the back face 431 thereof and the protruding portion 460 at which the temperature detecting unit 451 is implemented, protrude from a side 400a of the circuit board 400 having the substantially rectangular shape. That is the protruding portion 403 and the protruding portion 460 protrude from the same side (edge) 400a of the circuit board 400 having the rectangular shape, in the same direction. Note that the protruding portion 460 is disposed on the upstream side with respect to the protruding portion 403 in the flow direction of the gas to be measured 30.

The end portion on the side 400a side in the protruding portion 460 is referred to as a base end portion 700b, and the end portion on the opposite side to the base end portion 700b is referred to as a leading end portion 700a. The base end portion 700b is the end portion on the side on which the protruding portion 460 is connected with the circuit board 400, and the leading end portion 700a is the end portion on the free end side of the protruding portion 460 supported in the cantilever shape. The base end portion 700b of the protruding portion 460 is located on the side 400a or on the extension line of the side 400a (chain double-dashed line).

The provision of the temperature detecting unit 451 in the neighborhood of the leading end portion 700a of the protruding portion 460 supported in the cantilever shape, enables the temperature detecting unit 451 to reduce heat transfer from the circuit board 400 or the housing 302 side and to prevent the measuring accuracy of temperature from deteriorating.

The configuration of the comparative example described above is applied to each embodiment to be described below. Note that a configuration different from that of the comparative example will be specifically described in each embodiment.

First Embodiment

FIG. 12-3 is a view illustrating one embodiment (first embodiment) of the physical quantity detecting device according to the present invention, and is a rear view illustrating the physical quantity detecting device having the back cover removed. FIG. 12-4 is a rear view illustrating the temperature detecting unit provided at the cantilever-shaped portion of the physical quantity detecting device illustrated in FIG. 12-3.

The circuit board 400 includes the protruding portion 460 (cantilever-shaped portion 700) at which the temperature detecting unit 451 is implemented, similarly to the comparative example described above.

In the present embodiment, a step-shaped portion 701 is provided between the leading end portion 700a and the base end portion 700b of the protruding portion 460. The step-shaped portion 701 includes a width-extended portion formed protruding from the protruding portion 460 to the lower face 336c side of the temperature-detecting-unit housing space 336b, the width-extended portion being extended in width with respect to the implementation face on which the temperature detecting unit 451 (temperature detecting element 453) is implemented. The step-shaped portion 701 is secured with a side edge portion 701a on the width-extended side (lower face 336c side), embedded in the housing 302. The step-shaped portion 701 includes a portion included in the base end portion 700b of the protruding portion 460. This arrangement allows the step-shaped portion 701 to be provided on the base end portion 700b side with respect to an implementation portion of the temperature detecting unit 451 and allows a cantilever-shaped part to be formed at the portion at which the temperature detecting unit 451 is implemented.

The step-shaped portion 701 is embedded in the resin mold of the housing 302. This arrangement can reduce the length of the portion to be supported in the cantilever shape in the protruding portion 460 (cantilever-shaped portion 700). Then, the resonance frequency at which the protruding portion 460 resonates due to vibration, can increase. As a result, the protruding portion 460 can be inhibited from resonating in the circuit board 400.

The provision of the step-shaped portion 701 on the base end portion 700b side of the protruding portion 460, can reduce heat that transfers to the temperature detecting unit 451, through the step-shaped portion 701. In order to reduce the heat that transfers to the temperature detecting unit 451, it is desirable that the step-shaped portion 701 is formed on the base end portion 700b side with a large interval to the implementation portion of the temperature detecting unit 451.

Note that, in the present embodiment, although the length of the portion to be supported in the cantilever shape is short because the cantilever-shaped portion 700 has the step-shaped portion 701, the portion between the leading end portion 700a and the base end portion 700b of the protruding portion 460, is regarded as the cantilever-shaped portion 700. The cantilever-shaped portion 700 is similarly defined in each embodiment to be described later.

Second Embodiment

FIG. 12-5 is a view illustrating one embodiment (second embodiment) of the physical quantity detecting device according to the present invention, and is a rear view illustrating the temperature detecting unit provided at the cantilever-shaped portion.

In the present embodiment, as means of shortening the length of the portion to be supported in the cantilever shape of the protruding portion 460 (cantilever-shaped portion 700), part of the protruding portion 460 protrudes to the housing 302 side such that a protruding-shaped portion 702 is formed. The protruding-shaped portion 702 includes a width-extended portion extended in width with respect to the implementation face on which the temperature detecting unit 451 (temperature detecting element 453) is implemented. The protruding-shaped portion 702 is secured with a side edge portion 702a on the width-extended side (lower face 336c side), embedded in the housing 302. The protruding-shaped portion 702 is provided at a position apart from the base end portion 700b of the protruding portion 460 between the leading end portion 700*a* and the base end portion 700*b* of the protruding portion 460. Part of the protruding-shaped portion 702 is embedded in the housing 302 due to the resin molding.

The protruding-shaped portion 702 is formed on the base end portion 700*b* side with respect to the implementation portion of the temperature detecting unit 451 such that the cantilever-shaped part is formed at the portion at which the temperature detecting unit 451 is implemented. This arrangement can shorten the length of the portion to be supported in the cantilever shape in the protruding portion 460 (cantilever-shaped portion 700). As long as the protruding-shaped portion 702 is located on the base end portion 700*b* side with respect to the temperature detecting unit 451, the protruding-shaped portion 702 may be disposed anywhere. A single protruding-shaped portion 702 or a plurality of protruding-shaped portions 702 may be provided in number.

The protruding portion 460 has a contactless portion 700*c* to the housing 302 between the protruding-shaped portion 702 and the base end portion 700*b*. That is the contactless portion 700*c* is provided on the base end portion 700*b* side with respect to the protruding-shaped portion 702 of the protruding portion 460. This arrangement enables the neighborhood of the leading end portion 700*a* of the protruding portion 460, to be supported and the support range thereof to be reduced. Thus, the length of the portion to be supported in the cantilever shape of the protruding portion 460 can be shortened, and additionally heat transfer to the temperature detecting unit 451 can be inhibited.

The protruding-shaped portion 702 of the present embodiment is disposed at a closer position to the implementation portion of the temperature detecting unit 451 than the step-shaped portion 701 of the first embodiment is. Thus, the amount of heat that transfers to the temperature detecting unit 451 through the protruding-shaped portion 702, is large. Hence, it is desirable that the width dimension W2 of the protruding-shaped portion 702 in the protruding direction of the protruding portion 460 is made as small as possible such that the amount of heat that transfers to the temperature detecting unit 451 is small.

Third Embodiment

FIG. 12-6 is a view illustrating one embodiment (third embodiment) of the physical quantity detecting device according to the present invention, and is a rear view illustrating the temperature detecting unit provided at the cantilever-shaped portion. FIG. 12-7 is a sectional view illustrating section B-B of FIG. 12-6.

In the present embodiment, as means of shortening the length of the portion to be supported in the cantilever shape of the protruding portion 460 (cantilever-shaped portion 700), a support portion (foundation portion) 380 is provided at the housing 302. The support portion 380 is formed as a protruding-shaped portion protruding from the housing 302 to the protruding portion 460 side. The support portion 380 is provided in a range including the base end portion 700*b*, between the base end portion 700*b* and the leading end portion 700*a* of the protruding portion 460. That is the support portion 380 is formed on the base end portion 700*b* side with respect to the implementation portion of the temperature detecting unit 451 of the protruding portion 460. This arrangement allows the cantilever-shaped part to be provided in the neighborhood of the implementation portion of the temperature detecting unit 451 at the leading end portion 700*a* of the protruding portion 460.

The support portion 380 is provided on the face (back face) on the opposite side to the face of the protruding portion 460 on the side on which the temperature detecting unit 451 is implemented. The protruding portion 460 and the support portion 380 are secured with a binder 703, such as adhesive. The adhesion of the cantilever-shaped portion and the support portion 380, allows the protruding portion 460 to be supported by the support portion 380 and the length of the cantilever-shape part to be shortened.

Note that, in the present embodiment, the support portion 380 has a width-extended portion 700*d* formed protruding from the protruding portion 460 to the lower face 336*c* side of the temperature-detecting-unit housing space 336*b*, the width-extended portion 700*d* being extended in width with respect to the implementation face on which the temperature detecting unit 451 (temperature detecting element 453) is implemented. The width-extended portion 700*d* expands the securing face on which the protruding portion 460 is to be secured with the binder 703 (joint face, adhering face).

The support portion 380 may be provided at a position apart from the base end portion 700*b* between the leading end portion 700*a* and the base end portion 700*b* of the protruding portion 460 such that the contactless portion 700*c* of the second embodiment is located.

Fourth Embodiment

FIG. 12-8 is a view illustrating one embodiment (fourth embodiment) of the physical quantity detecting device according to the present invention, and is a rear view illustrating the temperature detecting unit provided at the cantilever-shaped portion. FIG. 12-9 is a sectional view illustrating section B-B of FIG. 12-8.

In the present embodiment, as means of shortening the length of the portion to be supported in the cantilever shape of the protruding portion 460 (cantilever-shaped portion 700), a protruding-shaped portion 381 is provided at the housing 302, the protruding-shaped portion 381 protruding to the cantilever-shaped portion. The protruding-shaped portion 381 supports one side edge portion of the protruding portion 460 (side edge portion positioned on the downstream side) such that conductors 461 are exposed. The protruding-shaped portion 381 is provided at a position apart from the base end portion 700*b* of the protruding portion 460 between the leading end portion 700*a* and the base end portion 700*b* of the protruding portion 460. The protruding-shaped portion 381 is formed on the base end portion 700*b* side with respect to the implementation portion of the temperature detecting unit 451 of the protruding portion 460 such that the cantilever-shaped part is formed at the portion at which the temperature detecting unit 451 is implemented. This arrangement can shorten the length of the portion to be supported in the cantilever shape in the protruding portion 460 (cantilever-shaped portion 700).

The protruding portion 460 has the contactless portion 700*c* to the housing 302 between the protruding-shaped portion 381 and the base end portion 700*b*. That is the contactless portion 700*c* is provided on the base end portion 700*b* side with respect to the protruding-shaped portion 381 of the protruding portion 460. This arrangement enables the neighborhood of the leading end portion 700*a* of the protruding portion 460, to be supported and the support range thereof to be reduced. Thus, the length of the portion to be supported in the cantilever shape of the protruding portion 460 can be shortened, and additionally heat transfer to the temperature detecting unit 451 can be inhibited.

The protruding-shaped portion 381 may be provided such that the neighborhood of the leading end portion 700b of the protruding portion 460 is supported without the contactless portion 700c located.

Fifth Embodiment

FIG. 12-10 is a view illustrating one embodiment (fifth embodiment) of the physical quantity detecting device according to the present invention, and is a rear view illustrating the temperature detecting unit provided at the cantilever-shaped portion. FIG. 12-11 is a sectional view illustrating section B-B of FIG. 12-10.

In the present embodiment, as means of shortening the length of the portion to be supported in the cantilever shape of the protruding portion 460 (cantilever-shaped portion 700), a protruding-shaped portion 382 is provided at the housing 302, the protruding-shaped portion 382 protruding to the protruding portion 460. The protruding-shaped portion 382 is provided between the leading end portion 700a and the base end portion 700b of the protruding portion 460, in contact with the back face side and side faces of the protruding portion 460. The protruding-shaped portion 382 is provided in a range including the base end portion 700b of the protruding portion 460. This arrangement allows the protruding-shaped portion 382 to be provided on the base end portion 700b side with respect to the implementation portion of the temperature detecting unit 451 of the protruding portion 460, and the cantilever-shaped part to be formed at the portion at which the temperature detecting unit 451 is implemented.

The protruding-shaped portion 382 supports the back face side of the protruding portion 460 such that the conductors 461 are exposed. Thus, the protruding-shaped portion 382 is not provided on the front face side of the protruding portion 460 (side on which the conductors 461 are provided). The support of the protruding-shaped portion 382 for the portion including the base end portion 700b of the protruding portion 460, can shorten the length of the cantilever-shaped part in the protruding portion 460.

The protruding-shaped portion 382 may be provided at a position apart from the base end portion 700b between the leading end portion 700a and the base end portion 700b of the protruding portion 460 such that the contactless portion 700c of the fourth embodiment is located.

The physical quantity detecting device 300 according to the present invention, includes: the circuit board 400 having: the first support portion 403 on which a physical quantity detecting element that detects the physical quantity of fluid (e.g., the flow-amount detecting unit 602) is implemented; and the second support portion 460 on which the temperature detecting element 453 that detects the temperature of the fluid is implemented; and the housing 302 molded by injection molding, supporting the circuit board 400. The step-shaped portion 701, the protruding-shaped portion 702, the support portion (foundation portion) 380, the protruding-shaped portion 381, and the protruding-shaped portion 382 of the first to fifth embodiments, are each included in a third support portion supporting the second support portion 460 in connection with the housing 302, the third support portion being located on the leading end portion 700a side with respect to the base end portion 700b that is the end portion on the opposite side to the leading end portion 700a of the second support portion 460, the third support portion being located on the base end portion 700a side with respect to the implementation portion on which the temperature detecting element 453 is implemented.

The embodiments of the present invention have been described in detail, but the present invention is not limited to the embodiments. Thus, various alterations may be made in design without departing from the scope of the spirit of the present invention described in the claims. For example, the embodiments have been described in detail for easy understanding of the present invention. The present invention is not necessarily limited to including all the described configurations. Part of the configuration of one embodiment can be replaced with the configuration of another embodiment, or the configuration in one embodiment and the configuration in another embodiment can be added together. Furthermore, for part of the configuration in each embodiment, addition, deletion, or replacement of another configuration may be made.

REFERENCE SIGNS LIST 30 gas to be measured
124 main passage
300 physical quantity detecting device
302 housing
306 second sub-passage
331 measurement unit
336 upstream-side outer wall of measurement unit 331
336a hollow-shaped portion formed at upstream-side outer wall 336
336b temperature-detecting-unit housing space
336c lower face of temperature-detecting-unit housing space 336b
380 support portion (foundation portion) provided at housing 302
381 protruding-shaped portion 381 provided at housing 302
382 protruding-shaped portion provided at housing 302
400 circuit board
400a side of circuit board 400
403 protruding portion having measurement flow-passage face 430
421A, 421B pressure sensor (third detecting unit)
422 humidity sensor (second detecting unit)
430 measurement flow-passage face of protruding portion 403
451 temperature detecting unit
453 temperature sensor (temperature detecting element)
460 protruding portion having temperature detecting unit 451 implemented
461 conductor
602 flow-amount detecting unit (first detecting unit)
700 cantilever-shaped portion
700a leading end portion of cantilever-shaped portion (protruding portion 460)
700b base end portion of cantilever-shaped portion (protruding portion 460)
701 step-shaped portion
702 protruding-shaped portion provided at protruding portion 460

The invention claimed is:

1. A physical quantity detecting device comprising:
a circuit board comprising:
 a first support portion on which a physical quantity detecting element is implemented, the physical quantity detecting element being configured to detect a physical quantity of fluid; and
 a second support portion on which a temperature detecting element is implemented, the temperature detecting element being configured to detect a temperature of the fluid, the second support portion protruding from an edge of the circuit board, the second support portion having the temperature detecting element disposed at a leading end portion included in a free end; and a housing supporting the circuit board;

wherein the second support portion has a third support portion supporting the second support portion in connection with the housing, the third support portion being located on a side on which the leading end portion is located, with respect to a base end portion that is an end portion on an opposite side to the leading end portion, the third support portion being located on a side on which the base end portion is located, with respect to an implementation portion on which the temperature detecting element is implemented; and wherein the housing includes an upstream-side outer wall, the upstream-side outer wall having a hollow portion configured to form a housing space, wherein the housing space is configured to house the free end of the second portion, wherein the free end of the second portion extends substantially parallel to a lower face side of the housing space, and wherein the third support portion extends between the lower face side of the housing space and the free end of the second support portion.

2. The physical quantity detecting device according to claim 1, wherein the second support portion has a width-extended portion extended in width with respect to the implementation face on which the temperature detecting element is implemented, and wherein the width-extended portion is included within the third support portion.

3. The physical quantity detecting device according to claim 2, wherein the circuit board is secured, the circuit board being embedded in the housing, and wherein the third support portion is secured with a side edge portion on a width-extended side, embedded in the housing.

4. The physical quantity detecting device according to claim 3, wherein the third support portion is disposed at a position apart from the base end portion.

5. The physical quantity detecting device according to claim 1, wherein the third support portion has a protruding-shaped portion protruding from the housing to a side on which the second support portion is located, the protruding-shaped portion adhering to the second support portion with adhesive.

6. The physical quantity detecting device according to claim 1, wherein the third support portion has a protruding-shaped portion protruding from the housing to a side on which the second support portion is located, and wherein the second support portion is secured, the second support portion being embedded in the protruding-shaped portion such that a conductor is exposed.

7. The physical quantity detecting device according to claim 6, wherein the protruding-shaped portion has the second support portion embedded such that a back face of the second support portion is covered in a direction across a direction in which the second support portion protrudes.

8. The physical quantity detecting device according to claim 6, wherein the second support portion is embedded in the protruding-shaped portion at a position apart from the base end portion.

9. The physical quantity detecting device according to claim 1, wherein a face of the housing space disposed opposite the leading end portion of the second support portion is sloped toward the leading end portion.

10. The physical quantity detecting device according to claim 1, wherein the second support portion includes a stepped portion, the stepped portion having a first width greater than a second width of the leading end portion, wherein the third support portion is disposed closer to the stepped portion than the leading end portion.

* * * * *